US012544348B2

(12) United States Patent
Huang et al.

(10) Patent No.: US 12,544,348 B2
(45) Date of Patent: Feb. 10, 2026

(54) METHODS FOR TREATING APOE4/4-ASSOCIATED DISORDERS

(71) Applicants: The Regents of the University of California, Oakland, CA (US); THE J. DAVID GLADSTONE INSTITUTES, A TESTAMENTARY TRUST ESTABLISHED UNDER THE WILL OF J. DAVID GLADSTONE, San Francisco, CA (US)

(72) Inventors: Yadong Huang, Daville, CA (US); Alice Taubes, San Francisco, CA (US); Phil Nova, San Francisco, CA (US); Marina Sirota, San Francisco, CA (US)

(73) Assignees: The J. David Gladstone Institutes, San Francisco, CA (US); The Regents of the University of California, Oakland, CA (US)

( * ) Notice: Subject to any disclaimer, the term of this patent is extended or adjusted under 35 U.S.C. 154(b) by 902 days.

(21) Appl. No.: 17/046,950

(22) PCT Filed: Apr. 12, 2019

(86) PCT No.: PCT/US2019/027366
§ 371 (c)(1),
(2) Date: Oct. 12, 2020

(87) PCT Pub. No.: WO2019/200342
PCT Pub. Date: Oct. 17, 2019

(65) Prior Publication Data
US 2021/0228519 A1 Jul. 29, 2021

Related U.S. Application Data

(60) Provisional application No. 62/656,898, filed on Apr. 12, 2018.

(51) Int. Cl.
*A61K 31/196* (2006.01)
*A61K 9/00* (2006.01)
(Continued)

(52) U.S. Cl.
CPC .......... *A61K 31/196* (2013.01); *A61K 9/0019* (2013.01); *A61K 9/0053* (2013.01);
(Continued)

(58) Field of Classification Search
CPC .... A61K 31/196; A61K 47/183; A61K 47/26; A61K 9/0019; A61K 9/0053; A61K 9/08;
(Continued)

(56) References Cited

U.S. PATENT DOCUMENTS 5,716,828 A 2/1998 Roses et al.
2005/0031651 A1 2/2005 Gervais et al.
(Continued)

FOREIGN PATENT DOCUMENTS

CN 102341380 2/2012
CN 102341380 A 2/2012
(Continued)

OTHER PUBLICATIONS

Zhong et al., A rapid and cost-effective method for genotyping apolipoprotein E gene polymorphism, Molecular Neurodegeneration, vol. 11, No. 2, Jan. 12, 2016 (Year: 2016).*
(Continued)

Primary Examiner — Kortney L. Klinkel
Assistant Examiner — Padmaja S Rao
(74) Attorney, Agent, or Firm — Schwegman Lundberg & Woessner, P.A.

(57) ABSTRACT

The present disclosure provides methods of treating Alzheimer's Disease (AD) and rescuing cognitive deficits associated with AD in a subject having an apoE4/4 genotype, by administering a therapeutically effective amount of
(Continued)

the loop-diuretic bumetanide to the subject. Also disclosed are kits for performing the method, including one or more doses of a bumetanide formulation; and which may also include instructions for treating a patient having an apoE4/4 genotype by administering bumetanide, and/or instructions and reagents for testing/identifying a subject having an apoE4/4 genotype.

20 Claims, 27 Drawing Sheets

Specification includes a Sequence Listing.

(51) Int. Cl.
*A61K 9/70* (2006.01)
*A61P 25/28* (2006.01)
*C12Q 1/6883* (2018.01)
(52) U.S. Cl.
CPC ............ *A61K 9/7023* (2013.01); *A61P 25/28* (2018.01); *C12Q 1/6883* (2013.01); *C12Q 2600/106* (2013.01); *C12Q 2600/156* (2013.01)
(58) Field of Classification Search
CPC ..... A61K 9/7023; A61P 25/28; C12Q 1/6883; C12Q 2600/106; C12Q 2600/156; C07K 14/775
See application file for complete search history.

(56) References Cited

U.S. PATENT DOCUMENTS

| | | | |
|---|---|---|---|
| 2010/0029654 | A1 | 2/2010 | Pasinetti |
| 2014/0128469 | A1 | 5/2014 | Tung |
| 2015/0202215 | A1 | 7/2015 | Nedergaard et al. |
| 2016/0106693 | A1 | 4/2016 | Ben-ari et al. |
| 2017/0246131 | A1* | 8/2017 | Partridge ............... A61P 25/24 |

FOREIGN PATENT DOCUMENTS

| | | |
|---|---|---|
| CN | 112367970 | 2/2021 |
| JP | 2008504372 | 2/2008 |
| JP | 2011231094 | 11/2011 |
| JP | 2016509061 | 3/2016 |
| WO | WO-2017042314 A1 | 3/2017 |
| WO | WO-2019200342 A1 | 10/2019 |

OTHER PUBLICATIONS

"International Application Serial No. PCT US2019 027366, International Preliminary Report on Patentability mailed Oct. 22, 2020", 9 pgs.
"European Application Serial No. 19785109.0, Response filed Dec. 22, 2021 to Extended European Search Report mailed Jun. 7, 2021", 7 pgs.
"Japanese Application Serial No. 2020-555874, Response filed Feb. 18, 2022 to Notification of Reasons for Refusal mailed Nov. 24, 2021", w English claims, 10 pgs.
"International Application Serial No. PCT/US2019/027366, International Search Report mailed Jul. 29, 2019", 4 pgs.
"International Application Serial No. PCT/US2019/027366, Written Opinion mailed Jul. 29, 2019", 7 pgs.
NOVA, "Enhanced Inhibitory Neurotransmission as a Therapeutic Target in ApoE4-Related Alzheimer's Disease", University of California San Francisco, Thesis, (Aug. 10, 2017), 1-100.
Taubes, A, "ApoE-Genotype-Specific Drug Repositioning Identifies Bumetanide as an Effective Compound in a Mouse Model of Alzheimer's Disease", University of California San Francisco, Thesis, (Mar. 28, 2019), 1-78.
"European Application Serial No. 19785109.0, Extended European Search Report mailed Jun. 7, 2021", 8 pgs.
"Japanese Application Serial No. 2020-555874, Notification of Reasons for Refusal mailed Nov. 24, 2021", w English translation, 6 pgs.
"Chinese Application Serial No. 201980038259.6, Decision of Rejection mailed May 7, 2024", w/ English Translation, 20 pgs.
"Chinese Application Serial No. 201980038259.6, Office Action mailed Apr. 21, 2023", w/ English Translation, 26 pgs.
"Chinese Application Serial No. 201980038259.6, Office Action mailed Dec. 5, 2023", w/ English Translation, 22 pgs.
"Chinese Application Serial No. 201980038259.6, Response filed Apr. 22, 2024 to Office Action mailed Dec. 5, 2023", w/ current English claims, 17 pgs.
"Chinese Application Serial No. 201980038259.6, Response filed Nov. 6, 2023 to Office Action mailed Apr. 21, 2023", w/ English claims, 19 pgs.
"European Application Serial No. 19785109.0, Communication Pursuant to Article 94(3) EPC mailed Jan. 11, 2024", 5 pgs.
"European Application Serial No. 19785109.0, Response filed May 22, 2024 to Communication Pursuant to Article 94(3) EPC mailed Jan. 11, 2024", 5 pgs.
Andrews-Zwilling, Yaisa, et al., "Apolipoprotein E4 Causes Age- and Tau-Dependent Impairment of GABAergic 2 Interneurons, Leading to Learning and Memory Deficits in Mice", The Journal of Neuroscience, 30 (41), (Oct. 13, 2010), 11 pgs.
Chuang, Yi-Fang, et al., "Use of diuretics is associated with reduced risk of Alzheimer's disease: the Cache County Study", Neurobiology of Aging, vol. 35, No. 11, (Nov. 30, 2014), 16 pgs.
Huang, Gaoya, et al., "Correlation Research of Apolipoprotein E and Alzheimer's Disease", Chinese Journal of Clinical Neurosciences, vol. 24, No. 1, (Jan. 20, 2016), 102-108.
Kourdougli, Nazim, et al., "Depolarizing ?-aminobutyric acid contributes to glutamatergic network rewiring in epilepsy", Annals of Neurology, vol. 81, No. 2, (Feb. 28, 2017), 29 pgs.
Theendakara, Veena, et al., "Downregulation of protein phosphatase 2A by apolipoprotein E Implications for Alzheimers disease", Molecular and Cellular Neuroscience vol. 83, (Sep. 30, 2017), 9 pgs.
Zheng, Wenxuan, et al., "Research Progress of Apolipoprotein Es4 Allele for Diagnosis and Treatment of Alzheimer's Disease", Chinese Journal of Gerontology, vol. 37, No. 14, (Jul. 25, 2017), 3636-3637.
Strittmatter, Warren J., et al. Apolipoprotein E: High-avidity binding to , B-amyloid and increasedfrequency of type 4 allele in late-onset familial Alzheimer disease, Proc. Natl Acad. Sci. USA 90 (1993), pp. 1977-1981.
Huang, Gao-Ya, "Correlation Research of Apolipoprotein E and Alzheimer's Disease", Chinese Journal of Clinical Neurosciences, vol. 24, No. 1, (Jan. 20, 2016), 7 pgs.
Kourdougli, Nazim, "Depolarizing ?-aminobutyric acid contributes to glutamatergic network rewiring in epilepsy", Annals of Neurology, vol. 81, No. 2, (Feb. 28, 2017), 29 pgs.
Zheng, Wenxuan, "Research Progress of Apolipoprotein Es4 Allele for Diagnosis and Treatment of Alzheimer's Disease", With English Machine Translation—Chinese Journal of Gerontology, vol. 37, No. 14, (Jul. 25, 2017), 8 pgs.

* cited by examiner

Figure 10

Homo sapiens apolipoprotein E (APOE), RefSeqGene on chromosome 19
NCBI Reference Sequence: NG_007084.2 (SEQ ID NO:1)

```
   1 gggacagggg ggcctata attggacaag tctggatcc ttgagtccta ctcagccca
  61 gcggagtga aggacgtcct tcccaggag ccggtgagaa gcgcagtcgg gggcacggg
 121 atgactcag gggcctctag aaagagctgg gacctggga accctgac tccaggtagt
 181 ctcaggagag ctactcgggg tggggcttgg ggagaggagg agggggtg aggcaagcag
 241 cagggactg gacctggaa gggctggca gcagagcga ccgaccgg tagaaggtg
 301 ggtggaaga gcagctgaa tgggatgtaa gccatagcag gactccacga gtgtcacta
 361 tcattatg agcacctact gggtgtccc agtgtcctca gatctccata actgggagc
 421 caggggagc gacaggtag ctagccgtcg atggagaac tttaaatga ggactgaatt
 481 agctcataa tggactcag cgcttaactg tgaggtgga gcttagaatg tgaaggagg
 541 atgaggaatg cagactgag actgagatgg aaccggcgt agggagagg tgggaagatg
 601 gaattgaac cccgggagag gaagatggaa ttttctatgg aggcgaccc ggggatgggg
 661 agataagaga agaccaggag ggagttaaat aggaatggg ttgggggcgg cctggtaaat
 721 gtgctgggat tagggctgttg cagataatgc aacaaggct ggaaggctaa cctgggtga
 781 ggcaggattg ggccaggct gaggtggga ggagtcctca ctgggttg actgacaagt
 841 tctccttccc cagactggcc aatcacaagc aggaagatga aggttctgtg ggctgcgttg
 901 ctggtcacat tcctggcagg tatggggcg gggctgctc ggttccccc gctcctccc
 961 ctctcatcct cacctcaacc tcctgacacc attcaggcag accatggcc ccctcttctg
1021 aggcttctgt gctgcttcct ggctctgaac agcgattga cgctctctgg gcctcggttt
1081 ccccaatcct tgagataggga gttagaagtt gcttgttgt cgttgtttgc tgtcgtcgtt
1141 ttgttttttt gagatagagt ctcgctctgt cgcccaggct gggtgcagt gggggatct
1201 cggctcactg caagctccgc ctcccaggtc aagccatcc tcctgcctca gcctcccaag
1261 tagctggga tacaggcaca tgccaccaca cccgactaag ttttttgtat ttcagtaga
1321 gacgggttt caccatgttg gccaggctgg tctggaactc ctgacctcag gtgatctgcc
1381 cgtttcgatc tcccaaagtg ctgggattac aggcgtgagc cacccgcct ggctggagt
1441 tagaaggttc taatgcattg caggcagata gtgaatacca gacaaggac agctgtgatc
1501 ttttattctcc atcacccca cacagtcctg cctgggcac acaaggacac tcaatacatg
1561 cttttccgct gggcgcggtg gctcaccct gtaatcccag cactttggga ggccaaggtg
1621 ggaggatcac ttgagcccag gagttcaaca ccagcctgg aacatagtg agaccctgtc
1681 tctactaaaa atacaaaaat tagccaggca tggtgccaca cacctgtgct ctcagctact
1741 caggaggctg aggcaggagg atcgcttgag cccagaagt caaggttgca gtgaaccatg
1801 ttcaggccgc tgcactccag cctgggtgac agagcaagac cctgcttata aatacataat
1861 gctttccaag tgattaaacc aaatcctgcc tcacctgcc caccatgcct cgaaggaagc
1921 attgtggag cacctctgt gtgccctag gtactagatg cctggacggg gtcagaagga
1981 cctgaccca cctgaactt gtccacaca ggatgccagg ccaggtgga gcaggggtg
2041 gagacagagc ccggagccga gctgcgcaga cagaccgagt ggcagagcgg ccagcgctgg
2101 gaactggcac tgggtcgctt ttgggattac ctctgctggg tgcacacact gtctgagcag
2161 gtgcaggagg agctgctcag ctcccaggtc accaggaac tgaagtgagt gtccccatcc
2221 tggccctga ccctctgt gggcggctat acctcccag gtccaggttt cattctgcc
2281 cagtgctaa gtcttgggg gctgggtct ctgatggtc tagcttccta ttcccatttc
2341 tgatcctgg ctttagctct atggaattat ctatctcagc tttgtctctc tctcttcct
2401 tctgactcag tctctcacac tcgtcctggc tctgtctctg tcctcccta gtctttttat
2461 atagagacag agagatgggg tctcactgtg ttgccaagc tggtcttgaa ctcctgggct
2521 caagcgatcc tcccgcctcg gcctcccaa gtgctgggat tagaggcatg agcccacctg
2581 cccaggctcc tagctcctta ttgtctctg catctgcct ctgcatctgc tctcagcta
2641 tgtcctgtc tcctctctc ggcctctgcc ccgttcctc tctcctctt gggtctctct
2701 ggccatccc catctgcc gccaatcc agccctctc ccgcctccc actgtgcagc
2761 acccccgg cctctctgct ctcacggagct gatgacaag aacatgaagg agtgaaggc
2821 ctacaaatcg gaactgaagg aatgactgac ccggtgcg gagaaacgc gggacgct
2881 gtccaggag ctgcaggtgg cgcagcccg gcgggcgc gacatgaag agtgtgcgg
2941 ccgcctggtg cagtaccgag gcgaggtgca ggcatgctg ggcagagca ccgaggagct
```

Human apolipoprotein E (epsilon-4 allele) gene, complete cds
GenBank: K10065.1 (SEQ ID NO:2)

```
   1 ggaacttgat gctcagagag gacaagtcat ttgcccaagg tcacacagct ggcaactggc
  61 agacgagatt cacgcctgg caattgact ccagaatcct aaccttaacc cagaagcacg
 121 gctccaagcc ctggaaacca caatacctgt cgcagtcagg gggagttgct ggaatctcat
 181 ttcacatgtg gggagggggc tgtgtgctc aaggtcacaa ccaaagaaga agctgtgatt
 241 aaaaccagg tcccattgc aaagcctcga cttttagcg gtgcatcata ctgttcccac
 301 cgctcccatc ccacttctgt ccagccgcct agccccacct ccttttttt ccctttga
 361 gacagtctcc ctcttgctga agctggagtg cagtggcgag atctcggctc actgtaacct
 421 ccgcctcccg ggttcaagcg attctcctgc ctcagcctcc caagtagcta ggattacagg
 481 cgccgccac cacgcctggc taactttgt attttagta gagatgggt tcaccatgt
 541 tggtcaggct ggtctcaaac tcctgacctt aagtgattcg cccactgtgg cctcccaag
 601 tgctgggatt acaggcgtga gctaccgccc ccagccccctc ccatccgacc tctgtccagc
 661 ccgctagcc tactttcttt ctgggatcca ggagtccaga tcccagccc cctctccaga
 721 ttacattcat ccaggcacag gaaaggacag ggtcaggaaa ggaggactct ggcggcagc
 781 ctccacattc cacttccaag cttggccccc agaatggagg agggtgtctg tattactggg
 841 caggtgtcc tccctcctg gggactgtgg gaagtgytca aagacctct atgcccacc
 901 tcctcctcc ctatgcctg ctgtgcctgg gcagggga gaacagccca cctcgtgact
 961 gggctgccca gcccgccta tcctgggga aggggcgg acagggagg ccctataatt
1021 ggacaagtct gggatccttg agtcctactc agcccagcg gagtgaaggg acgtccttcc
1081 acaggagccg gtgagaagcg cagtcggggg cacgggatg agctcagggg cctctagaaa
1141 gagctggac ctgggaagc cctggcctcc agtagtctc aggagagcta ctggggtcg
1201 ggcttaggga gagggagagc gggggtgagg caagtagcag gggctggac ctgggaaggg
1261 ctgggagcta gagacgaccc gaccgctag aaggtggggt gggagagca gctggactgg
1321 gatgtaagcc atagcaggac tccacgagtt gtcactatca ttatcgagca cctactgggt
1381 gtcccagttg tcctcaagatc tccataactg gggagcagg ggcagcgaca cggtagctag
1441 ccgtcgattg gagaactttta aaatgaggac tgaattagtt catataatgga aaacgggct
1501 taactgtgag gttggagctt agaatgtgaa gggagaatga ggaatgcgag actgggactg
1561 agatgaacc ggccgctggg acgggtgag gggatggaat ttgaacccg ggagaggaag
1621 atggaatttt ctatgaagc cgacctggg atgggagat aagagaagac caggaggag
1681 ttaaataggg aatggttgg gggcggcttg gtaaatgtgc tgggattagg ctgttgcaga
1741 taatgcaaca aggctggaa ggctaaccctg gggtgaagc gggttgggag cgctgggggt
1801 gggaggagtc ctcactggcg gtgattgac agttcctcct tcccagacc ggcaatcac
1861 aggcggaag atgaagttc tgtgggctgc gttgcrggc acattcctgg caggtatggg
1921 gcgggggtt gctcggtcc cccagctcct cccctctcna tcctcacctg aacctcctgg
1981 cccattcag acagacctg ggccccatct tctgaaggtt ctgtgctgct tcctgctct
2041 gaacagcgat tgagcgctct ctgggcctcg gttcccccca tccttgagat aggagttaga
2101 agtgttttg tgttgttgt ttgttgtgt tgtttgttt tttgagatg aagtctgct
2161 ctgtcgccca ggctgaagtg cagtggcgcg atctcggctc actgcaagct ccgcctccca
2221 ggcccacgcca attctcctgc ctcagcctcc caagtagctg ggactacagg cacatgccac
2281 cacgcccgac taactttttt gtattttcag tagagacggg gtttcaccat gttggccagg
2341 ctggtctgga actcctgacc tcaggtgatc tgcccgtttc gatctccaa agtgctggga
2401 ttacaggcgt gagccaccgc acctggctgg gagtagagg tttctaatgc atgcaggca
2461 gatagtgaat accagacacg gggcagctgt gatcttatt ctccatcacc cccacaaggc
2521 cctgcctggg gcacacaagg acactcaata catgctttc cgctggccg gtggctcacc
2581 cctgtaatcc cagcactttg ggaggccaag gtgggaggat cactgagcc caggagttca
2641 acaccagcct gggcaacata gtgagaccct gtctctacta aaaatacaaa aattagccag
2701 gcatggtggc acacacctgt gctctcagct actcagggg ctgaggcagg aggatcgctt
2761 gagcccagaa ggtcaaggtt gcagtgaacc atgttcaggc cgctgcactc cagcctgggt
```

Figure 11 (Cont.)

tSNE Plot of 17 Cell Clusters in the ApoE4/4 Mouse Hippocampus

P-Value of Flip of E4/4 AD Differentially Expressed Genes After Bumetanide Treatment vs. DE Genes in Each Cluster

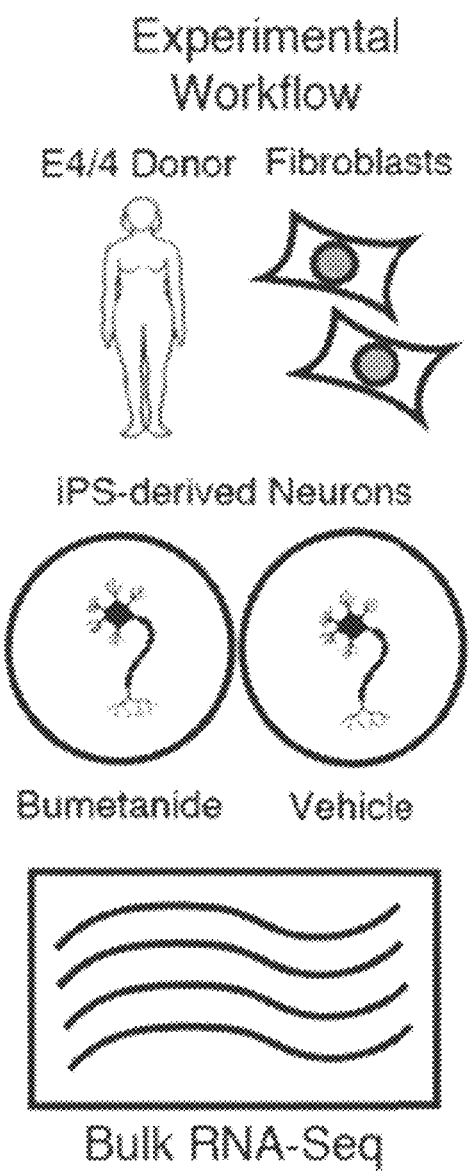

Overlapping Enriched Ontological Pathways in Mouse Neurons, Human iPS-Derived Neurons, and Human E4/4 AD.

METHODS FOR TREATING APOE4/4-ASSOCIATED DISORDERS

CROSS-REFERENCE

This application is a U.S. National Stage Filing under 35 U.S.C. 370 from International Patent Application Serial No. PCT/US2019/027366, filed Apr. 12, 2019, Published as WO 2019/200342 on Oct. 17, 2019, which application claims the benefit of U.S. Provisional Patent Application No. 62/656,898, filed Apr. 12, 2018, the contents of both which are incorporated herein by reference in their entireties.

STATEMENT REGARDING FEDERALLY SPONSORED RESEARCH

This invention was made with government support under Grant No. AG057683 awarded by the National Institutes of Health. The government has certain rights in the invention.

INCORPORATION BY REFERENCE OF SEQUENCE LISTING

This application contains a Sequence Listing which has been submitted electronically in ST25 format and hereby incorporated by reference in its entirety. Said ST25 file, created on Apr. 22, 2024, is name 3730106US1.txt and is 12,984 bytes in size.

INTRODUCTION

Alzheimer's Disease (AD) is a progressive neurodegenerative disorder associated with cognitive decline and is the most common form of dementia in the elderly. Genetic, pathological and functional studies have provided evidence that an imbalance between production and clearance of amyloid-β (Aβ) peptides in the brain results in accumulation and aggregation of AB. Toxic Aβ aggregates in the form of soluble Aβ oligomers, intraneuronal Aβ and amyloid plaques injure synapses and ultimately cause neurodegeneration and dementia.

There are many genetic risk factors for dementia; approximately 25% of Alzheimer's patients have a strong family history of the disease. However, only 1% of patients with AD directly inherit a gene mutation that causes early-onset Alzheimer's, also known as familial Alzheimer's disease (FAD). For the more common late-onset AD (LOAD), the human Apolipoprotein E (APOE) gene has been reported to be the greatest risk factor. (Liu, C. C., et al., Apolipoprotein E and Alzheimer disease: risk, mechanisms and therapy. *Nat. Rev. Neurol.*, 2013, 9 (2): 106-18).

The ApoE protein is a cholesterol carrier that mediates lipid transport from one tissue or cell type to another, and supports injury repair in the brain. In addition to binding to several cell-surface receptors to deliver lipids, ApoE lipoproteins also bind to hydrophobic Aβ peptide inside the brain. ApoE is believed to help to clear Aβ, a component of plaques associated with synaptic dysfunction and neurodegeneration in AD.

Human ApoE is an approximately 34-kDa protein with 299 amino acids. ApoE has two structural domains—an amino-terminal domain (amino acids (aa) 1-191) containing the receptor binding region (aa 135-150) and a carboxyl-terminal domain (aa 222-299) containing the lipid binding region (aa 241-272)—which are linked by a structurally flexible hinge region (aa 192-221).

There are three polymorphic alleles of the APOE gene: APOE ε2, ε3 and ε4 (a.k.a. E2, E3 and E4); thus, in humans, the APOE genotypes are symbolized as: E2/E2, E2/E3, E2/E4, E3/E3, E3/E4, or E4/E4. The E3 allele is the most common and is not thought be associated with risk of AD, whereas individuals carrying the E4 allele are at increased risk of AD, and individuals having even one copy of the E2 allele (the rarest) have reduced risk of developing Alzheimer's. In contrast, presence of the E4 allele is associated with increased risk for cerebral amyloid angiopathy and age-related cognitive decline during normal aging. (Ibid.).

Although AD is the leading cause of dementia worldwide, no effective therapies are yet available. Accordingly, there remains a need in the art for therapeutic agents effective in treating ApoE4-genotype-associated disorders, such as dementia and/or Alzheimer's Disease.

SUMMARY OF THE INVENTION

The present disclosure provides methods of treating Alzheimer's Disease (AD) and rescuing cognitive deficits associated with AD in a subject having an apoE4/4 genotype, by administering a therapeutically effective amount of the loop-diuretic bumetanide to the subject, as well as kits for performing the method. Further provided herein are kits including one or more doses of a bumetanide formulation; and which may also include electronic or paper instructions for treating a patient having an apoE4/4 genotype by administering bumetanide, and/or instructions and reagents for testing/identifying a subject having an apoE4/4 genotype.

In some aspects, a method of treating Alzheimer's Disease (AD) in a subject having an apoE4/4 genotype, by administering a therapeutically effective amount of bumetanide to the subject is provided. In some embodiments of the method, the bumetanide is administered to the subject at a dose of 0.05 mg/kg/day or less.

In some aspects, provided herein is a method of treating Alzheimer's Disease in a subject having an apoE4/4 genotype, by a) identifying a subject as having an apoE4/4 genotype; and b) administering a therapeutically effective amount of bumetanide to the subject. In some embodiments of the method, the administering comprises administering bumetanide to the subject at a dose of 0.05 mg/kg/day or less.

In some embodiments of these methods, the bumetanide is formulated as an oral dosage form including a pharmaceutically acceptable carrier, and the oral dosage form is administered orally. In some embodiments of these methods, the oral dosage form is administered once daily as a capsule, a tablet, a disintegrating tablet or lozenge, or a sachet.

In some embodiments of these methods, the bumetanide is administered intravenously or parenterally, and optionally is formulated with a pharmaceutically acceptable carrier.

In some embodiments of these methods, the bumetanide is provided in a transdermal patch.

In some embodiments of these methods, the subject is a mammal. In some embodiments of these methods, the mammal is a rodent. In some embodiments of these methods, the mammal is a human.

In some embodiments of these methods, a PCR-based DNA analytic method is used to identify the subject as having an apoE4/4 genotype.

In some aspects, a kit is provided, which includes a) a bumetanide formulation; b) a package; and c) information, in electronic or paper form, comprising instructions for administration of bumetanide to a subject having an apoE4/4 genotype. In some embodiments of the kit, the instructions include instructions to administer the formulation to the subject at a dose of 0.05 mg/kg/day or less of bumetanide.

In some embodiments of the kit, the instructions specify that administration of the bumetanide formulation to the subject is based on subject weight, as well as weight and/or volume of the formulation administered.

In some embodiments, the kit also includes a container for holding a biological sample isolated from a subject to be tested for one or more apoE genotypes.

In some embodiments, the kit also includes one or more reagents for performing PCR and/or microarray analysis to allow specific detection of an apoE4 allele in the biological sample, and electronic or paper instructions for reacting the reagents with the biological sample. In some embodiments, the kit further includes one or more control reference samples.

In some embodiments of the kit, the bumetanide formulation is in the form of a capsule, a tablet, a disintegrating tablet or lozenge, or a sachet for oral delivery. In some embodiments of the kit, the bumetanide formulation is syringeable for intravenous or parenteral delivery. In some embodiments of the kit, the bumetanide formulation is in the form of a transdermal patch.

In some aspects, provided herein is a kit which includes a) a container with one or more doses of a formulation including a pharmaceutically acceptable carrier and an active ingredient comprising bumetanide; and b) electronic or paper instructions for treating a subject having an apoE4/4 genotype. In some embodiments of the kit, each dose of the formulation does not include more than 2 mg of bumetanide.

In some embodiments of the kit, the dose is formulated for oral administration. In some embodiments of the kit, the dose formulated for oral administration is a once-daily capsule, tablet, disintegrating tablet or lozenge, or sachet.

In some embodiments of the kit, the dose of the formulation is formulated to be administered intravenously or parenterally. In some embodiments of the kit, the dose of the formulation is formulated to be administered by a transdermal patch.

In some embodiments of the kit, the subject is a mammal. In some embodiments of the kit, the mammal is a rodent. In some embodiments of the kit, the mammal is a human.

In some embodiments, the kit also includes one or more reagents for performing PCR or microarray analysis to allow specific detection of an apoE4 allele in a biological sample from the subject, and electronic or paper instructions for reacting the reagents with the biological sample.

In some embodiments, the kit also includes one or more control reference samples.

In some embodiments of the kit, the instructions for treating the subject specify a dose based on subject weight, and weight and/or volume of the formulation administered.

BRIEF DESCRIPTION OF THE DRAWINGS

FIG. 10 provides the genomic sequence of human apoeE3.

FIG. 11 provides the genomic sequence of human apoE4.

FIGS. 14A-14F provide schematics and graphs showing the results of RNA-seq analysis of the transcriptomic perturbation signature of bumetanide in apoE4/4-iPSC-derived human neurons.

DEFINITIONS

Figure 1:
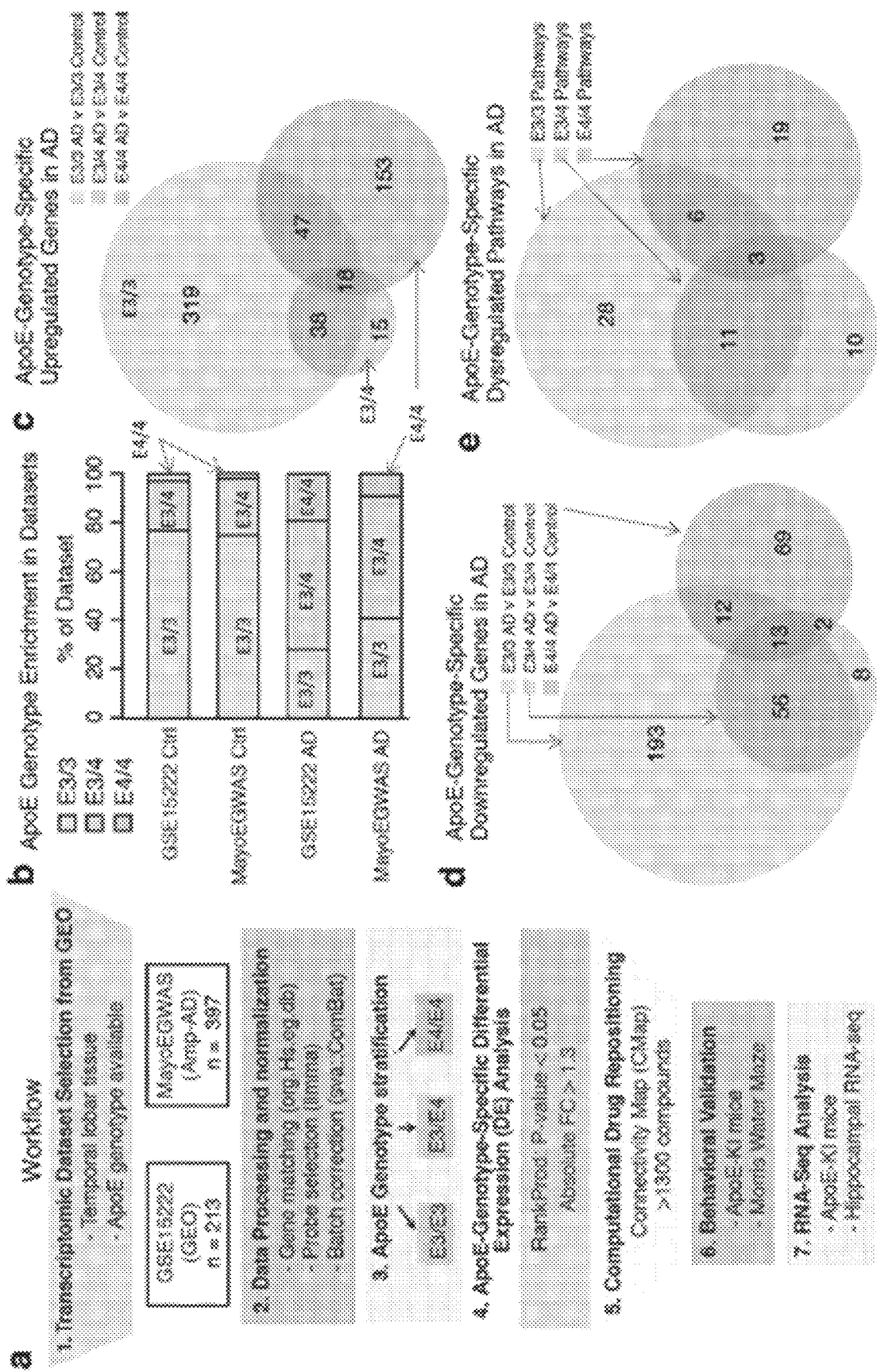
FIG. 1 (panels a through e) depicts the experimental workflow and analysis of ApoE genotype-specific differential expression (DE) in AD versus control datasets.

Before the present invention is further described, it is to be understood that this invention is not limited to particular embodiments described, as such may, of course, vary. It is also to be understood that the terminology used herein is for the purpose of describing particular embodiments only, and is not intended to be limiting, since the scope of the present invention will be limited only by the appended claims.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, the preferred methods and materials are now described. All publications mentioned herein are incorporated herein by reference to disclose and describe the methods and/or materials in connection with which the publications are cited.

It must be noted that as used herein and in the appended claims, the singular forms "a," "an," and "the" include plural referents unless the context clearly dictates otherwise. Thus, for example, reference to "a polypeptide" includes a plurality of such polypeptides and equivalents thereof, and reference to "a disease or disorder" includes a syndrome of associated disorders known to those skilled in the art, and so forth. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

The terms "polypeptide," "peptide" and "protein", used interchangeably herein, refer to a polymeric form of amino acids of any length, which can include coded and non-coded amino acids, chemically or biochemically modified or derivatized amino acids, and polypeptides having modified peptide backbones. The term includes fusion proteins, including, but not limited to, fusion proteins with a heterologous amino acid sequence, fusions with heterologous and homologous leader sequences, with or without N-terminal methionine residues; immunologically tagged proteins; and the like. $NH_2$ refers to the free amino group present at the amino terminus of a polypeptide. COOH refers to the free carboxyl group present at the carboxyl terminus of a polypeptide. In keeping with standard polypeptide nomenclature, *J. Biol. Chem.*, 243 (1969), 3552-59 is used.

As used herein, the terms "treatment," "treating," and the like, refer to obtaining a desired pharmacologic and/or physiologic effect. The effect may be prophylactic in terms of completely or partially preventing a disease or symptom thereof and/or may be therapeutic in terms of a partial or complete cure for a disease and/or adverse effect attributable to the disease. "Treatment," as used herein, covers any treatment of a disease in a mammal, particularly in a human, and includes: (a) preventing the disease from occurring in a subject which may be predisposed to the disease but has not yet been diagnosed as having it; (b) inhibiting the disease, i.e., arresting its development; and (c) relieving the disease, i.e., causing amelioration and/or regression of the disease. For example, with respect to Alzheimer's Disease (AD), symptoms that may be improved by treatment include cognitive deficits such as problems with learning and memory. Similarly, phenomena associated with AD that may be improved by treatment include amyloid plaques, neuritic plaques and/or neurofibrillary tangles.

A "therapeutically effective amount" or "efficacious amount" refers to the amount of a compound or agent that, when administered to a mammal or other subject for treating a disease, is sufficient to effect such treatment for the disease. The "therapeutically effective amount" will vary depending on the compound or the agent, the disease and its severity and the age, weight, etc., of the subject to be treated.

A "biological sample" encompasses a variety of sample types obtained from an individual and can be used in a diagnostic or monitoring assay. The definition encompasses blood and other liquid samples of biological origin, solid tissue samples such as a biopsy specimen or tissue cultures or cells derived therefrom and the progeny thereof. The definition also includes samples that have been manipulated in any way after their procurement, such as by treatment with reagents, solubilization, or enrichment for certain components, such as polynucleotides. The term "biological sample" encompasses a clinical sample, and also includes cells in culture, cell supernatants, cell lysates, serum, plasma, biological fluid, and tissue samples.

The terms "individual," "subject," "host," and "patient," used interchangeably herein, refer to a mammal, including, but not limited to, murines (rats, mice), non-human primates, humans, canines, felines, ungulates (e.g., equines, bovines, ovines, porcines, caprines), etc.

The term "Alzheimer's disease" (abbreviated herein as "AD") as used herein refers to a condition associated with formation of neuritic plaques comprising amyloid β protein primarily in the hippocampus and cerebral cortex, as well as impairment in both learning and memory. "AD" as used herein is meant to encompass both AD as well as AD-type pathologies.

The six possible apoE genotypes are as follows: E2/E2 (a.k.a "homozygous for the E2 allele"), E2/E3 (a.k.a "heterozygous E2/E3"), E2/E4 (a.k.a "heterozygous E2/E4"), E3/E3 (a.k.a "homozygous for the E3 allele"), E3/E4 (a.k.a "heterozygous E3/E4"), and E4/E4 (a.k.a "homozygous for the E4 allele"). The three ApoE protein isoforms differ only at two amino acid positions (amino acids 112 and 158), where either a cysteine or an arginine is present. Specifically, the ApoE2 protein isoform has Cys112, Cys158; the ApoE3 protein isoform has Cys112, Arg158; and the ApoE4 protein isoform has Arg112, Arg158 (numbering relative to mature polypeptide without signal peptide). The amino acid differences at these two positions affect the structure of the three ApoE isoforms and influence their ability to bind lipids, receptors and Aβ. The genomic sequence of human apoeE3 is provided by NCBI Reference Sequence: NG_007084.2 (SEQ ID NO:1). The genomic sequence of human apoeE4 is provided by GenBank Accession No. M10065, version M10065.1 (SEQ ID NO:2).

The subject to be treated in connection with the disclosed methods is homozygous for the E4 allele ("apoE4/4"). In some embodiments, the subject being treated is not heterozygous E3/E4. In some embodiments, the subject being treated is not homozygous for the E2 allele. In some embodiments, the subject being treated is not homozygous for the E3 allele. In some embodiments, the subject being treated is not heterozygous E2/E3.

As used herein, an "apoE4/4-associated disorder" is any disorder that is caused by the apoE4/4 genotype, and/or the resulting phenotype; any disorder that is characterized by the apoE4/4 genotype and/or the resulting phenotype; a symptom of a disorder that is caused by the apoE4/4 genotype and/or the resulting phenotype; a phenomenon associated with a disorder caused by the apoE4/4 genotype and/or the resulting phenotype; and the sequelae of any disorder that is caused by the apoE4/4 genotype and/or the resulting phenotype.

ApoE4/4-associated diseases/disorders include ApoE4/4-associated neurological disorders. ApoE4/4-associated diseases/disorders include, but are not limited to, sporadic Alzheimer's disease; familial Alzheimer's disease; poor outcome following a stroke; poor outcome following traumatic head injury; and cerebral ischemia. Phenomena associated with ApoE4/4-associated neurological disorders include, but are not limited to, phenomenon associated with Alzheimer's disease, neurofibrillary tangles; amyloid deposits; memory loss; a reduction in learning ability; and a reduction in cognitive function. ApoE4/4-related disorders associated with high serum lipid levels include, but are not limited to, atherosclerosis, and coronary artery disease. Phenomena associated with such ApoE4/4-associated disorders include high serum cholesterol levels.

The term "phenomenon associated with Alzheimer's disease" as used herein refers to a structural, molecular, or functional event associated with AD, including such an event that is readily assessable in an animal model. Such events include, but are not limited to, amyloid deposition, neuropathological developments, learning and memory deficits, and other AD-associated characteristics.

Where a range of values is provided, it is understood that each intervening value, to the tenth of the unit of the lower limit unless the context clearly dictates otherwise, between the upper and lower limit of that range and any other stated or intervening value in that stated range, is encompassed within the invention. The upper and lower limits of these smaller ranges may independently be included in the smaller ranges, and are also encompassed within the invention, subject to any specifically excluded limit in the stated range. Where the stated range includes one or both of the limits, ranges excluding either or both of those included limits are also included in the invention.

The publications discussed herein are provided solely for their disclosure prior to the filing date of the present application. Nothing herein is to be construed as an admission that the present invention is not entitled to antedate such publication. Further, the dates of publication provided may be different from the actual publication dates which may need to be independently confirmed.

DETAILED DESCRIPTION

Various aspects now will be described more fully hereinafter. Such aspects may, however, be embodied in many different forms and should not be construed as limited to the embodiments set forth herein; rather, these embodiments are provided so that this disclosure will be thorough and complete, and will fully convey its scope to those skilled in the art.

Alzheimer's disease (AD) is the leading cause of dementia worldwide, and, to date, no effective therapies are available. The complexity and multifactorial etiology of AD pose unique challenges for traditional drug development, and almost all efforts to target AD-related pathways in human trials have proven unsuccessful[1,2]. Although apolipoprotein (apo) E4 is the major genetic risk factor for AD[1,3-5] (60-80% of patients have at least one APOE4 allele and ~70% of homozygotes develop AD by age 85) 6,7, it has not been actively investigated for AD drug development[1,2].

Disclosed herein is an apoE-genotype-specific drug repositioning approach to screen for drugs useful in treating apoE4-related Alzheimer's Disease (AD). From a meta-analysis of human temporal lobar samples from public databases, apoE-genotype-specific transcriptomic signatures of AD were established and applied to a validated Connectivity Map (CMap) database containing transcriptomic perturbation signatures of existing drugs to identify those capable of perturbing an entire gene-expression network away from the apoE-genotype-driven disease state towards a normal state. The loop-diuretic bumetanide was the top predicted drug candidate for reversing the transcriptomic signature and gene expression pattern of the apoE4/4 AD phenotype. Furthermore, as discussed in the Examples provided herein, treating aged apoE4 knock-in (apoE4-KI) mice with bumetanide rescued cognitive deficits. Thus, bumetanide was found to be particularly useful for treating subjects having the apoE4/4 genotype, rescuing cognitive deficits associated with AD. Surprisingly, based on the disclosure provided herein, the effectiveness of bumetanide is thought to be specific to the apoE4/4 genotype, with the drug prediction score of bumetanide for the apoE3/4 genotype being even less indicative of efficacy than for the apoE3/3 genotype, as described in greater detail herein. Without intending to be bound by any particular theory, this may be due to significant differences between the apoE3/4 and apoE4/4 expression signatures.

Accordingly, in some aspects, a method of treating an ApoE4/4-associated neurological disorder, e.g., Alzheimer's Disease (AD), in a subject having an apoE4/4 genotype, by administering a therapeutically effective amount of bumetanide to the subject is provided. Related compositions, formulations, and kits are also described in greater detail below.

Methods of Treating a Subject Having an apoE4/4-Associated Neurological Disorder The present disclosure provides methods of treating a subject having an apoE4/4 associated neurological disorder, e.g., AD, in a subject having an apoE4/4 genotype. The methods generally involving administering to an individual in need thereof (e.g., an individual having AD and/or a disorder associated with the apoE4/4 genotype) an effective amount of bumetanide, alone (e.g., in monotherapy) or in combination (e.g., in combination therapy) with one or more additional therapeutic agents.

The present disclosure provides a method of treating the symptoms of AD in a subject having an apoE4/4 genotype, the method generally involving administering to an individual in need thereof a therapeutically effective amount of bumetanide. For example, in some embodiments, a therapeutically effective amount of bumetanide is an amount that, when administered alone (e.g., in monotherapy) or in combination (e.g., in combination therapy) with one or more additional therapeutic agents, in one or more doses, is effective to improve cognitive function in the individual being treated. For example, an effective amount of bumetanide can improve cognitive function in an individual by at least about 5%, at least about 10%, at least about 15%, at least about 20%, at least about 25%, at least about 30%, at least about 40%, at least about 50%, at least about 60%, at least about 65%, at least about 70%, at least about 75%, at least about 80%, at least about 85%, at least about 90%, at least about 95%, at least about 99%, or more, compared to the subject's cognitive function before or in the absence of treatment with bumetanide.

In some embodiments, an effective amount of bumetanide is an amount that, when administered alone (e.g., in monotherapy) or in combination (e.g., in combination therapy) with one or more additional therapeutic agents, in one or more doses, is effective to reduce an adverse symptom of AD or an apoE4/4-genotype associated disorder by at least at least about 5%, at least about 10%, at least about 15%, at least about 20%, at least about 25%, at least about 30%, at least about 40%, at least about 50%, at least about 60%, at least about 65%, at least about 70%, at least about 75%, at least about 80%, at least about 85%, at least about 90%, at least about 95%, at least about 99%, or more, compared to the severity of the adverse symptom in the absence of treatment with bumetanide.

In some embodiments, the present disclosure provides methods for inhibiting formation of neurofibrillary tangles in an individual, comprising administering an effective amount of bumetanide to the individual. Whether bumetanide reduces formation of neurofibrillary tangles and/or Aβ deposits can be determined in humans using any known method, including, but not limited to, immunohistochemical staining of brain biopsy samples.

Individuals known to be at risk of developing AD are amenable to treatment using a subject method. Thus, bumetanide is suitable for prophylactic use in patients who are homozygous for apoE4 but do not show overt symptoms of Alzheimer's disease or other neurodegenerative disorders.

The methods are also useful to treat an individual who already displays symptoms of AD, where the method treats AD by reducing advancement of the disease, or reduces severity of a symptom associated with AD. Whether advancement of AD is reduced or severity of an AD-related symptom is reduced can be determined by assessing any symptom or parameter associated with AD, including, but not limited to, cognitive function, and memory. Such determinations are well within the ability of those skilled in the art using standard methods known in the art.

Bumetanide (3-(butylamino)-4-phenoxy-5-sulfamoylbenzoic acid; MW 364.41) is a potent diuretic which, if given in excessive amounts, can lead to a profound diuresis with water and electrolyte depletion. As a diuretic, bumetanide works by causing the kidneys to get rid of unneeded water and salt from the body into the urine. FDA-approved bumetanide (Bumex™) is a loop diuretic—i.e., it acts at the ascending limb of the loop of Henle in the kidney—used to treat edema and/or high blood pressure caused by various medical conditions, including heart, kidney, and liver disease. Bumex™ is commercially available as scored tablets, 0.5 mg (light green), 1 mg (yellow) and 2 mg (peach) for oral administration; each tablet also contains lactose, magnesium stearate, microcrystalline cellulose, cornstarch and talc, with the following dye systems: 0.5 mg-D&C Yellow No. 10 and FD&C Blue No. 1; 1 mg-D&C Yellow No. 10; 2 mg-red iron oxide.

Dosages

A suitable dosage can be determined by an attending physician or other qualified medical personnel, based on various clinical factors. As is well known in the medical arts, dosages for any one patient depend upon many factors, including the patient's size, Body Mass Index (BMI), body surface area, age, the particular compound to be administered, sex of the patient, time, and route of administration, general health, and other drugs being administered concurrently. For example, bumetanide may be administered in amounts between 1 µg/kg body weight and 0.5 mg/kg body weight, inclusive, e.g. between 10 µg/kg body weight and 0.2 mg/kg body weight, inclusive, e.g. between 20 µg/kg body weight and 0.1 mg/kg body weight, inclusive, such as 30 µg/kg body weight to 50 µg/kg body weight, inclusive; however, doses below or above this exemplary range are envisioned, especially considering the aforementioned factors. In some embodiments, bumetanide may be administered in an amount from 0.01 mg/kg body weight to 0.2 mg/kg body weight, inclusive, e.g., 0.02 mg/kg body weight to 0.1 mg/kg body weight, inclusive, 0.03 mg/kg body weight to 0.09 mg/kg body weight, inclusive, 0.04 mg/kg body weight to 0.08 mg/kg body weight, inclusive, or 0.05 mg/kg body weight to 0.07 mg/kg body weight, inclusive. In some embodiments, if the regimen is a continuous infusion, it can also be in the range of 0.5 to 2 mg/hr. In some embodiments, bumetanide is administered at a dosage of from 0.5 mg to 10 mg, such as 0.6 mg to 9 mg, 0.7 mg to 8 mg, 0.8 mg to 7 mg, 0.9 mg to 6 mg, 1 mg to 5 mg, or 2 mg to 4 mg. In some embodiments, bumetanide is administered at a dosage of 0.5 mg, 0.6 mg, 0.7 mg, 0.8 mg, 0.9 mg, 1 mg, 2 mg, 3 mg, 4 mg, 5 mg, 6 mg, 7 mg, 8 mg, 9 mg or 10 mg, e.g., on a once or twice a day basis.

Thus, in some embodiments, a method of treating AD in a subject having an apoE4/4 genotype is provided, wherein the method includes administering bumetanide to the subject at a dose of 0.05 mg/kg/day or less, e.g., 0.02 mg/kg/day or less. Those of skill will readily appreciate that dose levels can vary as a function of the specific composition, the severity of the symptoms and the susceptibility of the subject to side effects. Preferred dosages for a given compound are readily determinable by those of skill in the art by a variety of means.

Routes of Administration

Bumetanide may be administered to an individual using any suitable method and route for drug delivery, including in vivo and ex vivo methods, as well as systemic and localized routes of administration. Conventional and pharmaceutically acceptable routes of administration include, but are not necessarily limited to, intranasal, intramuscular, intratracheal, subcutaneous, intradermal, topical application, intravenous, intraarterial, rectal, nasal, oral, and other enteral and parenteral or inhalational routes of administration. Routes of administration may be combined, if desired, or adjusted depending upon the composition and/or the desired effect. A bumetanide composition can be administered in a single dose or in multiple doses. In some embodiments, a bumetanide composition is administered orally. In some embodiments, a bumetanide composition is administered via an inhalational route. In some embodiments, a bumetanide composition is administered intranasally. In some embodiments, a bumetanide composition is administered locally. In some embodiments, a bumetanide composition is administered intracranially. In some embodiments, a bumetanide composition is administered intravenously.

Parenteral routes of administration other than inhalation administration include, but are not necessarily limited to, topical, transdermal, subcutaneous, intramuscular, intraorbital, intracapsular, intraspinal, intrasternal, and intravenous routes, i.e., any route of administration other than through the alimentary canal. Parenteral administration can be carried to effect systemic or local delivery of bumetanide. Where systemic delivery is desired, administration typically involves invasive or systemically absorbed topical or mucosal administration of pharmaceutical preparations.

Bumetanide can also be delivered to the subject by enteral administration. Enteral routes of administration include, but are not necessarily limited to, oral and rectal (e.g., using a suppository) delivery.

In some embodiments, bumetanide is administered by injection and/or delivery, e.g., to a site in a brain artery or directly into brain tissue. Bumetanide can also be administered directly to a target site (e.g., a brain region containing amyloid plaques), e.g., by biolistic delivery to the target site.

In some embodiments, the method disclosed herein is effective to ameliorate at least one phenomenon associated with an ApoE4/4-associated neurological disorder, where such phenomena include, e.g., neurofibrillary tangles; amyloid deposits; memory loss; reduced ability to learn or retain learned behavior; and a reduction in cognitive function. Thus, for example, a subject method is effective to reduce memory loss and at least slow the reduction in cognitive function. For example, a subject method is effective to increase memory function and/or to increase cognitive function. Thus, for example, an effective amount of bumetanide may reduce neurofibrillary tangles and/or amyloid plaques, when administered in one or more doses, in monotherapy or in combination therapy, to reduce memory loss, to increase memory functions, to reduce loss of cognitive function, or to increase cognitive function.

In some embodiments, the effectiveness of the method may be monitored (e.g., an individual who has been treated for an AD or ApoE4/4-associated disease or disorder with bumetanide) may be monitored for response to the bumetanide treatment and/or progression/regression of the disorder. In such embodiments, bumetanide is administered to an individual, and cognitive function is measured and compared to baseline measurement and/or presence of neurofibrillary tangles is assessed in brain tissue in the individual. For example, a baseline measure of symptoms of AD or an ApoE4/4-associated disease or disorder can be taken, and then the method can be carried out on an individual, and then a post-treatment measurement can be taken at one or several time points after the individual has begun treatment for the disorder. A measurement indicating an improvement in the symptom, or a regression of the disease or disorder in the subject/individual can provide an indication of efficacious treatment, and a decision can be made as to whether the treatment should be continued, the dosing regimen should be modified, or the drug being administered should be changed.

In some embodiments, the method of treatment can be carried out on an individual within a single day or multiple days, over the course of a single week or multiple weeks, over a single month, or for two months, three months, six months, or more than six months, measured from the beginning of bumetanide treatment for the ApoE4/4-associated disorder. A subject method can be carried out more than once on an individual.

Compositions

The present disclosure provides compositions, including pharmaceutical compositions, comprising bumetanide for use in connection with the disclosed methods and kits. In general, a formulation comprises an effective amount of bumetanide. An "effective amount" means a dosage sufficient to produce a desired result, e.g., reduction in an amyloid plaque, amelioration of a symptom of an ApoE4/4-associated disorder (for example, sporadic or familial Alzheimer's disease (AD); Alzheimer's disease; poor outcome following a stroke; poor outcome following traumatic head injury; cerebral ischemia; neurofibrillary tangles; amyloid deposits; memory loss; a reduction in learning ability; and a reduction in cognitive function; high serum lipid and/cholesterol or levels; atherosclerosis; and/or coronary artery disease). Generally, the desired result is at least a reduction in a symptom of an ApoE4/4-associated disorder such as AD, as compared to a control. Bumetanide can be delivered in such a manner as to avoid the blood-brain barrier, as described in more detail below. A subject composition can be formulated and/or modified to enable the composition to cross the blood-brain barrier.

Formulations

In the subject methods, a bumetanide composition can be administered to the host using any convenient means capable of resulting in the desired therapeutic effect or diagnostic effect. Thus, the agent can be incorporated into a variety of formulations for therapeutic administration. More particularly, bumetanide can be formulated into pharmaceutical compositions by combination with appropriate, pharmaceutically acceptable carriers or diluents, and may be formulated into preparations in solid, semi-solid, liquid or gaseous forms, such as tablets, capsules, powders, granules, ointments, solutions, suppositories, injections, inhalants and aerosols.

In pharmaceutical dosage forms, bumetanide can be administered in the form of a pharmaceutically acceptable salt, or may also be used alone or in appropriate association, as well as in combination, with other pharmaceutically active compounds. The following methods and excipients are merely exemplary and are in no way limiting.

For oral preparations, bumetanide can be used alone or in combination with appropriate additives to make tablets, powders, granules or capsules, for example, with conventional additives, such as lactose, mannitol, corn starch or potato starch; with binders, such as crystalline cellulose, cellulose derivatives, acacia, corn starch or gelatins; with disintegrators, such as corn starch, potato starch or sodium carboxymethylcellulose; with lubricants, such as talc or magnesium stearate; and if desired, with diluents, buffering agents, moistening agents, preservatives and flavoring agents.

Bumetanide can be formulated into syringeable preparations for injection by dissolving, suspending or emulsifying them in an aqueous or nonaqueous solvent, such as vegetable or other similar oils, synthetic aliphatic acid glycerides, esters of higher aliphatic acids or propylene glycol; and if desired, with conventional additives such as solubilizers, isotonic agents, suspending agents, emulsifying agents, stabilizers and preservatives. In some embodiments, bumetanide is administered orally, in the form of a tablet. Bumex™.

Pharmaceutical compositions comprising bumetanide are prepared by mixing the bumetanide having the desired degree of purity with optional physiologically acceptable carriers, excipients, stabilizers, surfactants, buffers and/or tonicity agents. Acceptable carriers, excipients and/or stabilizers are nontoxic to recipients at the dosages and concentrations employed, and include buffers such as phosphate, citrate, and other organic acids; antioxidants including ascorbic acid, glutathione, cysteine, methionine and citric acid; preservatives (such as ethanol, benzyl alcohol, phenol, m-cresol, p-chlor-m-cresol, methyl or propyl parabens, benzalkonium chloride, or combinations thereof); amino acids such as arginine, glycine, ornithine, lysine, histidine, glutamic acid, aspartic acid, isoleucine, leucine, alanine, phenylalanine, tyrosine, tryptophan, methionine, serine, proline and combinations thereof; monosaccharides, disaccharides and other carbohydrates; low molecular weight (less than about 10 residues) polypeptides; proteins, such as gelatin or serum albumin; chelating agents such as EDTA; sugars such as trehalose, sucrose, lactose, glucose, mannose, maltose, galactose, fructose, sorbose, raffinose, glucosamine, N-Methylglucosamine, galactosamine, and neuraminic acid; and/or non-ionic surfactants such as Tween, Brij Pluronics, Triton-X or polyethylene glycol (PEG).

The pharmaceutical composition may be in a liquid form, a lyophilized form or a liquid form reconstituted from a lyophilized form, wherein the lyophilized preparation is to be reconstituted with a sterile solution prior to administration. The standard procedure for reconstituting a lyophilized composition is to add back a volume of pure water (typically equivalent to the volume removed during lyophilization); however solutions comprising antibacterial agents may be used for the production of pharmaceutical compositions for parenteral administration; see also Chen (1992) Drug Dev Ind Pharm 18, 1311-54.

Exemplary bumetanide concentrations in a subject pharmaceutical formulation may range from about 1 mg/mL to about 200 mg/ml or from about 50 mg/mL to about 200 mg/mL, or from about 150 mg/mL to about 200 mg/mL.

An aqueous formulation of bumetanide may be prepared in a pH-buffered solution, e.g., at pH ranging from about 4.0 to about 8.5, or from about 5.0 to about 6.0, or alternatively about 5.5. Examples of buffers that are suitable for a pH within this range include phosphate-, histidine-, citrate-, succinate-, acetate-buffers and other organic acid buffers. The buffer concentration can be from about 1 mM to about 100 mM, or from about 5 mM to about 50 mM, depending, e.g., on the buffer and the desired tonicity of the formulation.

A tonicity agent may be included in the bumetanide formulation to modulate the tonicity of the formulation. Exemplary tonicity agents include sodium chloride, potassium chloride, glycerin and any component from the group of amino acids, sugars as well as combinations thereof. In some embodiments, the aqueous formulation is isotonic, although hypertonic or hypotonic solutions may be suitable. The term "isotonic" denotes a solution having the same tonicity as some other solution with which it is compared, such as physiological salt solution or serum. Tonicity agents may be used in an amount of about 5 mM to about 350 mM, e.g., in an amount of 100 mM to 350 nM.

A surfactant may also be added to the bumetanide formulation to reduce aggregation and/or minimize the formation of particulates in the formulation and/or reduce adsorption. Exemplary surfactants include polyoxyethylensorbitan fatty acid esters (Tween), polyoxyethylene alkyl ethers (Brij), alkylphenylpolyoxyethylene ethers (Triton-X), polyoxyethylene-polyoxypropylene copolymer (Poloxamer, Pluronic), and sodium dodecyl sulfate (SDS). Examples of suitable polyoxyethylenesorbitan-fatty acid esters are polysorbate 20, (sold under the trademark Tween 20™) and polysorbate 80 (sold under the trademark Tween 80™). Examples of suitable polyethylene-polypropylene copolymers are those sold under the names Pluronic® F68 or Poloxamer 188™. Examples of suitable Polyoxyethylene alkyl ethers are those sold under the trademark Brij™. Exemplary concentrations of surfactant may range from about 0.001% to about 1% w/v.

A lyoprotectant may also be added in order to protect the labile active ingredient (e.g. a protein) against destabilizing conditions during the lyophilization process. For example, known lyoprotectants include sugars (including glucose and sucrose); polyols (including mannitol, sorbitol and glycerol); and amino acids (including alanine, glycine and glutamic acid). Lyoprotectants can be included in an amount of about 10 mM to 500 nM.

In some embodiments, a subject formulation includes bumetanide, and one or more of the above-identified agents (e.g., a surfactant, a buffer, a stabilizer, a tonicity agent) and is essentially free of one or more preservatives, such as ethanol, benzyl alcohol, phenol, m-cresol, p-chlor-m-cresol, methyl or propyl parabens, benzalkonium chloride, and combinations thereof. In other embodiments, a preservative is included in the formulation, e.g., at concentrations ranging from about 0.001 to about 2% (w/v).

For example, a subject formulation can be a liquid or lyophilized formulation suitable for parenteral administration, and can comprise: about 1 mg/mL to about 200 mg/ml of bumetanide; about 0.001% to about 1% of at least one surfactant; about 1 mM to about 100 mM of a buffer; optionally about 10 mM to about 500 mM of a stabilizer; and about 5 mM to about 305 mM of a tonicity agent; and has a pH of about 4.0 to about 7.0.

As another example, a subject parenteral formulation is a liquid or lyophilized formulation comprising: about 1 mg/mL to about 200 mg/mL of bumetanide; 0.04% Tween 20 w/v; 20 mM L-histidine; and 250 mM Sucrose; and has a pH of 5.5.

As another example, a subject parenteral formulation comprises a lyophilized formulation comprising: 1) 15 mg/mL of bumetanide; 0.04% Tween 20 w/v; 20 mM L-histidine; and 250 mM sucrose; and has a pH of 5.5; or 2) 75 mg/mL of bumetanide; 0.04% Tween 20 w/v; 20 mM L-histidine; and 250 mM sucrose; and has a pH of 5.5; or 3) 75 mg/mL of bumetanide; 0.02% Tween 20 w/v; 20 mM L-histidine; and 250 mM Sucrose; and has a pH of 5.5; or 4) 75 mg/mL of bumetanide; 0.04% Tween 20 w/v; 20 mM L-histidine; and 250 mM trehalose; and has a pH of 5.5; or 6) 75 mg/mL of bumetanide; 0.02% Tween 20 w/v; 20 mM L-histidine; and 250 mM trehalose; and has a pH of 5.5.

As another example, a subject parenteral formulation is a liquid formulation comprising: 1) 7.5 mg/mL of bumetanide; 0.022% Tween 20 w/v; 120 mM L-histidine; and 250 125 mM sucrose; and has a pH of 5.5; or 2) 37.5 mg/mL of bumetanide; 0.02% Tween 20 w/v; 10 mM L-histidine; and 125 mM sucrose; and has a pH of 5.5; or 3) 37.5 mg/mL of bumetanide; 0.01% Tween 20 w/v; 10 mM L-histidine; and 125 mM sucrose; and has a pH of 5.5; or 4) 37.5 mg/mL of bumetanide; 0.02% Tween 20 w/v; 10 mM L-histidine; 125 mM trehalose; and has a pH of 5.5; or 5) 37.5 mg/mL of bumetanide; 0.01% Tween 20 w/v; 10 mM L-histidine; and 125 mM trehalose; and has a pH of 5.5; or 6) 5 mg/mL of bumetanide; 0.02% Tween 20 w/v; 20 mM L-histidine; and 250 mM trehalose; and has a pH of 5.5; or 7) 75 mg/mL of bumetanide; 0.02% Tween 20 w/v; 20 mM L-histidine; and 250 mM mannitol; and has a pH of 5.5; or 8) 75 mg/mL of bumetanide; 0.02% Tween 20 w/v; 20 mM L histidine; and 140 mM sodium chloride; and has a pH of 5.5; or 9) 150 mg/mL of bumetanide; 0.02% Tween 20 w/v; 20 mM L-histidine; and 250 mM trehalose; and has a pH of 5.5; or 10) 150 mg/mL of bumetanide; 0.02% Tween 20 w/v; 20 mM L-histidine; and 250 mM mannitol; and has a pH of 5.5; or 11) 150 mg/mL of bumetanide; 0.02% Tween 20 w/v; 20 mM L-histidine; and 140 mM sodium chloride; and has a pH of 5.5; or 12) 10 mg/mL of bumetanide; 0.01% Tween 20 w/v; 20 mM L-histidine; and 40 mM sodium chloride; and has a pH of 5.5.

Bumetanide can be utilized in aerosol formulation to be administered via inhalation. Bumetanide can be formulated into pressurized acceptable propellants such as dichlorodifluoromethane, propane, nitrogen and the like.

Furthermore, bumetanide can be made into suppositories by mixing with a variety of bases such as emulsifying bases or water-soluble bases. Bumetanide can be administered rectally via a suppository. The suppository can include vehicles such as cocoa butter, carbowaxes and polyethylene glycols, which melt at body temperature, yet are solidified at room temperature.

Unit dosage forms for oral or rectal administration such as syrups, elixirs, and suspensions may be provided wherein each dosage unit, for example, teaspoonful, tablespoonful, tablet or suppository, contains a predetermined amount of the composition containing one or more inhibitors. Similarly, unit dosage forms for injection or intravenous administration may comprise bumetanide in a composition as a solution in sterile water, normal saline or another pharmaceutically acceptable carrier.

The term "unit dosage form," as used herein, refers to physically discrete units suitable as unitary dosages for human and animal subjects, each unit containing a predetermined quantity of compounds of the present invention calculated in an amount sufficient to produce the desired effect in association with a pharmaceutically acceptable diluent, carrier or vehicle. The specifications for bumetanide may depend on the purity or concentration of bumetanide in the composition employed and the effect to be achieved, and the pharmacodynamics associated with the composition in the host.

Other modes of administration will also find use with the subject methods. For instance, bumetanide can be formulated in suppositories and, in some cases, aerosol and intranasal compositions. For suppositories, the vehicle composition will include traditional binders and carriers such as, polyalkylene glycols, or triglycerides. Such suppositories may be formed from mixtures containing the active ingredient in the range of about 0.5% to about 10% (w/w), e.g., about 1% to about 2%.

Intranasal formulations will usually include vehicles that neither cause irritation to the nasal mucosa nor significantly disturb ciliary function. Diluents such as water, aqueous saline or other known substances can be employed with the subject invention. The nasal formulations may also contain preservatives such as, but not limited to, chlorobutanol and benzalkonium chloride. A surfactant may be present to enhance absorption of the subject proteins by the nasal mucosa.

Bumetanide can be administered as an injectable formulation. Typically, injectable compositions are prepared as liquid solutions or suspensions; solid forms suitable for solution in, or suspension in, liquid vehicles prior to injection may also be prepared. The preparation may also be emulsified or the bumetanide encapsulated in liposome vehicles.

Suitable excipient vehicles are, for example, water, saline, dextrose, glycerol, ethanol, or the like, and combinations thereof. In addition, if desired, the vehicle may contain minor amounts of auxiliary substances such as wetting or emulsifying agents or pH buffering agents. Actual methods of preparing such dosage forms are known, or will be apparent, to those skilled in the art. See, e.g., Remington's Pharmaceutical Sciences, Mack Publishing Company, Easton, Pennsylvania, 17th edition, 1985. The composition or formulation to be administered will, in any event, contain a quantity of bumetanide adequate to achieve the desired state in the subject being treated.

The pharmaceutically acceptable excipients, such as vehicles, adjuvants, carriers or diluents, are readily available to the public. Moreover, pharmaceutically acceptable auxiliary substances, such as pH adjusting and buffering agents, tonicity adjusting agents, stabilizers, wetting agents and the like, are readily available to the public.

In some embodiments, bumetanide is formulated in a controlled release formulation. Sustained-release preparations may be prepared using methods well known in the art. Suitable examples of sustained-release preparations include semipermeable matrices of solid hydrophobic polymers containing the bumetanide in which the matrices are in the form of shaped articles, e.g. films or microcapsules. Examples of sustained-release matrices include polyesters, copolymers of L-glutamic acid and ethyl-L-glutamate, non-degradable ethylene-vinyl acetate, hydrogels, polylactides, degradable lactic acid-glycolic acid copolymers and poly-D-(-)-3-hydroxybutyric acid. Possible loss of biological activity and possible changes in immunogenicity of antibodies comprised in sustained-release preparations may be prevented by using appropriate additives, by controlling moisture content and by developing specific polymer matrix compositions.

Controlled release within the scope of this invention can be taken to mean any one of a number of extended release dosage forms. The following terms may be considered to be substantially equivalent to controlled release, for the purposes of the present invention: continuous release, controlled release, delayed release, depot, gradual release, long-term release, programmed release, prolonged release, proportionate release, protracted release, repository, retard, slow release, spaced release, sustained release, time coat, timed release, delayed action, extended action, layered-time action, long acting, prolonged action, repeated action, slowing acting, sustained action, sustained-action medications, and extended release. Further discussions of these terms may be found in Lesczek Krowczynski, Extended-Release Dosage Forms, 1987 (CRC Press, Inc.).

The various controlled release technologies cover a very broad spectrum of drug dosage forms. Controlled release technologies include, but are not limited to physical systems and chemical systems.

Physical systems include, but are not limited to, reservoir systems with rate-controlling membranes, such as microencapsulation, macroencapsulation, and membrane systems; reservoir systems without rate-controlling membranes, such as hollow fibers, ultra microporous cellulose triacetate, and porous polymeric substrates and foams; monolithic systems, including those systems physically dissolved in non-porous, polymeric, or elastomeric matrices (e.g., nonerodible, erodible, environmental agent ingression, and degradable), and materials physically dispersed in non-porous, polymeric, or elastomeric matrices (e.g., nonerodible, erodible, environmental agent ingression, and degradable); laminated structures, including reservoir layers chemically similar or dissimilar to outer control layers; and other physical methods, such as osmotic pumps, or adsorption onto ion-exchange resins.

Chemical systems include, but are not limited to, chemical erosion of polymer matrices (e.g., heterogeneous, or homogeneous erosion), or biological erosion of a polymer matrix (e.g., heterogeneous, or homogeneous). Additional discussion of categories of systems for controlled release may be found in Agis F. Kydonieus, Controlled Release Technologies: Methods, Theory and Applications, 1980 (CRC Press, Inc.).

There are a number of controlled release drug formulations that are developed for oral administration. These include, but are not limited to, osmotic pressure-controlled gastrointestinal delivery systems; hydrodynamic pressure-controlled gastrointestinal delivery systems; membrane permeation-controlled gastrointestinal delivery systems, which include microporous membrane permeation-controlled gastrointestinal delivery devices; gastric fluid-resistant intestine targeted controlled-release gastrointestinal delivery devices; gel diffusion-controlled gastrointestinal delivery systems; and ion-exchange-controlled gastrointestinal delivery systems, which include cationic and anionic drugs. Additional information regarding controlled release drug delivery systems may be found in Yie W. Chien, Novel Drug Delivery Systems, 1992 (Marcel Dekker, Inc.). Some of these formulations will now be discussed in more detail.

Combination Therapy

In some embodiments, a subject treatment method involves administering bumetanide and one or more additional therapeutic agents. The U.S. Food and Drug Administration (FDA) has approved two types of medications-cholinesterase inhibitors (e.g., Aricept (donepezil), Exelon (rivastigmine), Razadyne (galantamine)) and memantine (Namenda)—to treat the cognitive symptoms (memory loss, confusion, and problems with thinking and reasoning) of AD. There is also a medication that combines one of the cholinesterase inhibitors (donepezil) with memantine called Namzaric.

Suitable additional therapeutic agents include, but are not limited to, acetylcholinesterase inhibitors, including, but not limited to, Aricept (donepezil), Exelon (rivastigmine), metrifonate, and tacrine (Cognex); non-steroidal anti-inflammatory agents, including, but not limited to, ibuprofen and indomethacin; cyclooxygenase-2 (Cox2) inhibitors such as Celebrex; and monoamine oxidase inhibitors, such as Selegilene (Eldepryl or Deprenyl). Dosages for each of the above agents are known in the art. For example, Aricept is generally administered at 50 mg orally per day for 6 weeks, and, if well tolerated by the individual, at 10 mg per day thereafter.

In some embodiments, a subject combination therapy comprises administration of effective amounts of bumetanide and an agent that inhibits apoE4 protein domain interaction (e.g., an agent as described in U.S. Patent Publication No. 2006/0073104); and in Ye et al. (2005) *Proc. Natl. Acad. Sci. USA* 102:18700.

In some embodiments, a subject combination therapy comprises administration of effective amounts of bumetanide and an acetylcholinesterase inhibitor. In some embodiments, a subject combination therapy comprises administration of effective amounts of bumetanide and an anti-inflammatory agent.

Subjects Suitable for Treatment

A variety of subjects are suitable for treatment with a subject method. Suitable subjects include any individual, especially a mammal, and particularly a human, who has AD or an ApoE4/4-associated disorder, who has been diagnosed with AD or an ApoE4/4-associated disorder, who is at risk for developing AD or an apoE4/4-associated disorder, who has had AD or an apoE4/4-associated disorder and is at risk for recurrence of the AD or ApoE4/4-associated disorder, or who is recovering from AD or an ApoE4/4-associated disorder.

Subjects suitable for treatment with a subject method include individuals who have two apoE4 alleles. In other words, suitable subjects include those who are homozygous for apoE4. In some embodiments, the subject has been diagnosed as having Alzheimer's disease.

Identification of Subjects Having an apoE4/4 Genotype

As discussed herein, in some aspects the disclosed methods and/or use of the disclosed kits involve identification of a subject as having an apoE4/4 genotype. A subject identification method can be carried out in vitro on a biological sample obtained from an individual. Thus, the present disclosure provides a method of detecting the apoE genotype of a subject in a biological sample of DNA, extracted from a tissue sample such as a blood, hair, or epithelial cell sample (e.g., from a cheek swab). The biological sample can be, e.g., a brain sample obtained from an individual postmortem.

Methods of genotype testing are known in the art. For example, a subject's apoE genotype can be obtained through analysis of peripheral blood samples using restriction isotyping and/or PCR-based methods. Typically, blood for genotyping (approximately 6cc) is drawn and DNA extracted for analysis. DNA samples can be genotyped using, for example, Taqman ready to use assays from both SNP's that constitute the apoE genotype according to TaqMan Gene Expression Assays, available from Applied Biosystems. Alternatively, a rapid, semiautomated method for apoE genotyping has been developed. (Guo, et al., (1993) *Genome Res.* 2:348-350). Genotyping for APOE-ε4 also may be performed according to the restriction isotyping protocol of Hixson and Vernier as previously reported in detail. (Hixson J., Vernier D. (1990) "Restriction isotyping of human apolipoprotein E by gene amplification and cleavage with HhaI." *J. Lipid Res.* 31:545-548). Recently, in a study by Huang, et al. (2018), DNA was extracted from 2 ml intravenous peripheral blood (stored in −80° C.) by using a Wizare genomic DNA purification kit (Promega, Madison, WI, USA). PCR amplification and restriction fragment length polymorphism (RFLP) analysis were performed according to the method described by Hixson (supra), using specific primers used for ApoE genotyping (forward, 5'-GGCACGGCTGTCCAAGGA-3' (SEQ ID NO: 3); reverse, 5'-GCCCCGGCCTGGTACACTGCC-3' (SEQ ID NO: 4)). 20% of DNA samples were genotyped again by different operators for the purpose of quality control. For ApoE genotypes, subjects with the E2/E2 and E2/E3 genotypes were grouped as E2 carrier; subjects with E3/E3 were classified as E3 homozygote; and subjects with E3/E4 or E4/E4 were grouped as E4 carrier. (Huang, et al., (2018) *Frontiers Endocrinology* 9 (71)).

Kits

The present disclosure provides a kit (e.g., a test kit) that includes a composition comprising bumetanide. A subject kit is useful in carrying out a subject treatment method.

Other optional components of the kit include: a buffer; a detectable label; an instruction leaflet; etc. The various components of the kit may be present in separate containers or certain compatible components may be pre-combined into a single container, as desired.

In addition to above-mentioned components, a subject kit can include instructions for using the components of the kit to practice a subject method. The instructions for practicing a subject method are generally recorded on a suitable recording medium. For example, the instructions may be printed on a substrate, such as paper or plastic, etc. As such, the instructions may be present in the kits as a package insert, in the labeling of the container of the kit or components thereof (i.e., associated with the packaging or sub-packaging) etc. In other embodiments, the instructions are present as an electronic storage data file present on a suitable computer readable storage medium, e.g. compact disc-read only memory (CD-ROM), digital versatile disk (DVD), diskette, etc. In yet other embodiments, the actual instructions are not present in the kit, but means for obtaining the instructions from a remote source, e.g. via the internet, are provided. An example of this embodiment is a kit that includes a web address where the instructions can be viewed and/or from which the instructions can be downloaded. As with the instructions, this means for obtaining the instructions is recorded on a suitable substrate.

Kits with unit doses of bumetanide, e.g. in oral or injectable doses, are provided. In such kits, in addition to the containers containing the unit doses will be an informational (electronic or paper) insert describing the use and attendant benefits of the composition in treating pathological condition of interest. Preferred compounds and unit doses are those described herein.

In specific embodiments, a kit according to the present disclosure includes information, in electronic or paper form, including instructions for administration of bumetanide to a subject having an apoE4/4 genotype, e.g., at a dose of 0.05 mg/kg/day or less of bumetanide, e.g., 0.02 mg/kg/day or less of bumetanide.

In another aspect, the present disclosure provides a kit for identifying and treating a subject having the apoE4/4 genotype with bumetanide, as well as instructions for use. In some embodiments, the kit comprises, a bumetanide formulation for treating a subject having the apoE4/4 genotype. The kit may include a container for holding a biological sample isolated from a human subject suspected of having AD; and, optionally, an agent that specifically detects and/or amplifies the apoE4 allele and allows identification of a subject having the apoE4/4 genotype, and electronic or paper instructions for reacting the agent with the biological sample or a portion of the biological sample to detect the presence or amount of at the apoE4 allele in the biological sample. The components of the kit may be packaged in separate containers. The kit may further comprise one or more control reference samples and reagents for performing PCR or microarray analysis for detection of one or more apoE4 alleles, as described herein.

In certain embodiments, the kit includes agents for detecting polynucleotides of an apoE4 allele from a biological sample. Furthermore, the kit may include agent(s) for detecting one or more additional alleles, such as the apoE2 and/or apoE3 allele(s), which agent(s) can be used alone or together in any combination, and/or in combination with clinical parameters for identifying a subject having the apoE4/4 genotype.

In certain embodiments, the kit comprises a microarray for analysis of a plurality of apoE alleles or AD-related genotypes. In one embodiment, the kit comprises a microarray comprising an oligonucleotide that hybridizes to an apoE polynucleotide.

In one aspect, a kit is provided for identifying a subject having an apoE4/4 genotype. For example, the kit can be used to detect any one or more of the biomarkers associated with Alzheimer's disease, as described herein, including detection of the apoE4/4 genotype of a subject, and in particular, allowing identification of a subject having the apoE4/4 genotype, from a biological sample from a healthy subject or a subject having AD.

In certain embodiments, the kit comprises a microarray for analysis of a plurality of biomarker polynucleotides, including one or more polynucleotides allowing identification of a subject's apoE genotype. An exemplary microarray included in the kit comprises an oligonucleotide that hybridizes to an apoE2 allele polynucleotide, an oligonucleotide that hybridizes to an apoE3 allele polynucleotide, and/or an oligonucleotide that hybridizes to an apoE4 allele polynucleotide, or any combination or subcombination thereof.

The kit can comprise one or more containers for compositions contained in the kit. Compositions can be in liquid form or can be lyophilized. Suitable containers for the compositions include, for example, bottles, vials, syringes, and test tubes. Containers can be formed from a variety of materials, including glass or plastic. The kit can also comprise a package insert containing electronic or paper written instructions for methods of using the kit.

Exemplary Non-Limiting Aspects of the Disclosure

Aspects, including embodiments, of the present subject matter described above may be beneficial alone or in combination, with one or more other aspects or embodiments. Without limiting the foregoing description, certain non-limiting aspects of the disclosure are provided below. As will be apparent to those of ordinary skill in the art upon reading this disclosure, each of the individually numbered aspects may be used or combined with any of the preceding or following individually numbered aspects. This is intended to provide support for all such combinations of aspects and is not limited to combinations of aspects explicitly provided below. It will be apparent to one of ordinary skill in the art that various changes and modifications can be made without departing from the spirit or scope of the invention.

1. A method of treating Alzheimer's Disease (AD) in a subject having an apoE4/4 genotype, the method comprising administering a therapeutically effective amount of bumetanide to the subject.

2. The method of 1, wherein the administering comprises administering bumetanide to the subject at a dose of 0.05 mg/kg/day or less.

3. The method of 2, wherein the administering comprises administering bumetanide to the subject at a dose of 0.02 mg/kg/day or less.

4. The method of any one of 1-3, wherein the bumetanide is formulated as an oral dosage form comprising a pharmaceutically acceptable carrier, and wherein the oral dosage form is administered orally.

5. The method of 4, wherein the oral dosage form is administered once daily as a capsule, a tablet, a disintegrating tablet or lozenge, or a sachet.

6 The method of any one of 1-3, wherein the bumetanide is administered intravenously or parenterally.

7. The method of any one of 1-3, wherein the bumetanide is provided in a transdermal patch.

8. The method of any one of 1-7, wherein the subject is a mammal.

9. The method of 8, wherein the mammal is a human.

10. A method of treating Alzheimer's Disease in a subject having an apoE4/4 genotype, the method comprising:
  a) identifying a subject as having an apoE4/4 genotype; and
  b) administering a therapeutically effective amount of bumetanide to the subject.

11. The method of 10, wherein the identifying comprises performing a PCR-based DNA analytic method on a biological sample from the subject.

12. The method of 11, further comprising isolating the biological sample from the subject.

13. The method of any one of 10-12, wherein the administering comprises administering bumetanide to the subject as a dose of 0.05 mg/kg/day or less.

14. The method of 13, wherein the administering comprises administering bumetanide to the subject as a dose of 0.02 mg/kg/day or less.

15. The method of any one of 10-14, wherein the bumetanide is formulated as an oral dosage form comprising a pharmaceutically acceptable carrier, and wherein the oral dosage form is administered orally.

16. The method of 15, wherein the oral dosage form is administered once daily as a capsule, a tablet, a disintegrating tablet or lozenge, or a sachet.

17. The method of any one of 10-14, wherein the bumetanide is administered intravenously or parenterally.

18. The method of any one of 10-14, wherein the bumetanide is provided in a transdermal patch.

19. The method of any one of 10-18, wherein the subject is a mammal.

20. The method of 19, wherein the mammal is a human.

21. A kit, comprising:
  a) a bumetanide formulation;
  b) a package; and
  c) information, in electronic or paper form, comprising instructions for administration of bumetanide to a subject having an apoE4/4 genotype.

22. The kit of 21, wherein the instructions specify that administration of the bumetanide formulation to the subject is based on subject weight, and weight and or volume of the formulation administered.

23. The kit of 22, wherein the instructions comprise instructions to administer the formulation to the subject at a dose of 0.05 mg/kg/day or less of bumetanide.

24. The kit of 23, wherein the instructions comprise instructions to administer the formulation to the subject at a dose of 0.02 mg/kg/day or less of bumetanide.

25. The kit of any one of 21-24, further comprising a container for holding a biological sample isolated from a subject to be tested for one or more apoE genotypes.

26. The kit of 25, further comprising one or more reagents for performing PCR or microarray analysis to allow specific detection of an apoE4 allele in the biological sample, and electronic or paper instructions for reacting the reagents with the biological sample.

27. The kit of 26, further comprising one or more control reference samples.

28. The kit of any one of 21-27, wherein the bumetanide formulation is in the form of a capsule, a tablet, a disintegrating tablet or lozenge, or a sachet for oral delivery.

29. The kit of any one of 21-27, wherein the bumetanide formulation is syringeable for intravenous or parenteral delivery.

30. The kit of any one of 21-27, wherein the bumetanide formulation is in the form of a transdermal patch.

31. A kit, comprising:
   a) a container comprising one or more doses of a formulation comprising a pharmaceutically acceptable carrier and bumetanide; and
   b) electronic or paper instructions for treating a subject having an apoE4/4 genotype.

32. The kit of 31, wherein each dose of the formulation does not comprise more than 2 mg of bumetanide.

33. The kit of 32, wherein each dose of the formulation does not comprise more than 1 mg of bumetanide.

34. The kit of any one of 31-33, wherein the dose is formulated for oral administration.

35. The kit of 34, wherein the dose for oral administration is formulated as a once-daily capsule, tablet, disintegrating tablet or lozenge, or sachet.

36. The kit of any one of 31-33, wherein the dose of the formulation is formulated to be administered intravenously or parenterally.

37. The kit of 31, wherein the dose of the formulation is formulated to be administered by a transdermal patch.

38. The kit of any one of 31-37, wherein the subject is a mammal.

39. The kit of 38, wherein the mammal is a human.

40. The kit of any one of 31-39, further comprising one or more reagents for performing PCR or microarray analysis to allow specific detection of an apoE4 allele in a biological sample from the subject, and electronic or paper instructions for reacting the reagents with the biological sample.

41. The kit of 40, further comprising one or more control reference samples.

42. The kit of any one of 31-41, wherein:
   the instructions for treating the subject specify a dose based on subject weight, and weight or volume of the formulation administered.

EXAMPLES

The following examples are put forth so as to provide those of ordinary skill in the art with a complete disclosure and description of how to make and use the present invention, and are not intended to limit the scope of what the inventors regard as their invention nor are they intended to represent that the experiments below are all or the only experiments performed. Efforts have been made to ensure accuracy with respect to numbers used (e.g. amounts, temperature, etc.) but some experimental errors and deviations should be accounted for. Unless indicated otherwise, parts are parts by weight, molecular weight is weight average molecular weight, temperature is in degrees Celsius, and pressure is at or near atmospheric. Standard abbreviations may be used, e.g., bp, base pair(s); kb, kilobase(s); pl, picoliter(s); s or sec, second(s); min, minute(s); h or hr, hour(s); aa, amino acid(s); kb, kilobase(s); bp, base pair(s); nt, nucleotide(s); i.m., intramuscular (ly); i.p., intraperitoneal (ly); s.c., subcutaneous (ly); and the like.

Materials and Methods

The following materials and methods are applicable to Examples 1-3 provided below.

Figure 6:
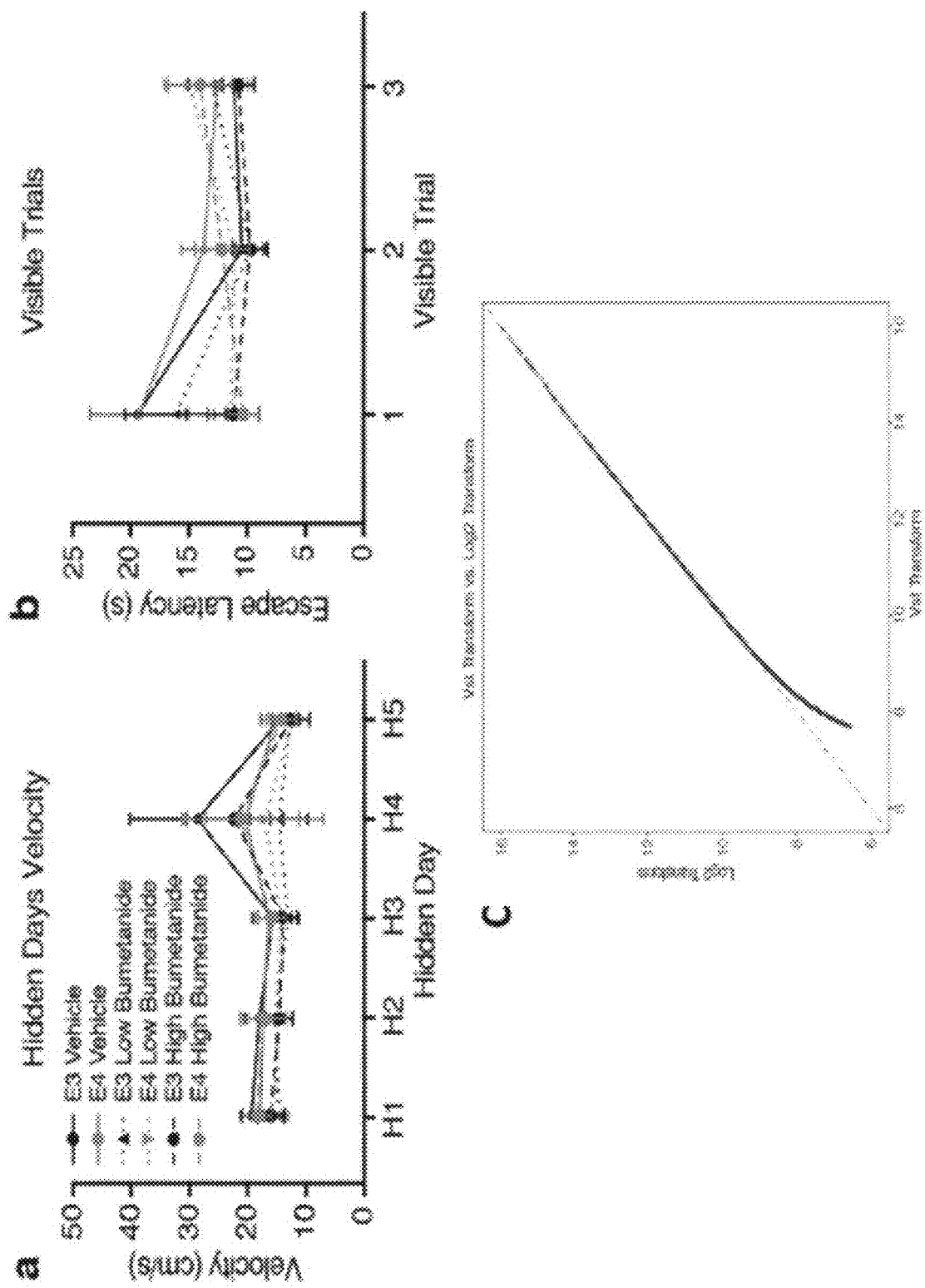
FIG. 6 (panels a through c) depicts the performance of apoE4-KI versus apoE3-KI mice in hidden platform trials (a) and visible trials (b), and demonstrate that bumetanide treatment does not affect swim speed, nor is bumetanide treatment associated with any motor or vision impairment in any of the groups. Panel (c) shows variance stabilizing transformation (Vst) deviates from log 2 transformation at lower values.

Data integration. National Center for Biotechnology Information's (NCBI) Gene Expression Omnibus (GEO) and National Institute of Aging's Accelerating Medicines Partnership-Alzheimer's Disease (AMP-AD) databases were searched for transcriptomic AD data from temporal lobe tissue for which apoE genotype information was available. Microarray experiments from Webster et al., 2009[17], accession GSE15222, was downloaded directly from the NCBI GEO database[24] in the available series matrix file format. Data had been rank-invariant normalized as described[17,25]. The pre-normalization procedure created negative values in the series matrix file, which were eliminated by adding a constant across the expression matrix[26]. Since fold change (FC) calculated after this addition is an underestimation, all subsequent FC estimates are conservative relative to the stated thresholds. Log2 transformation was then applied to the all-positive-value expression matrix. All samples with an apoE3/3, apoE3/4, or apoE4/4 genotype were used for further analysis except one sample with no reported gender. The Syn3157255-MayoEGWAS dataset was downloaded from the AMP-AD portal. The data had been background corrected and subjected to variance stabilizing transformation (Vst), quantile normalization, and probe filtering with the lumi package of BioConductor, as described[18]. Vst is identical to log 2 transformation at higher values, but deviates at lower values (FIG. 6, panel C)[27]. FIG. 6, panel (c) shows the variance stabilizing transformation deviates from log 2 transformation at lower values. Sample data provided by the lumi package (example.lumi) were downloaded. These data include 8,000 randomly selected genes from Barnes et al., 2005 microarray study[1]. Vst transformation (lumi package) was plotted against log 2 transformation (base R package). Vst values are equal to log 2 at higher numbers but begin to deviate upward around a transformed value of 9. Therefore, any fold change calculation from values lower than 9 in a Vst transformation is an underestimation of actual measured fold change. The Vst algorithm results in underestimation of FC values of Vst transformed data calculated based on a log 2 scale under this deviation value. Thus, subsequent FC estimates for this dataset were also conservative relative to the stated thresholds.

Figure 7:
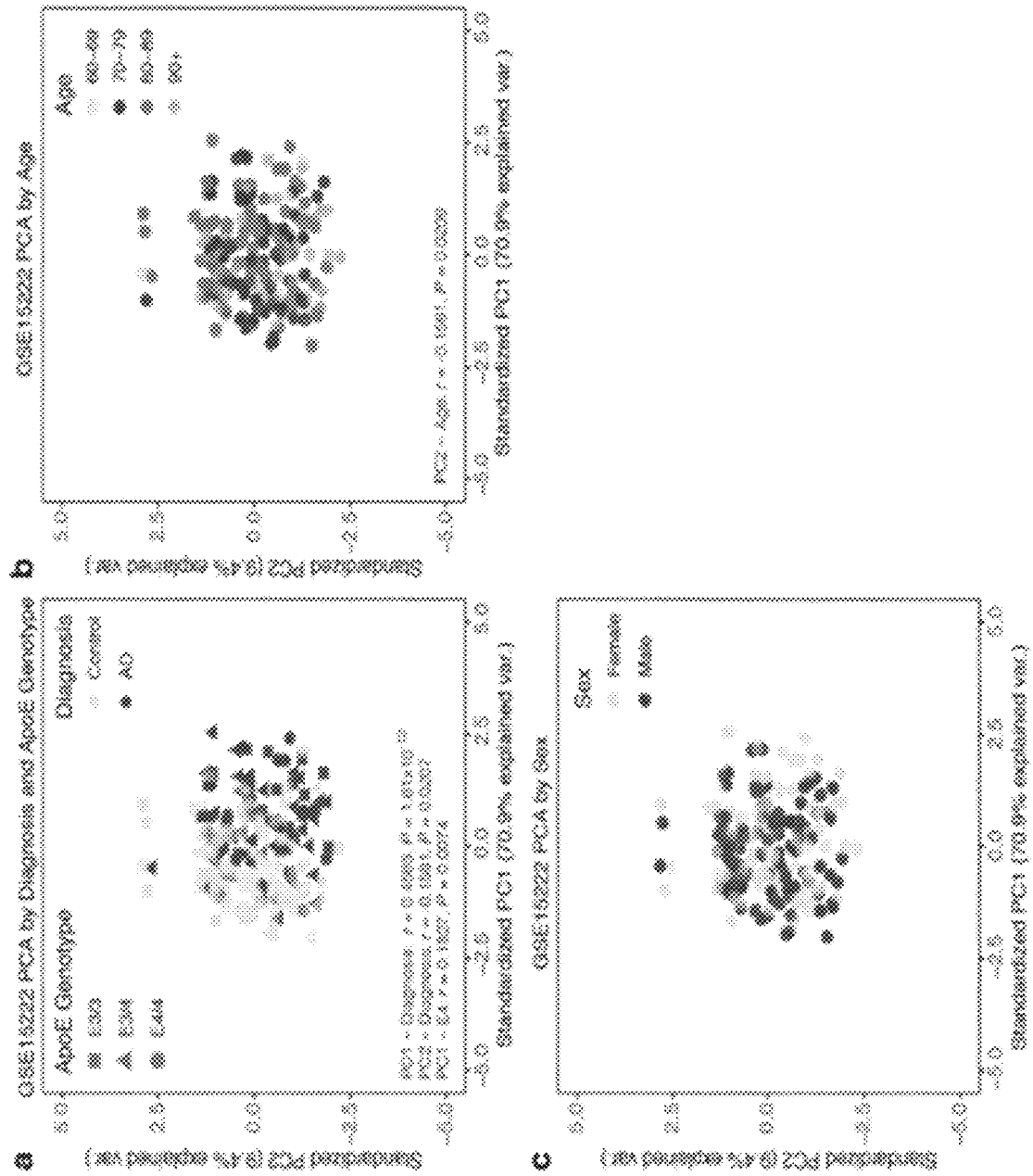
FIG. 7 (panels a through c) depicts that principal component analysis (PCA) of the GSE15222 dataset reveals no clustering trend across apoE4 genotype, diagnosis, age, or sex covariates.
Figure 8:
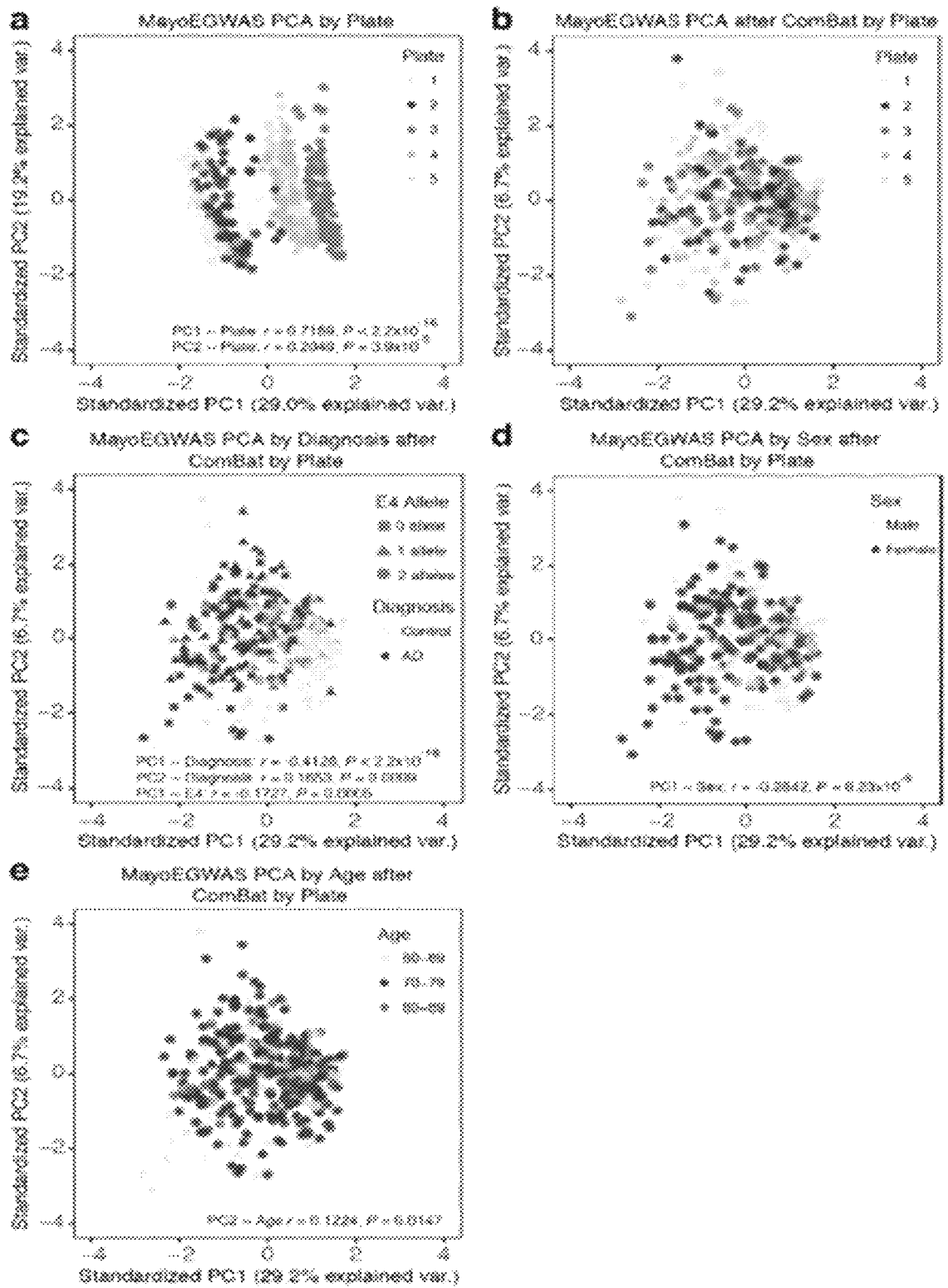
FIG. 8 (panels a through e) depicts that PCA of the Syn3157255-MayoEGWAS dataset reveals no clustering trend across apoE4 genotype, diagnosis, age, or sex covariates.

Both datasets were analyzed by principal component analysis (PCA) to confirm normalization of technical artifacts (FIGS. 7 and 8). FIG. 7 shows that principal component analysis (PCA) of the GSE15222 dataset reveals no clustering trend across apoE4 genotype, diagnosis, age, or sex covariates. Panel (a): GSE15222 was downloaded directly from GEO in the available series matrix file format. Data had been rank invariant normalized as described[2]. The pre-normalization procedure created negative values, which were eliminated by adding a constant across the expression matrix[3]. The data was log 2 transformed and the resulting data were subjected to principal component analysis. The first principal component (PC1) was correlated with the diagnosis covariate (Pearson's r=0.4585, P=1.61×10$^{-12}$). PC2 was also significantly associated with diagnosis (Pearson's r=−0.1581, P=0.0207). PC1 was also significantly correlated with apoE4 status (Pearson's r=0.1827, P=0.0074). PC2 did not correlate with diagnosis or apoE4 status. Panel (b): Data displayed according to age decade of sample. PC1 did not correlate with the age covariate. PC2 correlated with age (Pearson's r=−0.1581, P=0.0206)(c) Data displayed according to sex. PC1 and PC2 did not correlate with sex.

FIG. 8 shows that PCA of the Syn3157255-MayoEGWAS dataset after batch correction reveals no clustering trend across apoE4 genotype, diagnosis, age, or sex covariates. Panel (a): The Syn3157255-MayoEGWAS dataset was downloaded from the AMP-AD portal. The data had been background corrected and subjected to variance stabilizing transformation (Vst), quantile normalization, and probe filtering with the lumi package of BioConductor, as described[4]. Vst transformation is identical to log 2 transformation at higher values, but deviates at lower values (see FIG. 6, panel c) 5. The dataset was analyzed by PCA to confirm normalization of technical artifact. A clear technical artifact, corresponding to the "plate" covariate, was apparent across the first principal component (PC1, 29.0% of the explained variance). PC1 correlated with the plate covariate (Pearson r=0.7159, P<$2.2 \times 10^{-16}$), as did PC2 (Pearson r=0.2049, P=$3.9 \times 10^{-5}$). Panel (b): The dataset was batch corrected across the plate covariate by using the ComBat function of the sva package, and PCA was done to ensure that the technical artifact had been addressed. PC1 and PC2 did not correlate with the plate covariate after batch correction. Panel (c): The PCA of ComBat-corrected data displayed according to apoE genotype. PC1 correlated with diagnosis (Pearson r=−0.4126, P<$2.2 \times 10^{-16}$), as did PC2 (Pearson r=0.1653, P=0.0009). PC1 correlated with apoE4 allele dosage (Pearson $R^2$=−0.1727, P=0.0005), but PC2 did not. Panel (d): ComBat-corrected data displayed according to sex. PC1 correlated with sex (Pearson r=−0.2842, P=$8.23 \times 10^{-9}$), but PC2 did not. Panel (e): ComBat-corrected data displayed according to age decade of sample. PC2 correlated with age (Pearson r=0.1224, P=0.0147), and the correlation of PC1 and age approached significance (Pearson r=−0.0943, P=0.0605).

Since such artifacts were present in the first principal component, the Syn3157255-MayoEGWAS dataset was further batch corrected across the "plate" covariate by using the ComBat function of the sva package[28]. The Limma R package, which uses linear models for differential expression (DE) analysis, was applied to each dataset separately to estimate DE of genes in all control and AD samples regardless of apoE genotype; for genes with more than one probe, the probe with the most significant P value for the difference between AD and control samples was used for subsequent integration and meta-analyses of the two datasets[29]. Both datasets were separated into apoE-genotype-specific groups (apoE3/3, apoE3/4, and apoE4/4); genes shared by both microarray platforms (16477 genes) were batch corrected across the two datasets for each group with the ComBat algorithm (sva package) (FIG. 9).

Figure 9:
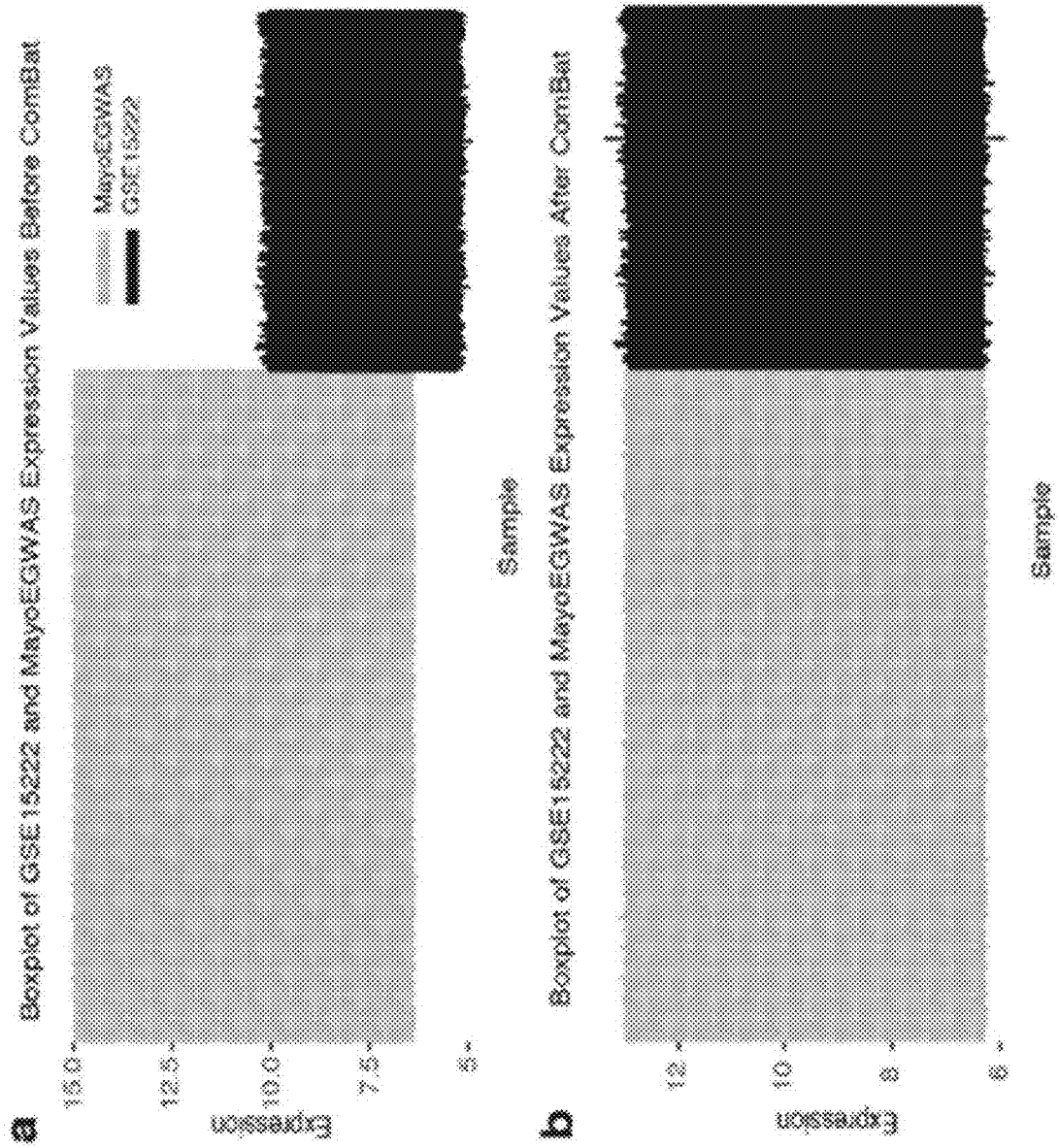
FIG. 9 (panels a and b) provides meta-analysis of differential expression (DE) of the Syn3157255-MayoEGWAS and GSE15222 datasets, before (a) and after (b) ComBat correction.

FIG. 9 shows that data integration by probe selection and batch correction yields a normalized dataset for meta-analysis. Panel (a): The Syn3157255-MayoEGWAS dataset was downloaded from the AMP-AD portal. The data had been background corrected and subjected to variance stabilizing transformation (vst), quantile normalization, and probe filtering with the lumi package of BioConductor, as described[4], then batch corrected across the "plate" covariate (see FIG. 8). GSE15222 was downloaded and a constant was applied to the dataset to eliminate negative values; the data were then log 2 transformed. The Limma package was applied to the two datasets separately to estimate differential expression (DE) between all control and AD samples regardless of genotype; for genes with more than one probe, the probe with the most significant P value for the difference between AD and control samples was used for subsequent integration[6]. Data were then combined using genes shared in both datasets (n=16477s). Gene expression values after vst (MayoEGWAS) or log 2 transformation (GSE15222) showed clear differences in expression levels between datasets. Panel (b) shows expression values of integrated data after ComBat correction by study show consistency across integrated datasets, which were used for all further DE analysis.

Figure 5:
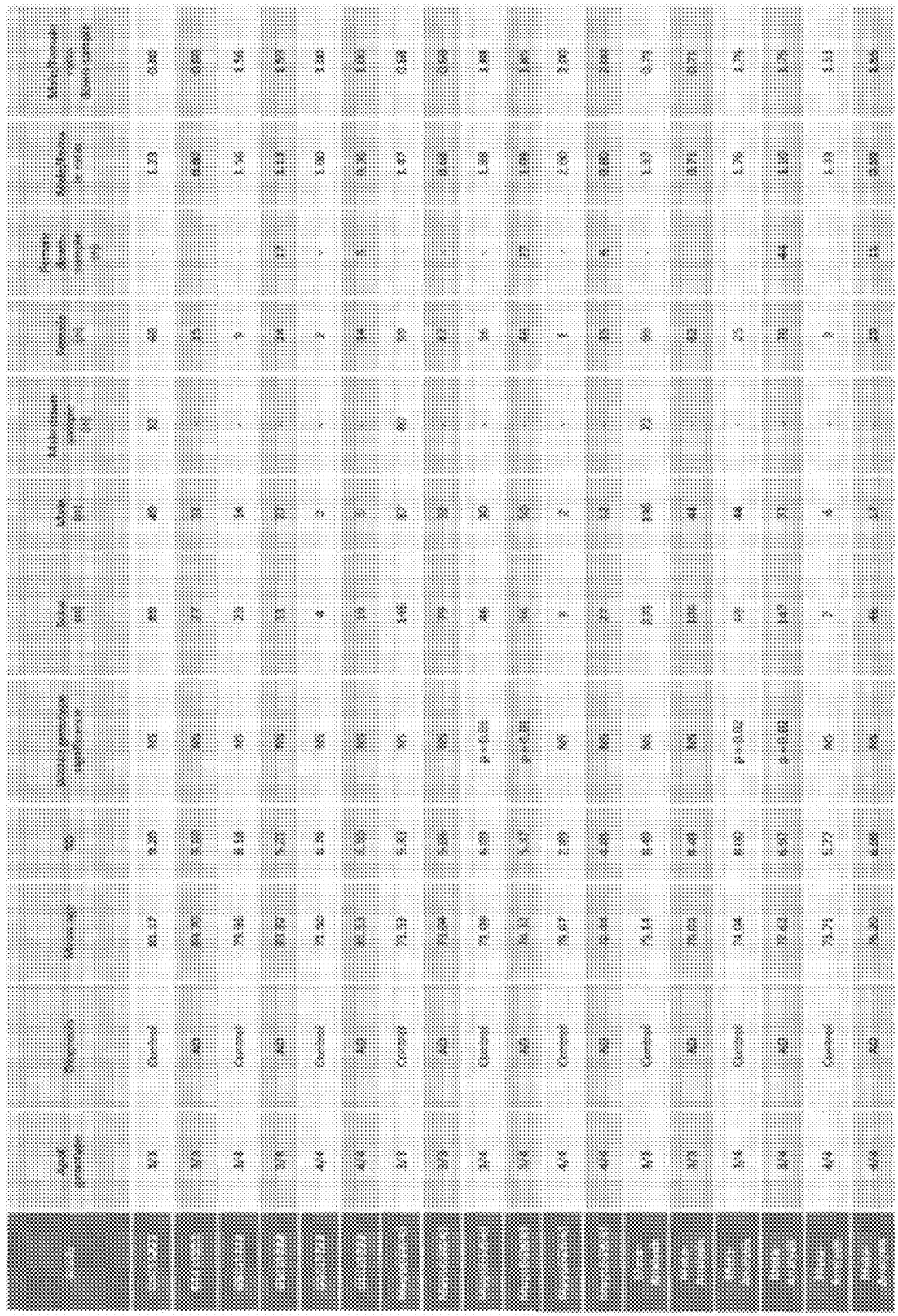
FIG. 5 presents covariate measures (ApoE genotype, diagnosis, mean age, SD, within genotype significance of age difference between controls and AD samples, group size, number of males, number of females, number of males or females in down-sampled sex-matched groups, Male/Female ratio, and Male/Female ratio down-sample) for human transcriptomic datasets.

Differential expression and pathway analysis. Average age did not differ in apoE genotype groups, except in the apoE3/4 AD group, which was higher in the Syn3157255-MayoEGWAS study (±3.24 years, ANOVA with Tukey HSD post-hoc testing, P=0.0153). To maintain power, no samples were removed from the apoE3/4 group in Syn3157255-MayoEGWAS. To ensure that age did not affect the DE results, the Pearson's correlation of the expression level in the Syn3157255-MayoEGWAS dataset of each DE gene from both the apoE3/4 control and AD datasets against the age covariate was calculated. No genes correlated significantly (FDR<0.05). To eradicate any spurious results related to non-sex-matched groups, each apoE-genotype-specific group was randomly down-sampled to match the male to female ratios within each genotype across diagnoses (FIG. 5). FIG. 5 presents covariate measures for human transcriptomic datasets. For each study separately and combined, the following covariates are reported: apoE status, diagnosis, mean age of each group, SD of within-group age, significance of age difference between controls and AD samples within each genotype (within genotype significance), group size (n), number of males, number of females, number of males or females in down-sampled sex-matched groups, within group male to female ratio (Male/Female ratio), and within group male to female ratio after down-sampling (Male/Female ratio down-sample). ApoE3/4 AD samples were significantly older (by 3.24 years) than apoE3/4 control samples in the MayoEGWAS study. This discrepancy was addressed in the computational pipeline as described in Online Methods section.

To account for possible stochastic effects, this process was applied 10 times. The nonparametric rank-based algorithm RankProd (version 2.42.0) was applied to each of the 10 permutations with a two-origin design. The two-origin design RankProd algorithm computes pairwise FC ratios for every control and AD sample in each dataset separately, ranks the ratio of each gene within each pairwise comparison, and calculates the rank product of each gene by taking the product of all pairwise rank ratios from both datasets. P values were determined by 1000 permutations[19]. Adjusted P values were determined separately with the p.adjust base function in R. The ComBat function changes the mean and SD of each sample. Therefore, to avoid further artifacts in the reported FC estimation by the RankProd package, FCs used in all subsequent cutoffs were calculated separately for each dataset before batch correction, and the arithmetic mean was used. Because of the normalization transformations of the GSE15222 matrix and the Vst transformation of Syn3157255-MayoEGWAS, some FC values are underestimated and are referred to as "estimated FC". Estimated FC values and P-values were averaged over each of the 10 sex-matched permutations for each genotype and FDR values were calculated using the p.adjust package. DE genes that had both an estimated average absolute FC greater than 1.3×and an FDR cutoff <0.05 were further analyzed. DE genes of drug signatures were analyzed with Ingenuity Pathway Analysis (IPA) software. Ontology analysis was done using the reference set from the Ingenuity Knowledge Base including direct and indirect gene relationships; enrichment P-values were taken directly from the IPA software.

Drug repositioning analysis. The computational drug repositioning algorithm, which was developed by Sirota et al. and Dudley et al.[11,12] and taken from Chen et al.[16], was applied to each apoE-genotype-specific gene signature using the publically available CMap database (1300 compounds). Although LINCS is a much more comprehensive database, a very small proportion of DE genes in AD overlapped with the 1000 genes measured, and therefore it was not used in this study. The algorithm was modified to use the full apoE-genotype-specific DE signature rather than the top 150 up- and downregulated genes. FDR-adjusted P values were calculated with the p.adjust function in the base R package. Technical replicates, defined as the same drug, concentration, cell line, and treatment, were averaged by CMap score. In the analysis of overlapping drug predictions between apoE-genotype-specific groups, when drugs had more than one technical replicate, the P value from the most significant replicate was reported in order to have the most inclusive drug set. The cell line with the lowest CMap score was reported for each compound to further enrich the signal. The raw CMap data for bumetanide in PC3 cells was extracted for further analysis. The CMap data from the pipeline detailed by Chen et al.[16] consists of the FC rank after bumetanide treatment. To display how bumetanide "flips" the apoE4/4-specific transcriptomic signature of AD, the CMap data in FIG. 2 were analyzed by Monte Carlo simulation to calculate the significance of the shift in the average FC rank. Downregulation by bumetanide was defined as a shift of upregulated apoE4/4 human gene signatures to a lower rank than the mean rank of all genes. Upregulation by bumetanide was defined as a shift in average FC rank of the downregulated genes in the apoE4/4-specific AD signature toward a higher rank than the mean rank of all genes.

Mice. All protocols and procedures followed the guidelines of the Laboratory Animal Resource Center at the University of California, San Francisco (UCSF). All mice were housed under identical conditions from birth through death (12-hour light/dark cycle, housed 5/cage, PicoLab Rodent Diet 20). All mouse lines were maintained on a C57Bl/6J background. ApoE3-KI and apoE4-KI homozygous mouse lines (Taconic)[30,31] were born and aged under normal conditions at the Gladstone Institutes/UCSF animal facility. Female apoE-KI mice were used because of their susceptibility to AD-related neuronal and behavioral deficits. The ages of the mice are indicated in the behavioral testing section of the online methods.

Bumetanide treatment. Bumetanide was prepared at 220 µM in 2% DMSO in 0.9% sterile saline, adjusted to pH 8.5 with NaOH for solubility, and given by i.p. injection daily starting 6 weeks before and continuing throughout behavioral assessment. Body weight was measured weekly during bumetanide treatment; injection volume was calculated to achieve a dose of 0.02 (low) or 0.2 (high) mg bumetanide/kg body mass (e.g., 50-ul daily injection for a 20-g mouse). Control mice were injected with a matched volume of 2% DMSO in 0.9% sterile saline, pH 8.5. Injections were well tolerated and had no adverse effects on health.

Behavioral testing. Mice were singly housed before testing. Each mouse was assigned a random number, so researchers were blinded to genotype and treatment information. At about 14 months of age, apoE3-KI and apoE4-KI mice were randomly assigned to treatment groups: apoE3-KI vehicle (n=10, age 14.01±0.44 months), apoE3-KI low bumetanide (n=11, age 14.30±0.33 months), apoE3-KI high bumetanide (n=10, age 13.74±0.22 months), apoE4-KI vehicle (n=10, age 14.10±0.35), apoE4-KI low bumetanide (n=10, age 14.70±0.27 months), apoE4-KI high bumetanide (n=9, age 13.77±0.28 months). Treatment was administered daily by i.p. injection beginning 6 weeks before and continuing throughout the 14 days of testing in the Morris water maze (MWM); injections were given at the end of the light cycle and after the day's test.

The MWM pool (diameter, 122 cm) contained opaque water (22-23° C.) with a platform 10 cm in diameter. The platform was submerged 1.5 cm during hidden platform sessions[20]-23,32 and marked with black-and-white-striped mast (15 cm high) during cued training sessions. Mice were trained to locate the hidden platform (hidden days 1-5) and the cued platform (visible days 1-3) in two daily sessions (3.5 h apart), each consisting of two 60-s trials (hidden and cued training) with a 15-min intertrial interval. Distal visual cues on the walls of the behavioral testing room remained constant throughout the test. Visible trials took place after training and memory probes and were 60 seconds long with a cued visible platform. The platform location remained constant in the hidden platform sessions but was changed for each cued (visible) platform session. Entry points were changed semirandomly between trials. At 24, 72, and 120 hours after the last hidden platform training, a 60-s probe trial (platform removed) was done. The entry point for the probe trial was in the southwest quadrant, and the target quadrant was the northeast quadrant. Performance was monitored with an Etho Vision video-tracking system (Noldus Information Technology). For the probe trials, the following analyses were performed (1) the percent time spent in the target quadrant versus average time spent in the three other quadrants, (2) the number of crossings over the position of the target platform versus the average number of crossings over the equivalent positions in the three other quadrants and (3) the distance to platform over the first 10 seconds.

RNA-Seq analysis of hippocampal tissue. Twelve-month-old apoE3-KI and apoE4-KI mice received daily i.p. injections of vehicle or bumetanide (0.2 mg/kg body weight) for 60 days. Mice were perfused with 0.9% saline, and the hippocampus was dissected and homogenized in Trizol reagent. Total RNA was extracted and purified with the Qiagen RNeasy Micro kit, which included a DNase treatment. cDNA was generated from full-length RNA (50 ng per sample) with the NuGEN RNA-Seq V2 kit, which uses the single primer isothermal amplification method to deplete ribosomal RNA, and sheared by Covaris to yield fragments of uniform size. The NuGen Ultralow system V2 was used for adding adapters and for barcoding and amplification. The resulting RNA libraries were purified with Agencourt XP magnetic beads, and quantified by qPCR after quality control with an Agilent Bioanalyzer. The libraries were pooled and sequenced with a HiSeq 4000 instrument (Illumina) for single-end (SE50) sequencing. Sequence data were aligned with the STAR short read aligner[33] and counts per feature were obtained with the feautureCounts function from the Subread package[34]. After alignment, transcripts not shared in the GSE15222 and Syn3157255-MayoEGWAS databases were discarded, as were genes with less than one count per million in two or more samples[35].

The DESeq pipeline was used to assess DE of the remaining 11,877 transcripts. Genes below a P value of 0.05 were considered DE for future pathway analysis. After count normalization with DESeq, data were rld transformed (vsn package), and clustering was done on the DE genes with the pheatmap package. PCA was applied to the rld-transformed DE genes. The DE signatures of drugs were analyzed with Ingenuity Pathway Analysis software. Ontology analysis was done using the reference set from the Ingenuity Knowledge Base including direct and indirect gene relationships. For analysis of rank changes of apoE-genotype-specific signature genes of AD, the raw count data from the 11,877 transcripts were rank transformed, and for each gene the average rank of vehicle-treated samples was subtracted from that of bumetanide-treated samples. Significance of the rank changes of the up- and downregulated apoE4-KI human gene signatures deviating from the population mean of the rank change of all genes (zero) was calculated by Monte Carlo simulation.

Statistical analyses. Behavior metrics are expressed as mean±SEM. All values for n are the numbers of mice or biological replicates. The distribution of data was assessed with the Shapiro-Wilk normality test; most of the data were normally distributed. Differences between groups were determined by unpaired or paired two-sided t test. For multiple comparisons, one-way ANOVA and Tukey's post-test were used. $P<0.05$ was considered significant. Researchers were blinded to genotypes and treatment information during experiments.

Compliance with relevant ethical regulations and animal use guidelines. All experimental and animal protocols and procedures were done in accordance with the university and institutional ethical regulations and animal use guidelines.

Life sciences reporting summary. Further information on experimental design is available in the life Sciences Reporting Summary.

The following materials and methods are applicable to Examples 4-6 provided below.

Brain slice electrophysiological recordings and data analyses. For long-term potentiation (LTP) recording study, apoE4-KI mice were randomly allocated to vehicle (n=6, age 15.2±0.56 months) and bumetanide (n=3, age 15.1±0.06) treatment groups. ApoE3-KI mice were similarly allocated into vehicle (n=6, age 15.5±0.11) and bumetanide (n-3, age 15.57±0.19) treatment groups. For input/output recording study, apoE4-KI mice were randomly allocated to vehicle (n=3, age 15.1±0.06 months) and bumetanide (n=3, age 15.1±0.06) treatment groups. ApoE3-KI mice were similarly allocated into vehicle (n=7, age 15.3±0.06) and bumetanide (n=3, age 15.57±0.29) treatment groups. All mice were dosed for 6-8 weeks and slice recording day and dosage time were allocated randomly among the groups to allow for equal dosage time while experiments were performed. The final bumetanide injection was performed one hour prior to sacrifice. At the time of recording all mice were 16-17 months of age.

Animals were anaesthetized with isoflurane and decapitated. Brain was rapidly removed from the skull and placed in the ice-cold (2-5° C.) slicing solution. Slicing solution contained (in mM): 110 choline chloride, 2.5 KCl, 26 $NaHCO_3$, 10 $MgCl_2$, 1.25 $NaH_2PO_4$, 0.5 $CaCl_2$), 10 glucose, 3 Na Pyruvate, 1 L-Ascorbic acid, pH 7.4.

300 μm-thick sagittal slices were cut from both hemispheres using a vibratome (VT1200, Leica, USA) and transferred to a 95% $O_2$—$CO_2$ vapor interface holding chamber (BSK5, Scientific Systems Design Inc. Canada) containing artificial cerebrospinal fluid (ACSF) where they were allowed to recover at 34° C. for one hour and held at room temperature (20-22° C.) afterwards. ACSF contained (in mM): 126 NaCl, 2.5 KCl, 1.5 $CaCl_2$), 1.5 $MgCl_2$, 26 $NaHCO_3$, 1.25 $NaH_2PO_4$, 10 glucose, and 1.5 L-Ascorbic acid, pH 7.4. For recordings, slices were transferred to a submerged chamber (RC-27LD, Warner Instruments, USA) where they were continuously perfused on both sides with oxygenated ACSF at 32° C. at a flow rate of 10 mL/min.

Field post-synaptic potentials (fPSPs) were elicited by orthodromic stimulation of Schaffer collaterals by concentric bipolar stimulating electrode (FHC, Inc., USA) connected to a constant voltage isolated stimulator (DS2A-MKII, Digitimer North America) and placed in CA2 stratum radiatum. fPSPs were recorded with a glass borosilicate microelectrode filled with ACSF and placed in CA1 stratum radiatum. Signals were sampled and digitized by Multi-Clamp 700B amplifier and Digidata 1550B1 acquisition system with pClamp10 software (Molecular Devices, USA), and analyzed using IgorPro6 software (Wavemetrics Inc., USA) running custom macros. fPSP slopes were analyzed as the linear fit slope values between 10% and 90% of fPSP peak. Input-output relationships were recorded as the fPSP slope values in response to increasing stimulation intensity (0.5-1.4 mV). For long-term potentiation (LTP) recordings, stimulation intensity was adjusted to 50% of saturation and delivered at 0.1 Hz. After 10 minutes of control recording, LTP was elicited using two consecutive (5s) theta-frequency burst (HFB) trains of 5 100 Hz bursts (4 pulses each) at 0.2 Hz. LTP outcome was ascertained as average fPSP gain for a 10-minute period 50 minutes post-induction vs. 10 minutes of control.

Single-Nucleus RNA-Seq Library Preparation and Sequencing. Twelve-month-old apoE3-KI and apoE4-KI mice received daily i.p. injections of vehicle or bumetanide (0.2 mg/kg body weight) for 60 days. The single-nucleus RNA-seq protocol was modified based on 10× Genomics Sample Preparation Demonstrated protocols and Isolation of Nuclei for Single Cell RNA Sequencing. Mouse hippocampi were acutely dissected on ice. Dissected hippocampi were placed in 2 mL Hibernate A®/B27®/GlutaMAX™ (HEB) medium in a 5 mL tube. The HEB medium was removed to a 15 mL conical and kept on ice. 2 mL of chilled lysis buffer (10 mM Tris-HCl, 10 mM NaCl, 3 mM $MgCl_2$, and 0.1% Nonidet™ P40 Substitute in Nuclease-Free Water) were added to the tissue, and the hippocampi were homogenized by suctioning 10× through a 21G needle. After homogenization, the tissue was lysed on ice for 15 min, swirling 2-3×during this incubation period. The reserved chilled HEB media was then returned to the lysed tissue solution, and the tissue was further triturated with 5-7 passes through a 1 mL pipette. A 30 μm cell strainer (MACS SmartStrainer; Miltenyi Biotech 130-110-915) was washed with 1 mL of PBS, and the lysed tissue solution was filtered through the strainer to remove debris and clumps. Filtered nuclei were centrifuged at 500 ref for 5 min at 4° C. The supernatant was removed, and nuclei were resuspended in 1 mL of Nuclei Wash and Resuspension Buffer (1×PBS with 1.0% BSA and 0.2U/μl RNase Inhibitor), then centrifuged a second time at 500 ref for 5 min at 4° C., and resuspended in 400 μl of Nuclei Wash and Resuspension Buffer. DAPI was added to a final concentration of 0.1 μg/mL, and the nuclei solution was filtered through 35 μm cell strainer before loaded onto the BD FACSAria-II at the Gladstone Institutes' Flow Cytometry Core. The DAPI-positive nuclei were selected by gating on DAPI-positive events, excluding debris and doublets.

Single-Nucleus RNA-Seq Alignment, Clustering and Cell Type Identification. The mouse reference (mm10-3.0.0, ensemble 97) pre-mRNA genome was created via 10× Genomics Cellranger (v. 2.2.0) mkref function. Reads from each sample were aligned to this genome and aggregated using the 10×Cellranger pipeline with no modifications. Raw data was loaded into the R package Seurate (v. 2.3.4). Genes with detected expression in at least 3 nuclei, and nuclei with at least 200 detected genes and a maximum of 2400 were retained for analysis for a total of Nuclei with a mitochondrial percentage of less than 0.0025 were retained for future analysis for a total of 27,415 cells. Highly variable genes were calculated via the FindVariableGenes function with the parameters: x.low.cutoff=0.0123, x.high.cutoff =3, y.cutoff=0.5 for a total of 2578 highly variable genes. The expression level of highly variable genes in the nuclei were scaled and centered via the ScaleData function, and was then fed into the RunPCA function. PCAElbow Plot was used to plot the cumulative standard deviations of each principal component the significance of the association of each gene with each principal component was assessed via the Jack-Straw and JackStrawPlot function. Based on the outcome of these two graphs, we selected the first 15 PCs to feed in to the FindCluster function, which was run using the following a resolution of 0.6. This method identified 18 distinct clusters. We then applied the FindMarkers function to identify marker genes using the default settings to identify the cell type present in each cluster. To better visualize marker gene expression across different cell types magic function of the RMagic (Markov Affinity-Based Graph Imputation) package was applied to the Suerat object to apply data diffusion to share information across similar cells in order to de-noise and fill in drop-out events in our count matrix. The Seurat VInPlot function was used to visualize marker gene expression.

Single-Nucleus RNA-Seq Differential Expression and Pathway Analysis. Differential expression log fold change of all genes between bumetanide and control treated cells in each cell type was calculated via the FindMarkers function using a Wilcoxon rank sum test. To display how bumetanide "flips" the apoE4/4-specific transcriptomic signature of AD, the log fold changes of all genes present in each cell cluster that also overlapped with those measured in the Cmap database were rank transformed, and then were analyzed by Monte Carlo simulation to calculate the significance of the shift in the average FC rank. Downregulation by bumetanide was defined as a shift of upregulated apoE4/4 human gene signatures to a lower rank than the mean rank of all genes. Upregulation by bumetanide was defined as a shift in average FC rank of the downregulated genes in the apoE4/4-specific AD signature toward a higher rank than the mean rank of all genes. Differentially expressed pathways were calculated from all DE genes (p<0.05) from each cluster using the kegga function of the limma package. Pathways with an enrichment p<0.005 were used for further analysis.

Neuronal Differentiation of Human apoE4/4-iPSCs. Human iPS lines were generated from skin fibroblasts of a subject with apoE4/4 genotype and were maintained under feeder-free conditions in mTeSR1 medium (STEMCELL Technologies). Human apoE4/4-iPSCs were routinely passaged at 1:2-1:4 by brief treatment with Accutase (Millipore) and scraping. The human iPSC protocol was approved by the Committee on Human Research at the University of California. The apoE4/4-iPSCs were differentiated into neurons as reported with modifications. iPSCs were treated with collagenase IV (Stem Cell Technologies) and grown in suspension as embryoid bodies in hES medium without bFGF. The medium was replaced every day for 5 days. On day 5, embryoid bodies were grown in Neural Induction Medium containing Dulbecco's modified Eagle's medium/F12 and Neurobasal Medium (1:1, Thermo Fisher), 1% N2 Supplement (Life Technologies), 1% B27 Supplement (Life Technologies), nonessential amino acids, and 0.5% penicillin/streptomycin (Life Technologies) supplemented with inhibitors of the TGF-$\beta$ receptor (SB431542, Stemgent; 5 µM) and the bone morphogenetic protein receptor (LDN-193189, Stemgent; 0.25 µM). On day 7, spheres were transferred to wells coated with Matrigel (BD Biosciences) and grown in Neural Progenitor Medium, which consisted of Neural Induction Medium without SB and LDN, but containing 10 ng/ml bFGF (PeproTech), 10 ng/ml epidermal growth factor (EGF) (PeproTech), and 2 µg/ml heparin (Sigma). Attached neuroepithelial cells were fed every other day for 7 days. Neural rosette structures appeared by around day 15, were lifted off the plate, and grown in suspension in Neural Progenitor Medium to form neurospheres. For neuronal differentiation, neurospheres were dissociated with Accutase and plated on culture plates coated with 100 µg/ml poly-1-ornithine (Sigma) and 10 µg/ml laminin (Sigma). Neuronal cultures were maintained in Neural Differentiation Medium consisting of Neural Progenitor Medium, brain-derived neurotrophic factor (10 ng/ml; PeproTech), and glial cell-derived growth factor (10 ng/ml; PeproTech) without bFGF, EGF, or heparin. Neurons were observed after several days and were further differentiated for 30 days or longer. Most of the experiments were performed on the neuronal culture differentiated beyond 8 weeks.

This culture condition generated neuronal cells with 75±4% vGLUT$^+$ total glutamatergic excitatory neurons, 15±3% GABA$^+$ GABAergic inhibitory neurons, and 5±2% TH$^+$ dopaminergic neurons.

RNA-Seq Analysis of Human ApoE4/4-iPS-derived Neurons. Total RNA was extracted and purified from apoE4/4-iPSC-derived human neurons with the Qiagen RNeasy Micro kit, which included a DNase treatment. cDNA was generated from full-length RNA (50 ng per sample) with the NuGEN RNA-Seq V2 kit, which uses the single primer isothermal amplification method to deplete ribosomal RNA, and sheared by Covaris to yield fragments of uniform size. The NuGen Ultralow system V2 was used for adding adapters and for barcoding and amplification. The resulting RNA libraries were purified with Agencourt XP magnetic beads, and quantified by qPCR after quality control with an Agilent Bioanalyzer. The libraries were pooled and sequenced with a HiSeq 4000 instrument (Illumina) for single-end (SE50) sequencing. Sequence data were aligned with the STAR short read aligner and counts per feature were obtained with the featureCounts function from the Subread package.

The DESeq pipeline was used to assess differential expression of the resulting 49,697 features. Genes below p<0.05 were considered DE for future pathway analysis. After count normalization with DESeq, data were rld transformed (vsn package), and PCA was applied to the rld-transformed DE genes. The kegga function of the limma package was used on all DE genes (p<0.05) to elucidate enriched ontological pathways. Pathways enriched (p<0.05) were used for further analysis.

To display how bumetanide "flips" the apoE4/4-specific transcriptomic signature of AD, gene symbols were generated from the ENSEMBL ID of each transcript, and the average fold change was taken for genes corresponding to more than one ENSEMBL ID. The FC of genes which also overlapped with those measured in the Cmap database was rank transformed, and then was analyzed by Monte Carlo simulation to calculate the significance of the shift in the average FC rank. Downregulation by bumetanide was defined as a shift of upregulated apoE4/4 human gene signatures to a lower rank than the mean rank of all genes.

Upregulation by bumetanide was defined as a shift in average FC rank of the downregulated genes in the apoE4/4-specific AD signature toward a higher rank than the mean rank of all genes.

Example 1

In Silico Screen and Identification of Bumetanide

The study protocol is described and results are presented here.

Described herein is an apoE-genotype-specific drug repositioning approach to screen for drugs to treat AD and/or apoE4/4-genotype-related diseases and disorders.

From a gene expression meta-analysis of 610 human temporal lobar samples obtained from public databases, apoE genotype-specific transcriptomic signatures of AD were established and used to query a validated Connectivity Map (CMap) database containing transcriptomic perturbation signatures of 1300 existing drugs to identify those capable of perturbing an entire gene-expression network away from the apoE-genotype-driven disease state towards a normal state.

ApoE-genotype-specific transcriptomic signatures of AD from publically available databases were first analyzed, and the first CMap database search using apoE-genotype-specific signatures of AD were completed.

To establish apoE-genotype-specific transcriptomic signatures of AD, the two largest public human temporal lobar transcriptomic datasets with apoE-genotype information-GSE15222 (n=213) and Syn3157255-MayoEGWAS (n=397) were analyzed. The datasets were stratified by apoE genotype for meta-analysis using a nonparametric algorithm, RankProd. Genes with an average false-discovery rate (FDR)-adjusted P value <0.05 and an average absolute estimated fold change (FC)>1.3× were further analyzed. Comparison with apoE-genotype-matched controls showed up-or down-regulation of 314, 150, and 696 genes in AD subjects with an apoE4/4, apoE3/4, and apoE3/3 genotype, respectively. Strikingly, as few as 31 DE genes (2.7% of all DE genes) were shared among all three AD groups, highlighting the unique pathobiology of each apoE genotype in AD pathogenesis. The apoE-genotype-specific transcriptomic signatures of AD to the CMap database were applied to produce therapeutic predictions. The FDA-approved loop-diuretic bumetanide had the best predictive score against apoE4/4 AD and a weaker CMap score against apoE3/4 and apoE3/3 AD. In bumetanide-treated cells in the CMap database, genes upregulated in apoE4/4 AD were shifted downward (higher rank numbers, P=0.003 by Monte Carlo simulation) and those downregulated in apoE4/4 AD were shifted upward (lower rank numbers, P=0.002 by Monte Carlo simulation), confirming that the transcriptomic perturbation signature of bumetanide correlates negatively with that of apoE4/4 AD.

The drug repositioning approach for AD described herein builds on the well-validated hypothesis that drugs which perturb or "flip" differentially expressed (DE) genes in a disease state back towards control levels may be efficacious against this disease[9-15]. Within this pipeline, the first step was to establish apoE-genotype-specific transcriptomic signatures of AD. The second was to apply a validated computational drug-repositioning algorithm[9,11,12,16] to query the CMap database, which contains transcriptomic perturbation signatures of 1300 drugs[8]. Each compound received a prediction score for therapeutic potential in apoE-genotype-specific AD[11,12,16]; a negative score suggested that a compound might reverse the transcriptomic signature of the disease. Because transcriptomic signatures of AD were compared with those perturbed by each compound, the prediction strategy was driven by the DE gene signature of the disease rather than by a hypothesis-driven approach targeting isolated pathways. Finally, as discussed in Examples 2 and 3, the top predicted drug was tested in a mouse model of apoE4-driven AD to validate efficacy and explore mechanisms of action.

FIG. 1 shows apoE-genotype-specific transcriptomic signatures of AD. Panel (a) shows the experimental workflow, including dataset selection and integration, apoE genotype stratification, DE analysis of genes, drug repositioning analysis, and behavioral and transcriptomic validation. Panel (b) shows apoE genotype composition of AD and control datasets GSE15222 (n=213) and Syn3157255-MayoEGWAS (n=397). ApoE4 allelic representation (apoE3/4 and apoE4/4) was greater in AD groups ($\chi^2$ test of apoE4 carriers versus non-carriers in AD versus control populations, P<0.001). Panels (c, d) present a Venn diagram of overlapping and unique upregulated (c) and downregulated (d) DE genes (Estimated absolute FC>1.3×, FDR<0.5) from apoE-genotype-specific, rank-based meta-analysis. 153 genes were uniquely significantly upregulated in apoE4/4 AD, 15 in apoE3/4 AD, and 319 in apoE3/3 AD. A mere 18 DE genes were shared across these groups. 69 genes were uniquely significantly downregulated in apoE4/4 AD, 8 in apoE3/4 AD, and 193 in apoE3/3 AD. 13 DE genes were shared across all three groups. Panel (e) presents a Venn diagram of shared and unique significantly enriched ontological pathways across apoE-genotype-specific groups. Nineteen pathways were uniquely significantly enriched in apoE4/4 AD, 10 in apoE3/4 AD, and 28 in apoE3/3 AD. Three pathways were shared across all three groups.

To establish apoE-genotype-specific transcriptomic signatures of AD, the two largest public human temporal lobar transcriptomic datasets-GSE15222 (n=213)[17] and Syn3157255-MayoEGWAS (n=397)[18]—were analyzed with apoE-genotype information (FIG. 1, panel a; FIG. 5). As in most clinical studies[6], AD groups in each dataset had proportionately more apoE3/4 and apoE4/4 carriers than controls (FIG. 1, panel b). The datasets were stratified by apoE genotype for meta-analysis (FIG. 1, panel a) using a nonparametric algorithm, RankProd[19]. Genes with an average false-discovery rate (FDR)-adjusted P value <0.05 and an average absolute estimated fold change (FC)>1.3× were further analyzed. Comparison with apoE-genotype-matched controls showed up-or down-regulation of 314, 150, and 696 genes in AD subjects with an apoE4/4, apoE3/4, and apoE3/3 genotype, respectively (FIG. 1, panels c and d). Strikingly, a mere 31 DE genes (2.7% of all DE genes) were shared among all three AD groups (FIG. 1, panels c and d), highlighting the unique pathobiology of each apoE genotype in AD pathogenesis.

Ontological analysis identified 28, 24, and 48 perturbed pathways in apoE4/4-, apoE3/4-, and apoE3/3-specific signature of AD (FIG. 1, panel e). Three (3% of all perturbed pathways) were shared among all three AD groups (FIG. 1, panel e), further highlighting the unique effect of each apoE genotype on the molecular milieu of AD.

Figure 2:
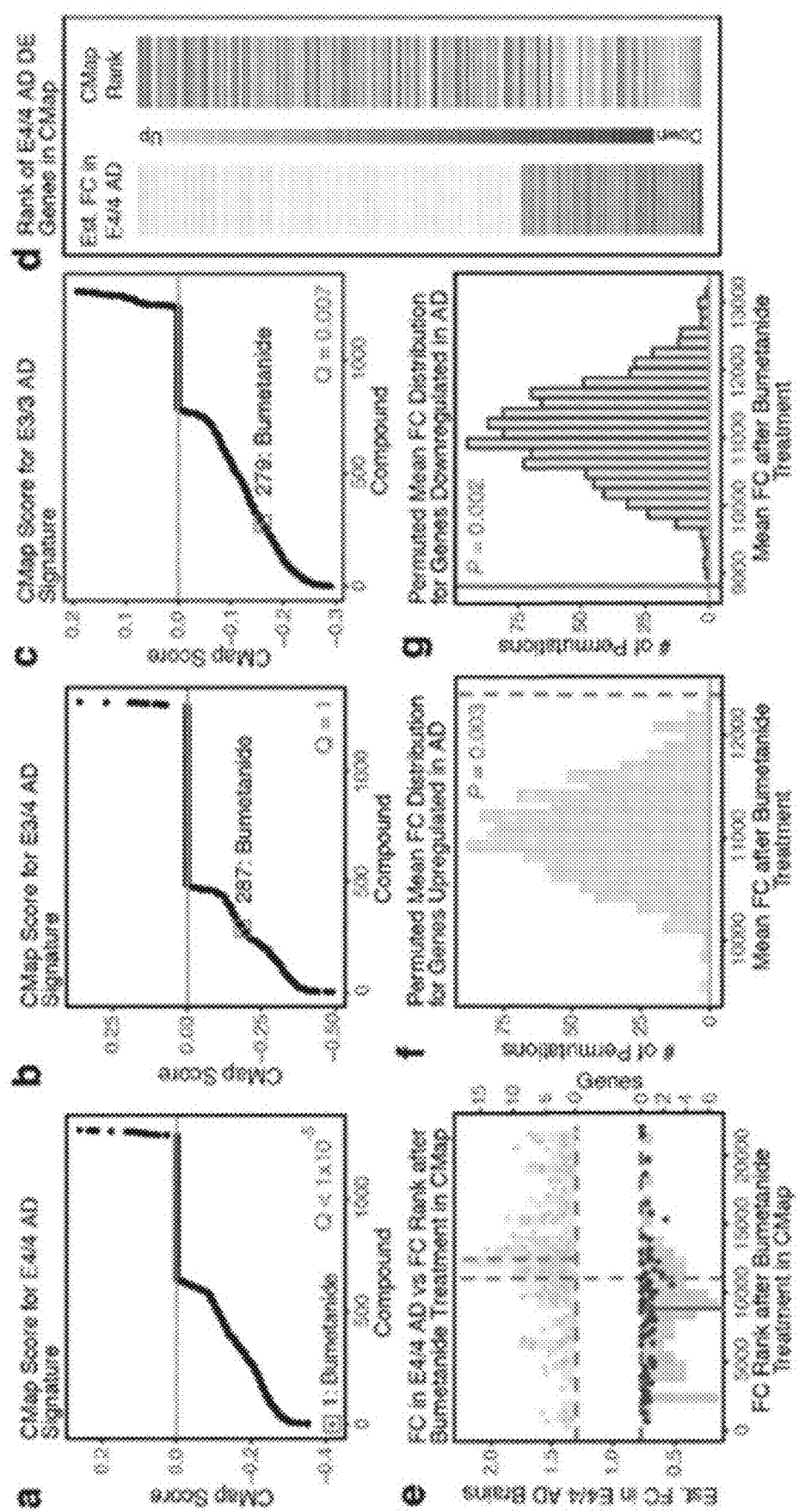
FIG. 2 (panels a through g) depicts CMap compounds ordered and scored against the (a) apoE4/4-specific, (b) apoE3/4-specific, and (c) apoE3/3-specific transcriptomic signatures of AD, and shows a significant therapeutic response of apoE4/4-specific transcriptomic signature of AD to bumetanide.

Next, the apoE-genotype-specific transcriptomic signatures of AD were applied to the CMap database to produce therapeutic predictions[16]. FIG. 2 shows apoE-genotype-specific drug repositioning analysis identifying bumetanide as the top predicted drug candidate for apoE4/4 AD. Panels (a-c) of FIG. 2 present graphs of CMap compounds ordered by CMap score against (a) apoE4/4-specific, (b) apoE3/4-specific, and (c) apoE3/3-specific transcriptomic signatures of AD. While CMap score is negative for all three genotypes, adjusted p-value (Q) for the CMap score associated with bumetanide is significant for apoE4/4, as the top predicted drug, and apoE3/3 AD, but not for apoE3/4 AD. Panel (d) shows a heatmap of genes from apoE4/4-specific transcriptomic signature of AD, rank ordered and color coded by estimated FC in apoE4/4 AD (left) and then re-color-coded by CMap rank (right). Bumetanide flips the expression rank of both up- and down-regulated genes in the apoE4/4-specific transcriptomic signature of AD. Panel (e) presents FC rank from CMap data versus estimated FC of DE genes in apoE4/4 AD, as determined by rank-based meta-analysis (see FIG. 1). Horizontal dotted lines indicate estimated FC cut-off of 1.3 (151 upregulated and 71 downregulated genes in the apoE4/4 signature of AD were shared in the CMap data). Mean FC rank of all genes after bumetanide treatment in the CMap data is 11,066.54 (vertical gray dotted line). The 151 upregulated genes in apoE4/4 AD had an average FC rank of 12,393.62 (vertical red dotted line), indicating lower ranks and lower expression in response to bumetanide. The 71 downregulated genes in apoE4/4 AD have an average FC rank of 8,815.22 (vertical red line), indicating higher ranks and higher expression in response to bumetanide. Right y-axis denotes number of genes in histogram of scatterplot values. Panels (f, g) present a histogram of the FC rank of 1000 permutations of size-matched gene sets taken at random from the bumetanide treatment data from CMap for upregulated genes (n=151) (f) and downregulated genes (n=71) (g) in apoE4/4 AD. The FC rank of human apoE4/4-specific upregulated genes after bumetanide treatment (12,393.62, vertical red dotted line) is significantly higher (Monte Carlo simulation, P=0.003), and that of the downregulated genes after bumetanide (8,815.22, vertical red line) is significantly lower (Monte Carlo simulation, P=0.002), than the mean of 1000 permutations calculated by Monte Carlo simulation, indicating a shift toward lower expression and higher expression, respectively.

The FDA-approved loop-diuretic bumetanide had the best predictive score against apoE4/4 AD (FIG. 2, panel a,) and a much weaker CMap score against apoE3/4 and apoE3/3 AD (FIG. 2, panels b and c). In bumetanide-treated cells in the CMap database, genes upregulated in apoE4/4 AD were shifted downward (higher rank numbers, P=0.003 by Monte Carlo simulation) and those downregulated in apoE4/4 AD were shifted upward (lower rank numbers, P=0.002 by Monte Carlo simulation) (FIG. 2, panels d through g), confirming that the transcriptomic perturbation signature of bumetanide correlates negatively with that of apoE4/4 AD.

It can also be observed that the human E3/4 transcriptomic signature is very different from human E4/4 AD signature (FIG. 1), and the drug prediction score of bumetanide for E3/4 is even more severe than E3/3 AD (FIG. 2).

Example 2

In Vivo Animal Model Testing for Effect of Bumetanide on Memory

The study protocol is described and results are presented here.

As shown below, the effects of bumetanide were tested in ApoE3/3 and ApoE4/4 knock-in (KI) mice in vivo. Overall, it was observed that cognitive function is improved in mice with the apoE 4/4 genotype treated with bumetanide.

The effects of bumetanide on spatial learning and memory performance of aged apoE4-KI and apoE3-KI mice were determined. The Morris water maze (MWM) was used to test spatial learning and memory over 5 days in hidden platform learning trials followed by probe trials of short-term memory at 24 hours after the last hidden trial and long-term memory at 72 and 120 hours. Learning curve and swim speed did not differ across genotype or treatment groups during the hidden trials. However, vehicle-treated apoE4-KI mice had impairment of short-term spatial memory not seen in vehicle-treated apoE3-KI mice. Strikingly, bumetanide rescued the memory deficit of apoE4-KI mice, which performed as well as apoE3-KI mice, in the 24-hour probe trial. Bumetanide- and vehicle-treated apoE3-KI mice performed equally well, suggesting that bumetanide does not adversely affect memory formation. In the 120-hour probe trial, bumetanide treated apoE4-KI mice still had a significant preference for the target quadrant, indicating a strong long-term memory. Interestingly, bumetanide-treated apoE3-KI mice remembered the hidden platform location in the 120-hour probe trial, whereas vehicle-treated apoE3-KI mice did not, suggesting a beneficial effect of bumetanide on long-term memory of aged apoE3-KI mice. In a more stringent test of spatial memory, precise crossings of the target platform position versus similar areas in the other quadrants during each probe trial were counted to assess the specificity and accuracy of memory performance. Strikingly, bumetanide-treated apoE4-KI mice, but not apoE3-KI mice, had significantly more platform crossings in the target quadrant in both the 24- and 120-hour probe trials. Thus, bumetanide restored the accuracy of both short- and long-term memory performance in apoE4-KI mice. These findings were corroborated by assessing the distance traveled toward the platform location within the first 10 seconds in probe trials. Thus, bumetanide restored short- and long-term memory and memory accuracy in aged apoE4-KI mice and enhanced long-term memory, but not memory accuracy, of aged apoE3-KI mice.

Figure 3:
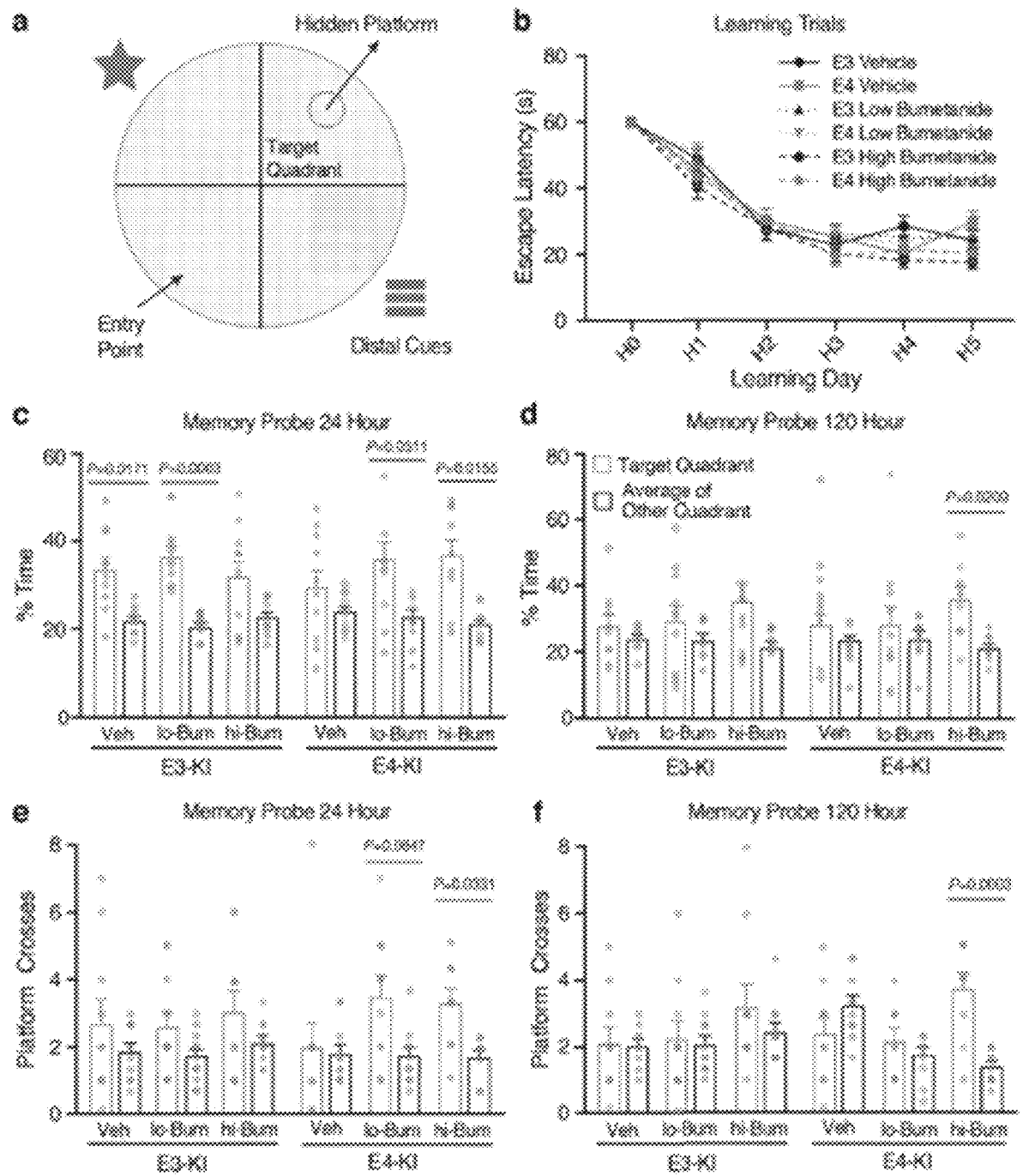
FIG. 3 (panels a through f) depicts in vivo studies of bumetanide's effect on learning and memory in aged ApoE4-KI mice.

FIG. 3 shows bumetanide treatment rescues spatial memory deficit specifically in aged apoE4-KI mice. Panel (a) presents a schematic of the MWM test. Mice are placed in the maze at the entry point and use distal spatial cues to find the hidden platform. Panel (b) shows escape latency of bumetanide-(low dose at 0.02 mg/kg and high dose at 0.2 mg/kg daily intraperitoneal injection for 8 weeks) and vehicle-treated apoE3-KI mice (n=11, 10, and 10, respectively) and apoE4-KI mice (n=10, 9, and 10 respectively) over learning days 1-5 did not differ between groups. Panel (c) illustrates that, in the 24-hour probe trial, both low and high dose of bumetanide treatment increased percent time apoE4-KI mice spent in the target quadrant (left bar for each treatment condition) versus average percent time in the other quadrants (right bar for each treatment condition) to the level of vehicle-treated apoE3-KI mice. High dose of bumetanide treatment impaired memory of apoE3-KI mice, as compared to vehicle-treated apoE3-KI mice. Panel (d) illustrates that, in the 120-hour probe trial, the high bumetanide-treated apoE4-KI mice spent more time in the target quadrant (left bar for each treatment condition) than controls. Panels (e, f) illustrates that, in 24-hour (e) and 120-hour (f) probe trials, high dose of bumetanide treatment significantly increased platform crossings in target quadrant (left bar for each treatment condition) versus the other quadrants (right bar for each treatment condition) in apoE4-KI mice. Values are mean±SEM. Differences within groups in c-f were determined by paired two-sided t test, p-values are as displayed in the figure panels. In c-f, lo-Bum indicates low dose of bumetanide treatment group and hi-Bum indicates high dose of bumetanide treatment group.

FIG. 6, panels (a) and (b) show that bumetanide treatment does not affect swim speed or visible trial performance. (a)

Bumetanide did not significantly affect swim speed during hidden platform trials of apoE4-KI and apoE3-KI mice. (b) There was no significant difference between any groups in visible trials, indicating there were no motor or vision impairment in any of the groups.

For in vivo validation, the effects of bumetanide treatment (low dose at 0.02 mg/kg and high dose at 0.2 mg/kg daily intraperitoneal injection for 8 weeks) on cognitive deficits in 16-month-old apoE4-KI mice were examined. The Morris water maze (MWM) 20-23 was used to test spatial learning and memory over 5 days in hidden platform learning trials followed by probe trials of short-term memory at 24 hours after the last hidden trial and long-term memory at 120 hours (FIG. 3, panel a). Learning curve and swim speed did not differ across genotype or treatment groups during the hidden and visible trials (FIG. 3, panel b; FIG. 6, panels a,b). However, vehicle-treated apoE4-KI mice had impairment of short-term spatial memory not seen in vehicle-treated apoE3-KI mice (FIG. 3, panel c). Strikingly, bumetanide treatment at both low and high doses rescued the short-term memory deficit of apoE4-KI mice, which performed as well as apoE3-KI mice, in the 24-hour probe trial (FIG. 3, panel c). Low bumetanide- and vehicle-treated apoE3-KI mice performed equally well, suggesting that low dose of bumetanide treatment does not adversely affect memory formation.

However, high dose of bumetanide treatment impaired short-term memory of apoE3-KI mice in the 24-hour probe trial (FIG. 3, panel c), indicating the specificity of bumetanide's beneficial effect on apoE4-KI mice. In the 120-hour probe trial, high bumetanide-treated apoE4-KI mice still had a significant preference for the target quadrant (FIG. 3, panel d), indicating a strong beneficial effect of bumetanide on long-term memory of apoE4-KI mice. Interestingly, both the low and high bumetanide-treated apoE3-KI mice forgot the hidden platform location, as did the vehicle-treated apoE3-KI mice, in the 120-hour probe trial (FIG. 3, panel d), further suggesting that the beneficial effect of bumetanide on long-term memory is specific for apoE4-KI mice.

In a more stringent test of spatial memory, precise crossings of the target platform position versus similar areas in the other quadrants were counted during each probe trial to assess the specificity and accuracy of memory performance. Strikingly, high bumetanide-treated apoE4-KI mice, but not apoE3-KI mice, had significantly more platform crossings in the target quadrant in both the 24- and 120-hour probe trials (FIG. 3, panels e and f). Low bumetanide-treated apoE4-KI mice had a trend toward significant improvement of short-term memory accuracy in 24-hour probe trial (FIG. 3, panel e). Taken together, these data demonstrate that bumetanide restored the accuracy of both short- and long-term memory performance specifically in apoE4-KI mice.

Example 3

In Vivo Testing of Effect of Bumetanide on Transcriptome

To explore bumetanide's effects on the transcriptome in vivo, an RNA-sequence analysis of the hippocampus (a temporal lobe region considered the epicenter of AD pathologies) from apoE4-KI mice treated with vehicle or bumetanide (0.2 mg/kg daily intraperitoneal injection) for 8 weeks was performed. Hierarchical clustering and principal component analyses showed significant clustering of samples based on DE genes from bumetanide versus vehicle treatment, suggesting a distinct drug effect in the hippocampus. Furthermore, in bumetanide-treated apoE4-KI mice, the genes significantly upregulated in apoE4/4 AD were shifted down in their expression ranks (toward higher numbered ranks) ($P<0.001$ by Monte Carlo simulation), corroborating the CMap data and the hypothesis that reversal of the disease-specific transcriptomic signature is a rational strategy for computational drug repurposing, even in animal models. Pathway analysis of the genes whose expression was most affected by bumetanide in apoE4-KI mice ($P<0.05$) identified 71 significantly perturbed pathways. Interestingly, six of these pathways overlapped with those enriched in the apoE4/4 AD signature:-GABA receptor signaling, cAMP-mediated signaling, G-protein-coupled receptor signaling, VDR/RXR activation, synaptic long-term depression, and CCR3 pathways.

Figure 4:
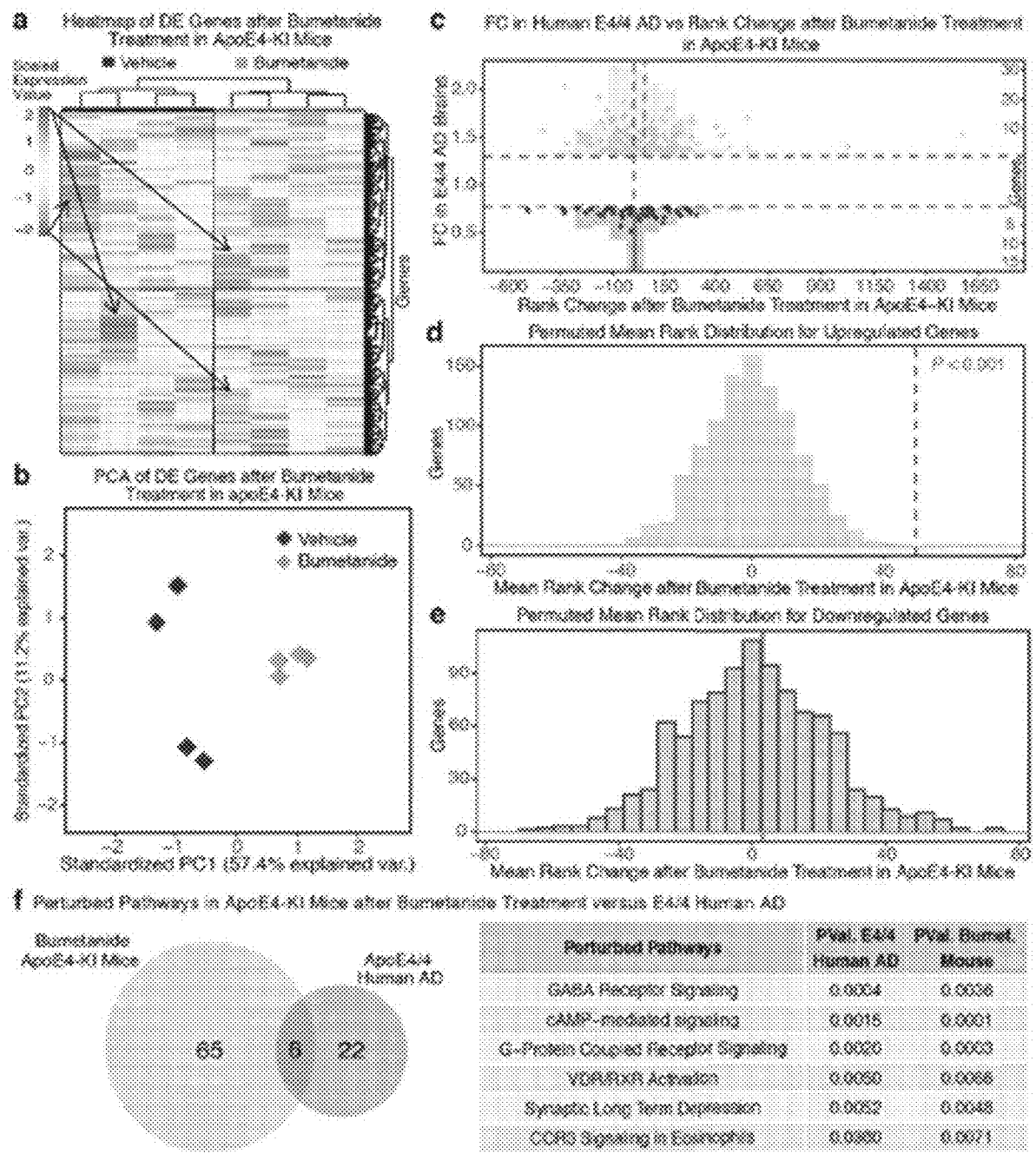
FIG. 4 (panels a through f) depicts in vivo studies of bumetanide's effect on the ApoE4-KI mouse hippocampal transcriptome.

FIG. 4 shows RNA-seq analysis of the transcriptomic perturbation signature of bumetanide in the hippocampus of apoE4-KI mice. Panel (a) shows hierarchical clustering analysis of scaled regularized log (rld) transformed RNA expression levels of DE genes ($P<0.05$) as quantified by RNA-seq of hippocampal tissues from apoE4-KI mice after treatment with bumetanide (0.2 mg/kg intraperitoneal injection for 8 weeks) or vehicle. Color bar denotes scaled rld expression levels. Panel (b) presents principal component analysis (PCA) of DE genes in apoE4-KI mouse hippocampal tissues separates bumetanide-treated samples from vehicle-treated samples. Principal component 1 (PC1) accounts for 57.4% and PC2 for 11.2% of the variance. Panel (c) shows the gene set representing the apoE4/4-specific transcriptomic signature of AD as derived from analysis of human temporal lobe samples (see FIG. 1) that were also detected by RNA-seq in apoE4-KI mouse hippocampus. The change in expression rank of these genes in apoE4-KI mouse hippocampal tissues following bumetanide treatment, as compared to vehicle treatment, was plotted against the estimated FC in human temporal lobe samples of apoE4/4 AD as compared to healthy controls. Mean change in expression rank of all genes after bumetanide treatment is zero as expected (vertical gray dotted line). The 157 genes that were upregulated in apoE4/4 human AD had an average change in expression rank of 49.76 (vertical red dotted line) after bumetanide treatment, indicating a shift toward lower ranks and lower expression in response to bumetanide. Right y-axis denotes number of genes in histogram of scatterplot values. Panels (d) and (e) present histograms of the mean change in expression rank after bumetanide treatment of 1000 random permutations of size-matched gene sets to sets of upregulated genes (n=157) (d) and downregulated genes (n=56) (e) in apoE4/4 AD. The mean change in expression rank of human apoE4/4-specific upregulated genes after bumetanide treatment (49.76, red dotted line) was significantly higher than zero (mean of 1000 permutations) as calculated by Monte Carlo simulation, indicating a significant shift toward lower expression; the mean change in expression rank of downregulated genes was not significantly shifted away from zero. Panel (f) is a Venn diagram and table of unique (65) and shared (6) significantly enriched ontological pathways by Ingenuity Pathway Analysis (IPA) in DE genes from hippocampus of apoE4-KI mice after bumetanide treatment ($P<0.05$) as compared to pathways significantly enriched in apoE4/4 AD in humans.

Hierarchical clustering and principal component analyses showed significant clustering of samples based on DE genes from bumetanide versus vehicle treatment (FIG. 4, panels a and b), suggesting a distinct drug effect in the hippocampus. Furthermore, in bumetanide-treated apoE4-KI mice, the genes significantly upregulated in apoE4/4 AD were shifted down in their expression ranks (toward higher numbered ranks) (FIG. 4, panels c and d, $P<0.001$ by Monte Carlo simulation), corroborating the CMap data and the hypothesis that reversal of the disease-specific transcriptomic signature is a rational strategy for computational drug repurposing, even in animal models. However, in apoE4-KI mice, bumetanide did not alter the smaller subset of genes downregulated in apoE4/4 AD (FIG. 4, panel e), perhaps because some of the downregulated genes reflect cell death rather than altered gene expression in apoE4/4 AD.

Overall, pathway analysis of the genes whose expression was most affected by bumetanide in apoE4-KI mice (P<0.05) resulted in identification of 71 significantly perturbed pathways. Interestingly, six of these pathways overlapped with those enriched in the apoE4/4 AD signature:-GABA receptor signaling, cAMP-mediated signaling, G-protein-coupled receptor signaling, VDR/RXR activation, synaptic long-term depression, and CCR3 pathways (FIG. 4, panel f).

REFERENCES

1. Huang, Y. & Mucke, L. Alzheimer mechanisms and therapeutic strategies. *Cell* 148, 1204-1222 (2012).
2. Golde, T. E., Schneider, L. S. & Koo, E. H. Anti-Aβ therapeutics in Alzheimer's disease: the need for a paradigm shift. *Neuron* 69, 203-213 (2011).
3. Corder, E. H., et al. Gene dose of apolipoprotein E type 4 allele and the risk of Alzheimer's disease in late onset families. *Science* 261, 921-923 (1993).
4. Huang, Y. Aβ-independent roles of apolipoprotein E4 in the pathogenesis of Alzheimer's disease. *Trends Mol. Med.* 16, 287-294 (2010).
5. Mahley, R. W. & Huang, Y. Apolipoprotein E sets the stage: response to injury triggers neuropathology. *Neuron* 76, 871-885 (2012).
6. Farrer, L. A., et al. Effects of age, sex, and ethnicity on the association between apolipoprotein E genotype and Alzheimer disease. A meta-analysis. *J. Am. Med. Assoc.* 278, 1349-1356 (1997).
7. Genin, E., et al. APOE and Alzheimer disease: a major gene with semi-dominant inheritance. *Mol. Psychiatry* 16, 903-907 (2011).
8. Lamb, J., et al. The Connectivity Map: using gene-expression signatures to connect small molecules, genes, and disease. *Science* 313, 1929-1935 (2006).
9. Cheng, F., et al. Prediction of drug-target interactions and drug repositioning via network-based inference. *PLOS Comput. Biol.* 8, e1002503 (2012).
10. Csermely, P., Korcsmaros, T., Kiss, H. J., London, G. & Nussinov, R. Structure and dynamics of molecular network: a novel paradigm of drug discovery: a comprehensive review. *Pharmacol. Ther.* 138, 333-408 (2013).
11. Sirota, M., et al. Discovery and preclinical validation of drug indications using compendia of public gene expression data. *Sci. Transl. Med.* 3, 96ra77 (2011).
12. Dudley, J. T., et al. Computational repositioning of the anticonvulsant topiramate for inflammatory bowel disease. *Sci. Transl. Med.* 3, 96ra76 (2011).
13. Chen, B., et al. Reversal of cancer gene expression correlates with drug efficacy and reveals therapeutic targets. *Nat. Commun.* 8, 16022 (2017).
14. Chen, B. & Butte, A. J. Leveraging big data to transform target selection and drug discovery. *Clin. Pharmacol. Ther.* 99, 285-297 (2016).
15. Cai, X., Chen, Y., Gao, Z. & Xu, R. Explore Small Molecule-induced Genome-wide Transcriptional Profiles for Novel Inflammatory Bowel Disease Drug. *AMIA Jt. Summits. Transl. Sci. Proc.* 2016, 22-31 (2016).
16. Chen, B., et al. Computational Discovery of Niclosamide Ethanolamine, a Repurposed Drug Candidate That Reduces Growth of Hepatocellular Carcinoma Cells In Vitro and in Mice by Inhibiting Cell Division Cycle 37 Signaling. *Gastroenterology* 152, 2022-2036 (2017).
17. Webster, J. A., et al. Genetic control of human brain transcript expression in Alzheimer disease. *Am. J. Hum. Genet.* 84, 445-458 (2009).
18. Zou, F., et al. Brain expression genome-wide association study (eGWAS) identifies human disease-associated variants. *PLOS Genet.* 8, e1002707 (2012).
19. Hong, F., et al. RankProd: a bioconductor package for detecting differentially expressed genes in meta-analysis. *Bioinformatics* 22, 2825-2827 (2006).
20. Andrews-Zwilling, Y., et al. Apolipoprotein E4 causes age- and Tau-dependent impairment of GABAergic interneurons, leading to learning and memory deficits in mice. *J. Neurosci.* 30, 13707-13717 (2010).
21. Leung, L., et al. Apolipoprotein E4 causes age- and sex-dependent impairments of hilar GABAergic interneurons and learning and memory deficits in mice. *PLOS One* 7, e53569 (2012).
22. Tong, L. M., et al. Inhibitory interneuron progenitor transplantation restores normal learning and memory in apoE4 knock-in mice without or with Aβ accumulation. *J. Neurosci.* 34, 9506-9515 (2014).
23. Knoferle, J., et al. Apolipoprotein E4 produced in GABAergic interneurons causes learning and memory deficits in mice. *J. Neurosci.* 34, 14069-14078 (2014).
24. Edgar, R., Domrachev, M. & Lash, A. E. Gene Expression Omnibus: NCBI gene expression and hybridization array data repository. *Nucleic Acids Res.* 30, 207-210 (2002).
25. Workman, C., et al. A new non-linear normalization method for reducing variability in DNA microarray experiments. *Genome Biol.* 3, research0048.0041-0048.0016 (2002).
26. Sharov, A. A., Schlessinger, D. & Ko, M. S. ExAtlas: An interactive online tool for meta-analysis of gene expression data. *J. Bioinform. Comput. Biol.* 13, 1550019 (2015).
27. Durbin, B. P., Hardin, J. S., Hawkins, D. M. & Rocke, D. M. A variance-stabilizing transformation for gene-expression microarray data. *Bioinformatics* 18, S105-S110 (2002).
28. Leek, J. T., Johnson, W. E., Parker, H. S., Jaffe, A. E. & Storey, J. D. The sva package for removing batch effects and other unwanted variation in high-throughput experiments. *Bioinformatics* 28, 882-883 (2012).
29. Siavelis, J. C., Bourdakou, M. M., Athanasiadis, E. I., Spyrou, G. M. & Nikita, K. S. Bioinformatics methods in drug repurposing for Alzheimer's disease. *Brief Bioinform.* 17, 322-335 (2016).
30. Hamanaka, H., et al. Altered cholesterol metabolism in human apolipoprotein E4 knock-in mice. *Hum. Mol. Genet.* 9, 353-361 (2000).
31. Sullivan, P. M., Mace, B. E., Maeda, N. & Schmechel, D. E. Marked regional differences of brain human apolipoprotein E expression in targeted replacement mice. *Neuroscience* 124, 725-733 (2004).
32. Raber, J., et al. Isoform-specific effects of human apolipoprotein E on brain function revealed in ApoE knock-out mice: Increased susceptibility of females. *Proc. Natl. Acad. Sci. USA* 95, 10914-10919 (1998).
33. Dobin, A., et al. STAR: ultrafast universal RNA-seq aligner. *Bioinformatics* 29, 15-21 (2013).

34. Liao, Y., Smyth, G. K. & Shi, W. featureCounts: an efficient general purpose program for assigning sequence reads to genomic features. *Bioinformatics* 30, 923-930 (2014).

35. Robinson, M. D., McCarthy, D. J. & Smyth, G. K. edgeR: a Bioconductor package for differential expression analysis of digital gene expression data. *Bioinformatics* 26, 139-140 (2010).

SUPPLEMENTARY REFERENCES

1. Barnes, M., Freudenberg, J., Thompson, S., Aronow, B. & Pavlidis, P. Experimental comparison and cross-validation of the Affymetrix and Illumina gene expression analysis platforms. *Nucleic Acids Res.* 33, 5914-5923 (2005).

2. Webster, J. A., et al. Genetic control of human brain transcript expression in Alzheimer disease. *Am. J. Hum. Genet.* 84, 445-458 (2009).

3. Sharov, A. A., Schlessinger, D. & Ko, M. S. ExAtlas: An interactive online tool for meta-analysis of gene expression data. *J. Bioinform. Comput. Biol.* 13, 1550019 (2015).

4. Zou, F., et al. Brain expression genome-wide association study (eGWAS) identifies human disease-associated variants. *PLOS Genet.* 8, e1002707 (2012).

5. Durbin, B. P., Hardin, J. S., Hawkins, D. M. & Rocke, D. M. A variance-stabilizing transformation for gene-expression microarray data. *Bioinformatics* 18, S105-S110 (2002).

6. Siavelis, J. C., Bourdakou, M. M., Athanasiadis, E. I., Spyrou, G. M. & Nikita, K. S. Bioinformatics methods in drug repurposing for Alzheimer's disease. *Brief Bioinform.* 17, 322-335 (2016).

While a number of exemplary aspects and embodiments have been discussed above, it should be understood by those skilled in the art that various changes may be made and equivalents may be substituted without departing from the true spirit and scope of the invention. In addition, many modifications, permutations, additions and sub-combinations thereof may be made to adapt a particular situation, material, composition of matter, process, process step or steps, to the objective, spirit and scope of the present invention. All such modifications are intended to be within the scope of the claims appended hereto.

Example 4

Figure 12:
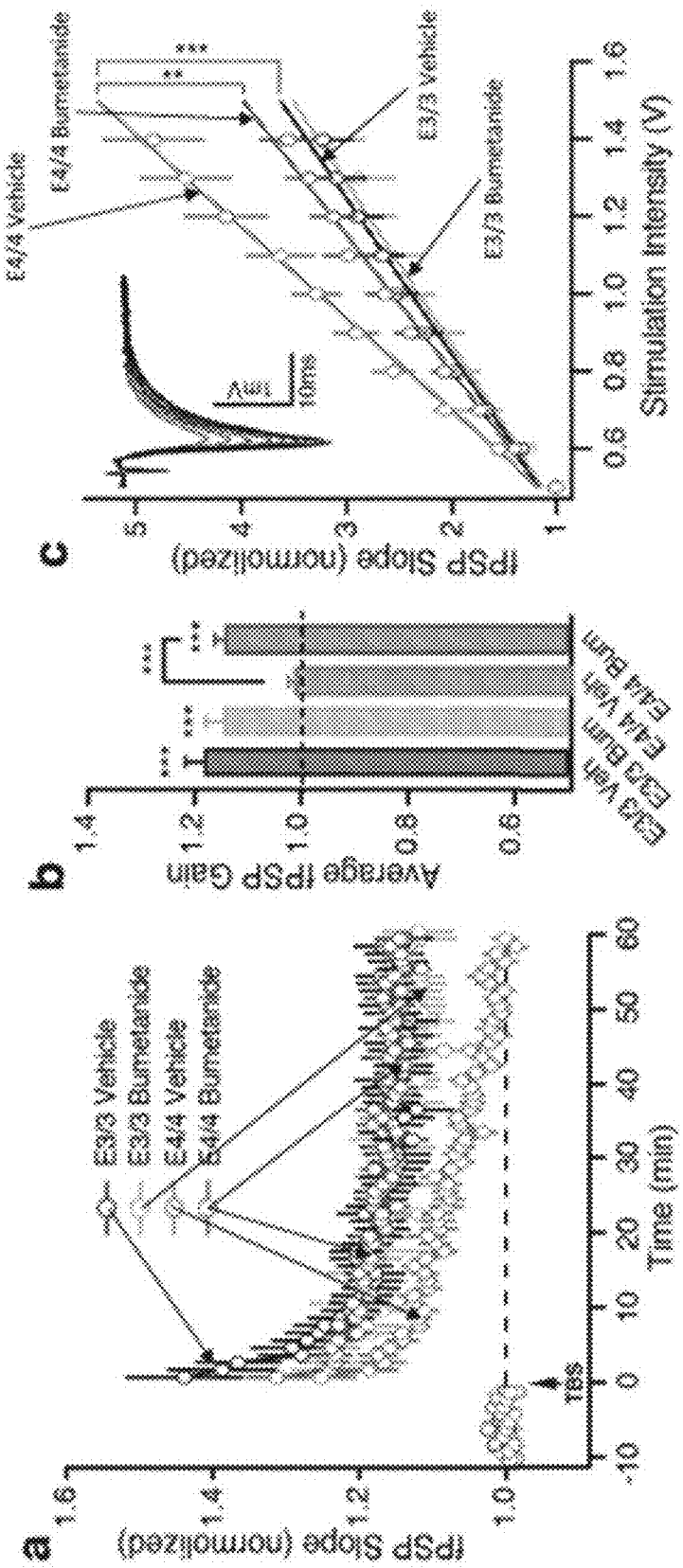
FIG. 12 provides graphs demonstrating that bumetanide treatment rescues neuronal plasticity deficit specifically in aged apoE4-KI mice.

Bumetanide Treatment Rescues Neuronal Plasticity and Excitability Deficits in Aged APOE4-KI MICE In an effort to gain a better understanding of the underlying mechanisms of apoE4-specific behavioral rescue, the genotype-specific effects of bumetanide on long-term potentiation (LTP) were tested. LTP is an electrophysiological measurement of neuronal plasticity. It has been considered as a molecular mechanism underlying normal memory formation, and it is impaired in animal models of AD. In line with memory impairment of aged (16-month-old) apoE4-KI mice, LTP recorded in the CA1 region of the hippocampal slices showed significant deficit in aged vehicle-treated apoE4-KI mice compared to age-matched vehicle-treated apoE3-KI mice (FIG. 12, panels a and b). Bumetanide treatment (0.2 mg/kg for 8 weeks) completely rescued LTP deficit in aged apoE4-KI mice (FIG. 12, panels a and b). Furthermore, neuronal hyperexcitability in the CA1 region of the hippocampus in apoE4-KI mice, measured by input-output curve analysis, was also normalized by bumetanide treatment (FIG. 12, panel c). Thus, in vivo bumetanide treatment restored neuronal plasticity and excitability, which underlies normal memory formation, in the hippocampus of aged apoE4-KI mice.

As discussed above, FIG. 12 provides graphs demonstrating that bumetanide treatment rescues neuronal plasticity deficit specifically in aged apoE4-KI mice. (Panels a and b) High dose (0.2 mg/kg) of bumetanide treatment for 8 weeks rescued LTP deficit in ex-vivo hippocampal slices from apoE4-KI mice. Theta burst stimulation (TBS)-induced LTP was measured on ex-vivo hippocampal slices from vehicle-treated apoE3-KI mice (n=14 brain slices from 6 mice), bumetanide-treated apoE3-KI mice (n=11 brain slices from 3 mice), vehicle-treated apoE4-KI mice (n=14 brain slices from 6 mice), and bumetanide-treated apoE4-KI mice (n=12 brain slices from 3 mice) at ages of 16 months. Average fPSP slope values were binned to one-minute intervals and normalized to control (a). LTP gain outcomes across experimental groups were summarized (b). (Panel c) High dose of bumetanide treatment rescued hippocampal network excitability deficit in ex-vivo hippocampal slices from apoE4-KI mice. Input-output relationships in Shaeffer collaterals-CA1 network were measured on ex-vivo hippocampal slices from vehicle-treated apoE3-KI mice (n=23 brain slices from 7 mice), bumetanide-treated apoE3-KI mice (n=10 brain slices from 3 mice), vehicle-treated apoE4-KI mice (n=11 brain slices from 3 mice), and bumetanide-treated apoE4-KI mice (n=12 brain slices from 3 mice) at ages of 16 months. The average fPSP slope values (normalized to minimum) across increasing stimulus amplitude were shown. Values are mean±SEM. Two-tailed t test was used for statistical analysis of intergroup LTP gain outcomes in b. Mann-Whitney U-test was used to analyze differences between animal groups in c. $p<0.01$; *$p<0.001$.

Example 5

Figure 13A:
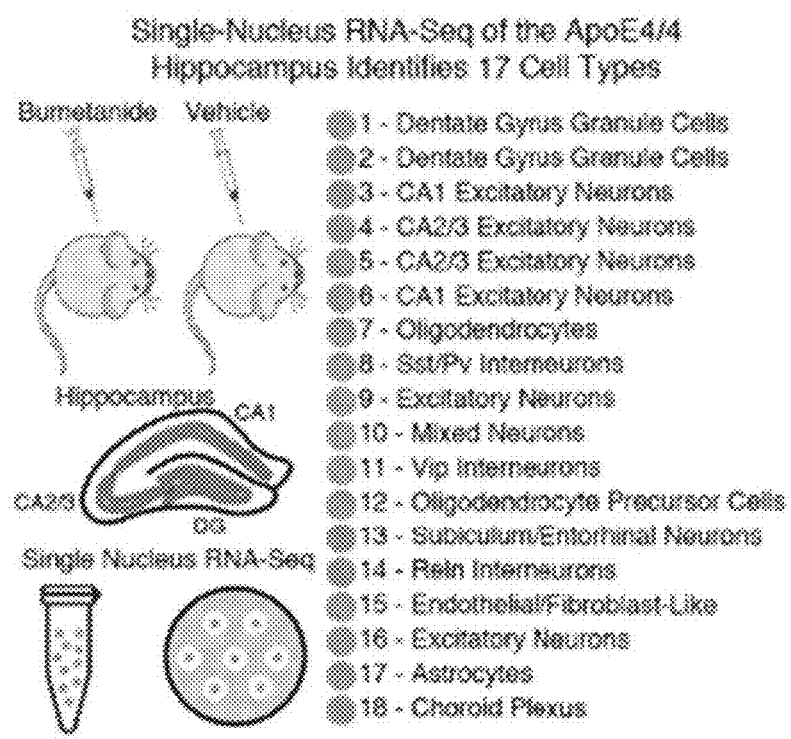
FIGS. 13A-13G provide schematics, plots, and graphs showing the results of single-nucleus RNA-seq analysis of the transcriptomic perturbation signature of bumetanide in the hippocampus of aged apoE4-KI mice.
Figure 13B:
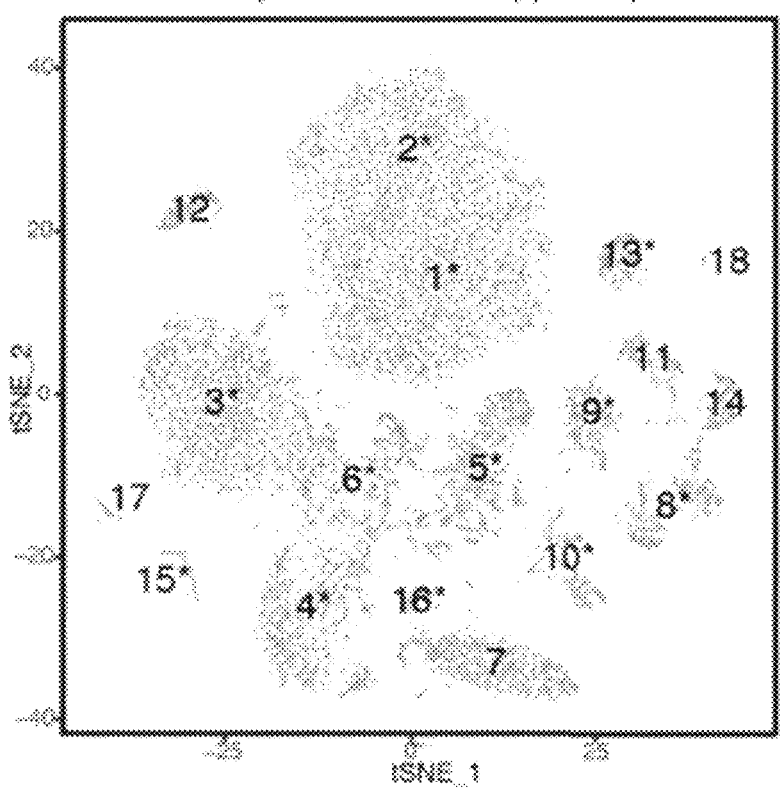
Figure 13C:
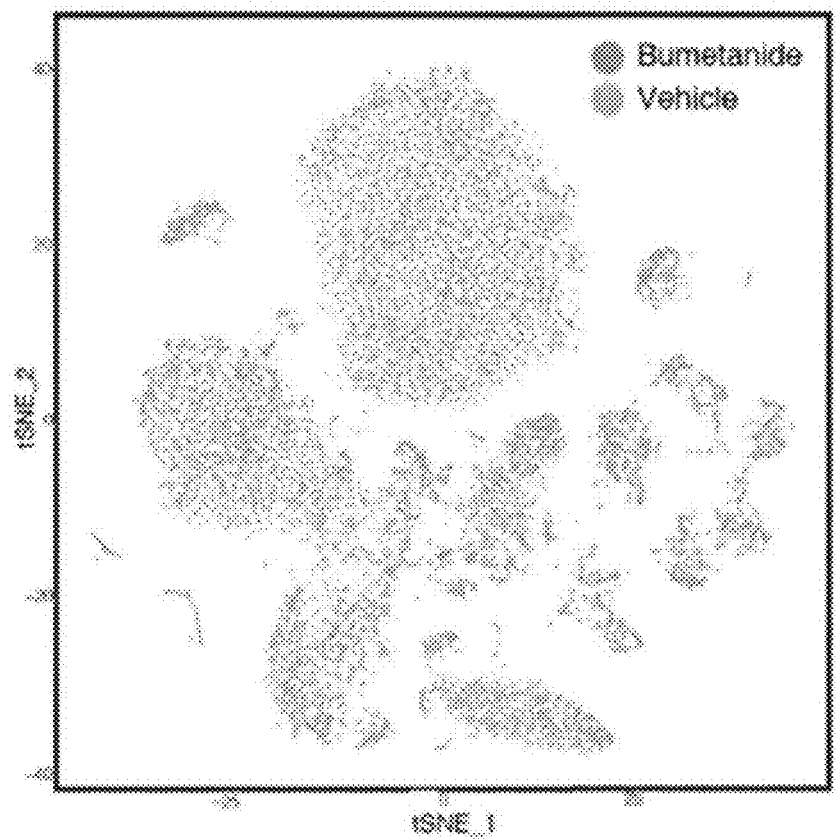
Figure 13D:
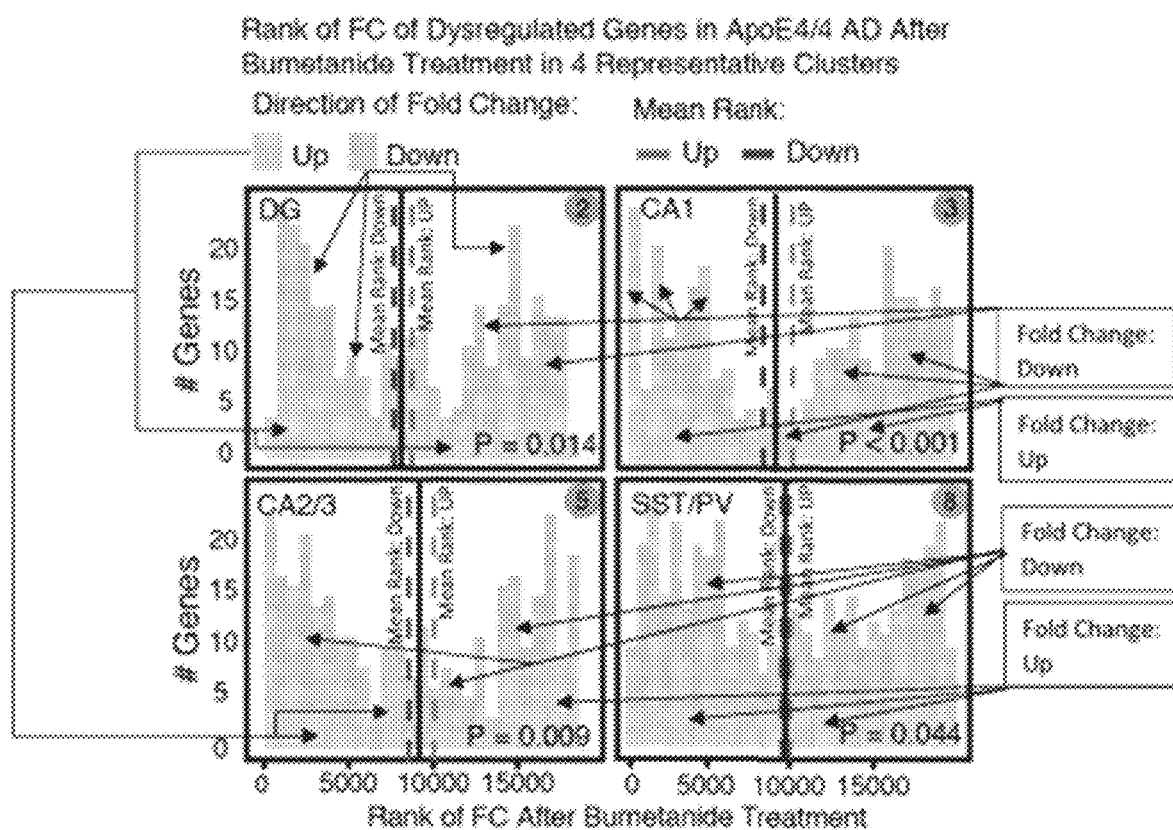
Figure 13E:
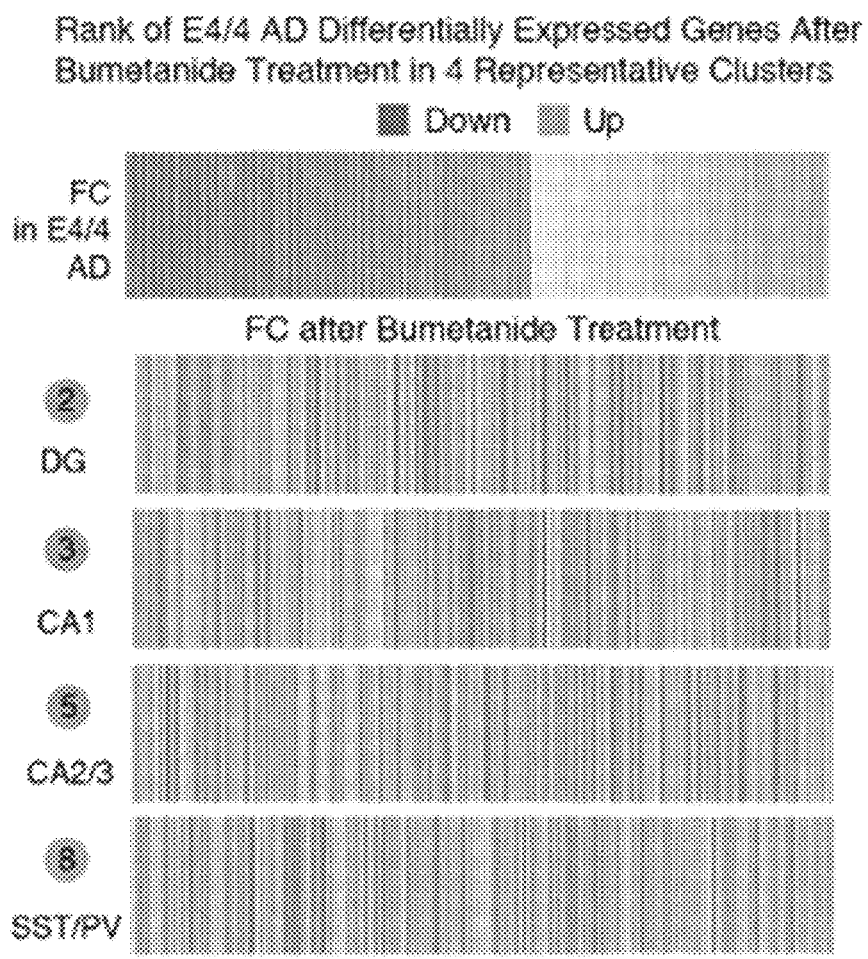
Figure 13F:
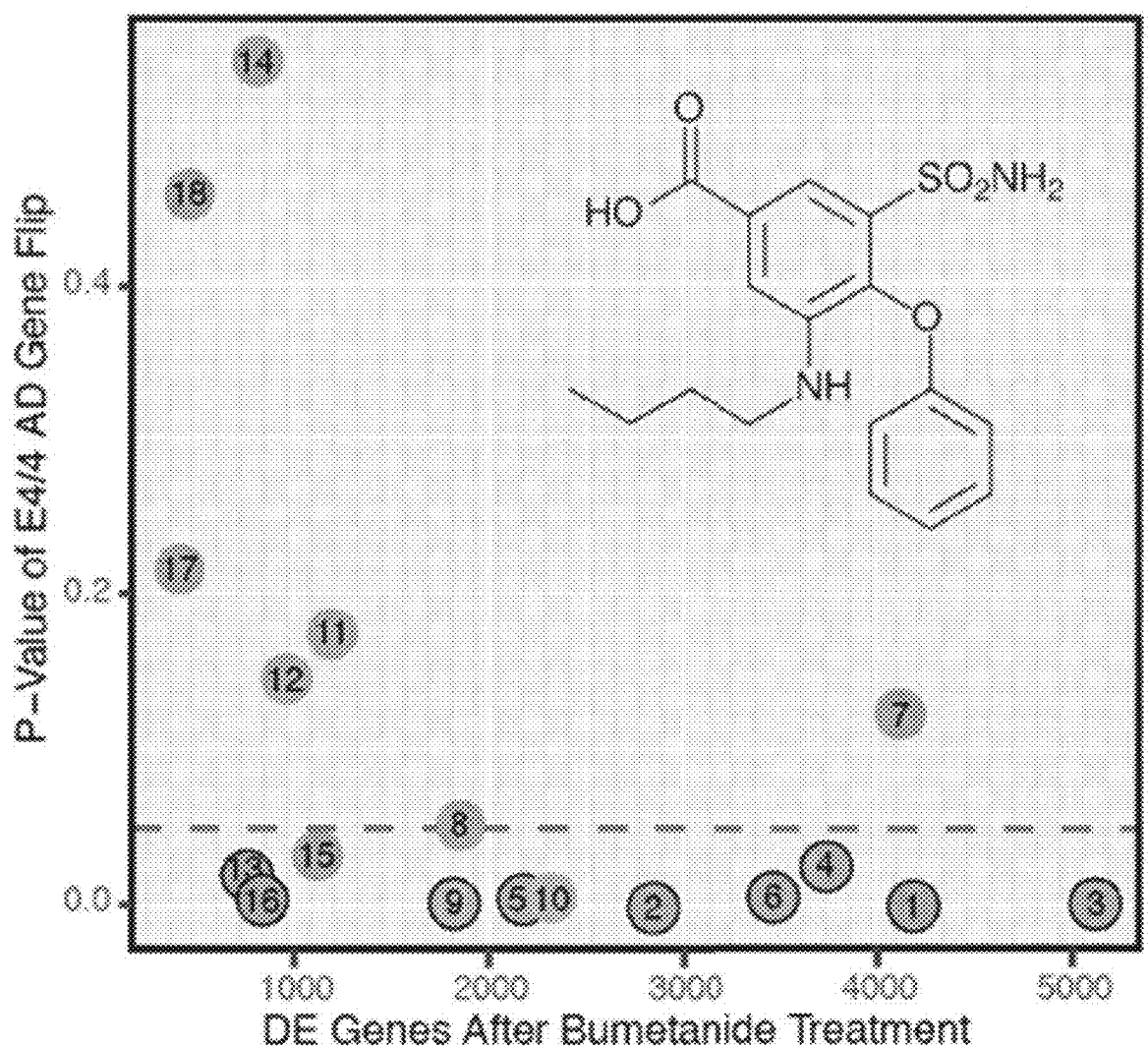
Figure 13G:
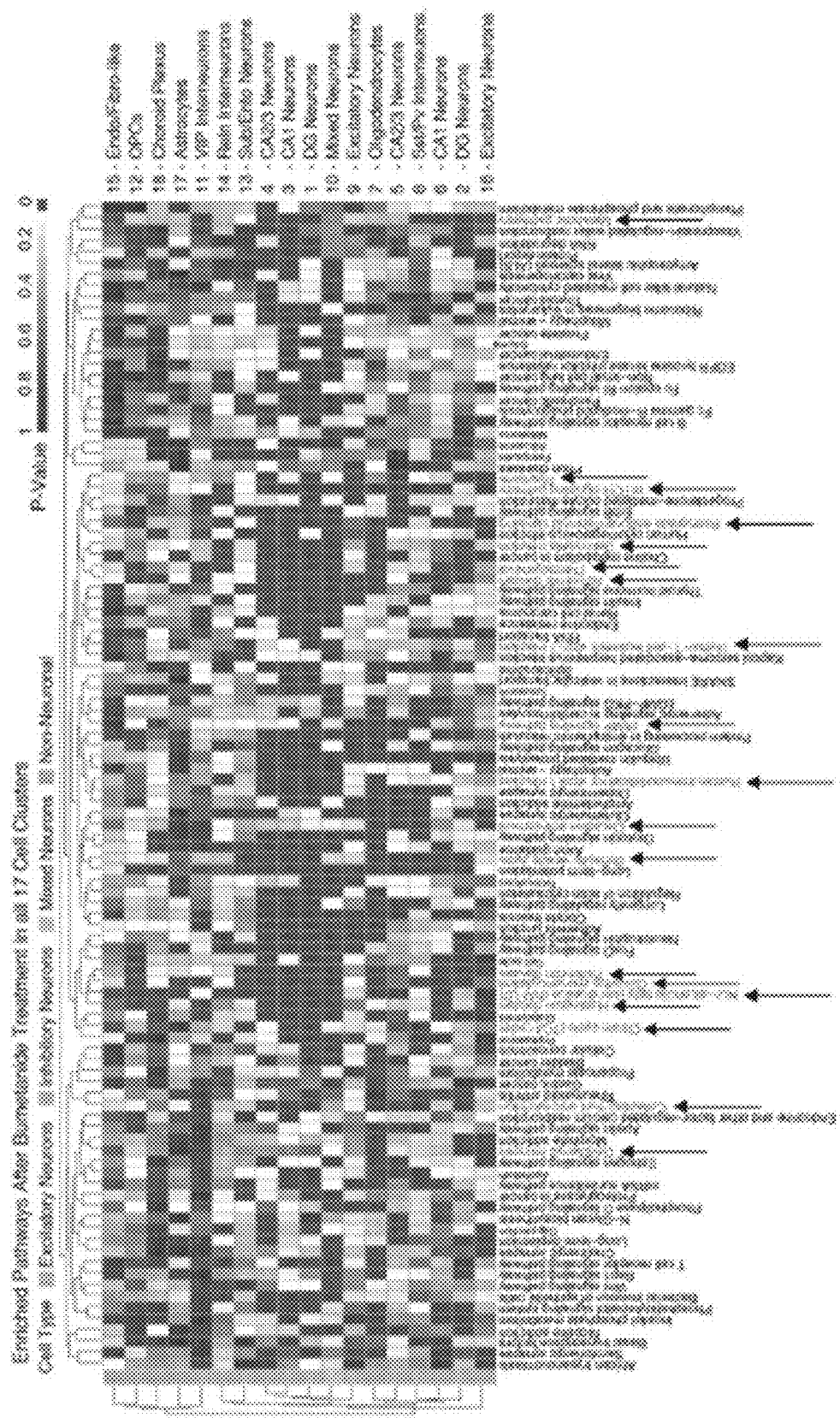

Bumetanide Treatment Flips APOE4/4 AD Transcriptomic Signature Genes in Selective Neuron Types in Aged APOE4-KI Mouse Hippocampus To explore bumetanide's effects on the transcriptome in individual hippocampal cells in vivo, a single-nucleus RNA-seq analysis of differential gene expression was performed after bumetanide treatment in the hippocampus, a temporal lobe region considered the epicenter of AD pathologies, from apoE4-KI mice treated with vehicle or bumetanide (0.2 mg/kg daily intraperitoneal injection) for 8 weeks. 18 distinct clusters of hippocampal cells were identified and analyzed further for cell-type specific drug effects (FIGS. 13A-13C). In 12 cell types, including all excitatory and mixed neuronal clusters as well as SST/PV interneurons, genes upregulated in apoE4/4 AD were shifted downward towards higher rank numbers and those downregulated in apoE4/4 AD were shifted upward towards lower rank numbers after bumetanide treatment ($P<0.05$ by Monte Carlo Simulation), confirming that the transcriptomic perturbation signature of bumetanide correlates negatively with that of human apoE4/4 AD in these neuronal cell types (FIGS. 13D and 13E). This shift corroborates the CMap data and the hypothesis that reversal of the disease-specific transcriptomic signature is a rational strategy for computational drug repurposing, even in neuronal cells in animal models. This shift was seen across excitatory neuronal cell types and SST/PV interneurons regardless of number of DE genes, suggesting that this effect is robust across both drug effect and cluster size (FIG. 13F). There were 104 ontological pathways that were enriched ($p<0.005$) in at least one of the neuronal cell types that had a significant "flip" of human apoE4/4 AD genes (FIG. 13G), 19 of which were also enriched in apoE4/4-mediated AD in humans (identified by black arrows).

As discussed above, FIGS. 13A-13G provide schematics, plots, and graphs showing the results of Single-nucleus RNA-seq analysis of the transcriptomic perturbation signature of bumetanide in the hippocampus of apoE4-KI mice. (FIG. 13A) More than 24,000 nuclei from the hippocampus of bumetanide and vehicle treated mice were sequenced together in a single experiment via high-throughput barcode multiplexing. (FIG. 13B) Clustering and visualization by t-SNE identifies 18 distinct clusters which are coded according to cell type. An asterisk denotes clusters in which the average rank of FC of up-regulated genes in apoE4/4-specific transcriptomic signature of AD as derived from analysis of human temporal lobar samples AD is significantly down-regulated and down-regulated genes in human apoE4/4 AD are significantly up-regulated (P<0.05). (FIG. 13C) Clusters color-coded by treatment show distinct drug effect. (FIG. 13D) Histogram of the human apoE4/4-specific transcriptomic signature of AD geneset that was also detected by single-nucleus seq in the apoE4-KI mouse hippocampus in four representative clusters. The rank of the FC of these genes in a dentate gyrus granule cell cluster, a CA1 neuronal cluster, a CA2/3 neuronal clutser, and the Sst/Pv interneuronal cluster in apoE4-KI mouse hippocampi following bumetanide treatment, as compared to vehicle treatment is plotted on the x-axis versus number of genes at that rank on the y-axis. The mean rank of all genes in this geneset is denoted by the black line, the average mean FC rank of up-regulated genes (colored red in histogram) is denoted by the red dotted line and the mean FC rank of the down-regulated genes (colored blue in histogram) is denoted by the blue dotted line. P-value of the significance of the "flip" of up- and down-regulated FC rank means away from the rank mean of all genes as calculated by Monte-Carlo simulation is shown (P<0.05 considered significant). (FIG. 13E) Heatmap of genes from apoE4/4-specific transcriptomic signature of AD, rank ordered and color coded by estimated FC in human apoE4/4 AD (top) and then re-color-coded by FC rank after bumetanide in four representative cell types (bottom) in the apoE4/4-KI mouse hippocampus. Bumetanide flips the expression rank of both up- and down-regulated genes in the human apoE4/4-specific transcriptomic signature of AD in these four clusters. (FIG. 13F) P-value of the "flip" of apoE4/4 specific transcriptomic signatures of AD is plotted on the y-axis versus number of DE genes in each cluster on the x-axis. The dashed line denotes P=0.05, and all excitatory neuronal clusters are highlighted with a black outline. All excitatory neuronal clusters, mixed neuronal clusters, Sst/Pv interneurons, and endothelial/fibroblast-like cells exhibit a significant "flip" in these genes despite varying numbers of DE genes. (FIG. 13G) Heatmap of p-values of dysregulated ontological pathways in all neuronal clusters exhibiting the "flip" behavior of apoe4/4 specific transcriptomic signatures of AD reveals 104 pathways that are dysregulated in at least one of these cell types (P<0.005). Pathway names designated with arrows (n=19 pathways) are shared with apoE4/4-mediated human AD signature. The cell type groups from left to right on the y-axis are as follows: non-neuronal, inhibitory neurons, excitatory neurons, mixed neurons, excitatory neurons, non-neuronal, excitatory neurons, inhibitory neurons, and excitatory neurons. The pathways listed from left to right on the x-axis are as follows: African trypanosomiasis, Serotonergic synapse, Basal transcription factors, Nicotine addiction Inositol phosphate metabolism, Phosphatidylinositol signaling system, Bacterial invasion of epithelial cells, Wnt signaling pathway, Rap1 signaling pathway, T cell receptor signaling pathway, Cholinergic synapse, Long-term depression, Gap junction, N-Glycan biosynthesis, Phospholipase D signaling pathway, Proteoglycans in cancer, mRNA surveillance pathway, Alcoholism, Estrogen signaling pathway, GABAergic synapse, Morphine addiction, Apelin signaling pathway, Endocrine and other factor-regulated calcium reabsorption, Collecting duct acid secretion, Rheumatoid arthritis, Gastric cancer, Propanoate metabolism, Bladder cancer, Cellular senescence, Proteasome, Citrate cycle (TCA cycle), Endocytosis, Huntington disease, Non-alcoholic fatty liver disease (NAFLD), Oxidative phosphorylation, Parkinson disease, Cell cycle, FoxO signaling pathway, Neurotrophin signaling pathway, Adherens junction, Oocyte meosis, Longevity regulating pathway, Regulation of actin cytoskeleton, Tuberculosis, Long-Term potentiation, Synaptic vesicle cycle, Axon guidance, Oxytocin signaling pathway, Circadian entrainment, Glutamatergic synapse, Amphetamine addiction, Dopaminergic synapse, Human immunodeficiency virus 1 infection, Autophagy-animal, Ubiquitin mediated proteolysis, Glucagon signaling pathway, Protein processing in endoplasmic reticulum, cAMP signaling pathway, Adrenergic signaling in cardiomyocytes, cGMP-PKG signaling pathway, Lysosome, SNARE interactions in vesicular transport, Spliceosome, Kaposi sarcoma-associated herpesvirus infection, Human T-cell leukemia virus 1 infection, RNA transport, Endocrine resistance, Renal cell carcinoma, Insulin signaling pathway, Thyroid hormone signaling pathway, Alzheimer disease, Thermogenesis, Choline metabolism in cancer, *Salmonella* infection, Human cytomegalovirus, infection, Retrograde endocannabinoid signaling, ErbB signaling pathway, Progesterone-mediated oocyte maturation, mTOR signaling pathway, Phagosome, Prion disease, Ferroptosis, Ribosome, Melanoma, B cell receptor signaling pathway, Fc gamma R-mediated phagocytosis, Pancreatic cancer, Fc epsilon RI signaling pathway, Non-small cell lung cancer, EGFR tyrosine kinase inhibitor resistance, Glioma, Prostate cancer, Mitophagy-animal, Ribosomes biogenesis in eukaryotes, Thyroid cancer, Natural killer cell mediated cytotoxicity, Viral carcinogenesis, Amyotrophic lateral sclerosis (ALS), Protein export, RNA degradation, Vasopressin-regulated water reabsorption, Metabolic pathways, Phosphonate and phosphinate metabolism.

Example 6

Bumetanide Treatment Flips APOE4/4 AD Transcriptomic Signature Genes in APOE4/4-IPSC-Derived Human Neurons.

Figure 14B:
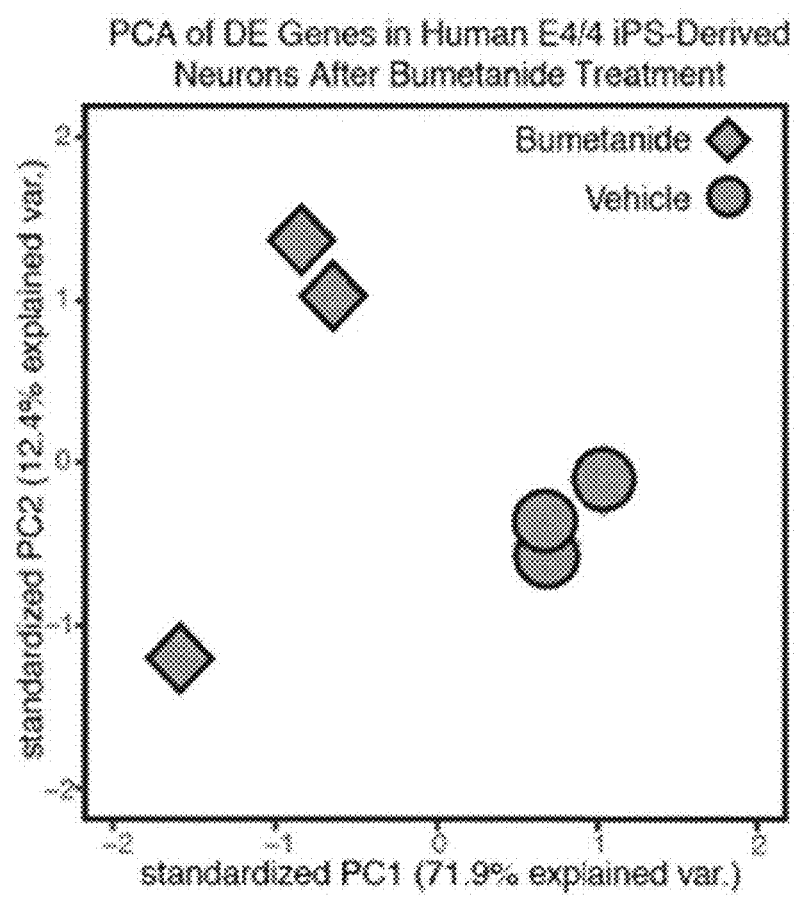
Figure 14C:
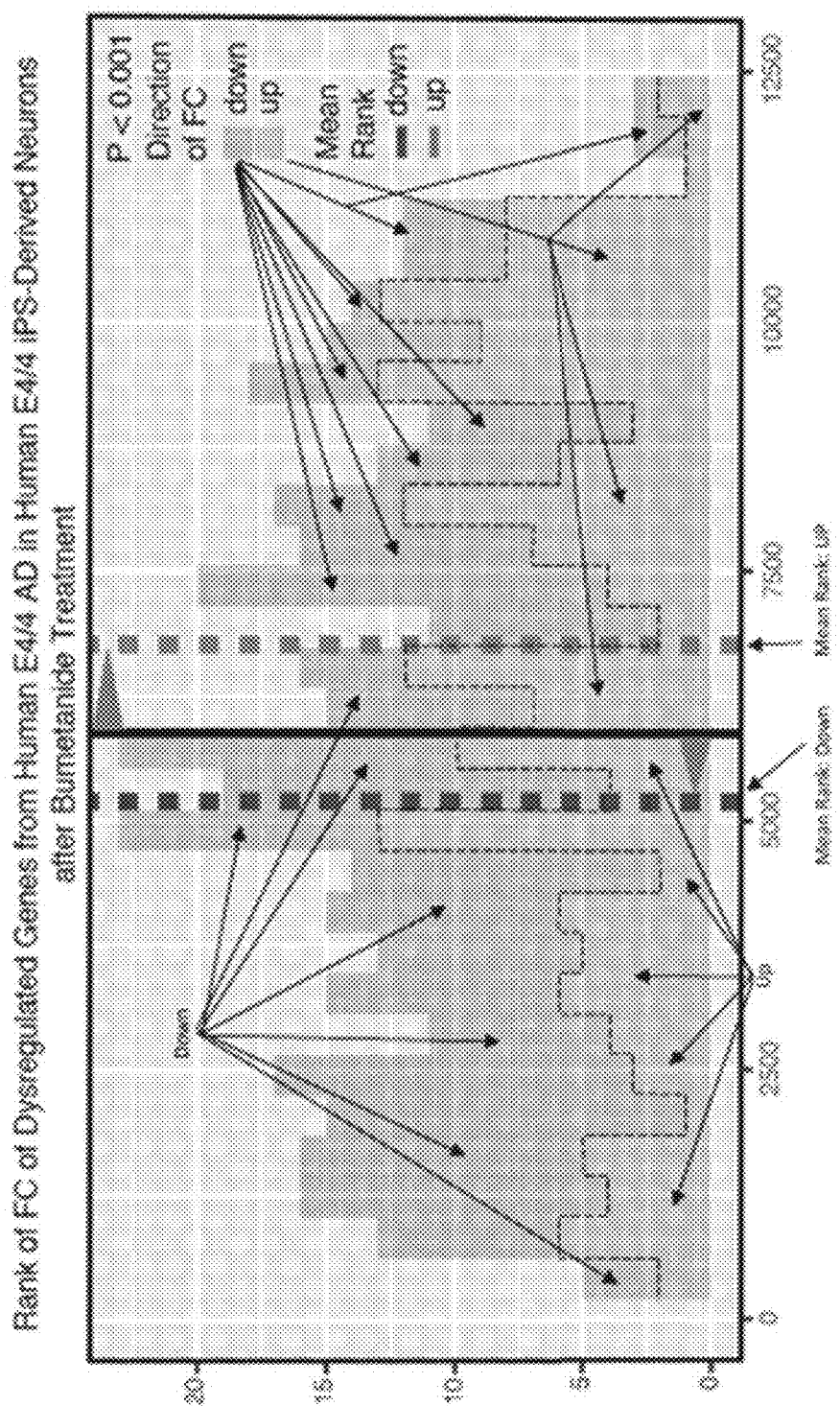
Figure 14D:
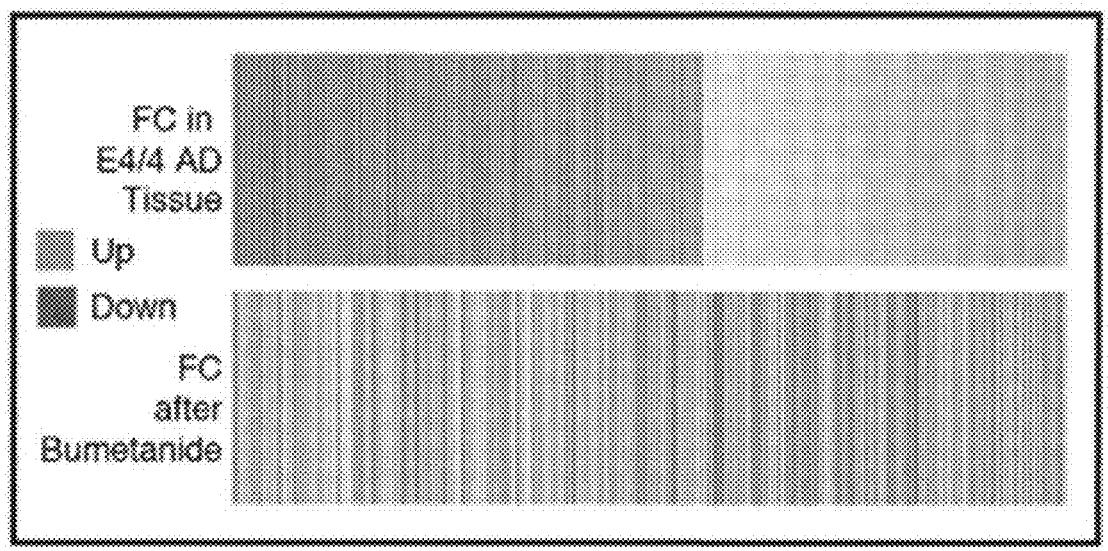

ApoE4/4-iPSC-derived human neurons (~75% excitatory neurons, ~15% inhibitory neurons, and ~5% dopaminergic neurons) were treated with bumetanide in vitro (10 µM) for 6 hours, then transcriptional changes were interrogated by RNA-seq analysis (FIG. 14A). Principal component analyses showed significant clustering of samples based on differentially expressed (DE) genes from bumetanide versus vehicle treatment (FIG. 14B), suggesting a distinct drug effect on human apoE4/4-iPSC-derived neurons. Furthermore, in bumetanide-treated apoE4/4-iPSC-derived neurons, genes upregulated in apoE4/4 AD were shifted downward towards higher rank numbers and those downregulated in apoE4/4 AD were shifted upward towards lower rank numbers after bumetanide treatment (P<0.05 by Monte Carlo Simulation), further corroborating the CMap database's prediction and underscoring the suitability of human iPSC-derived neurons for in vitro drug repurposing efforts (FIGS. 14C and 14D).

Figure 14E:
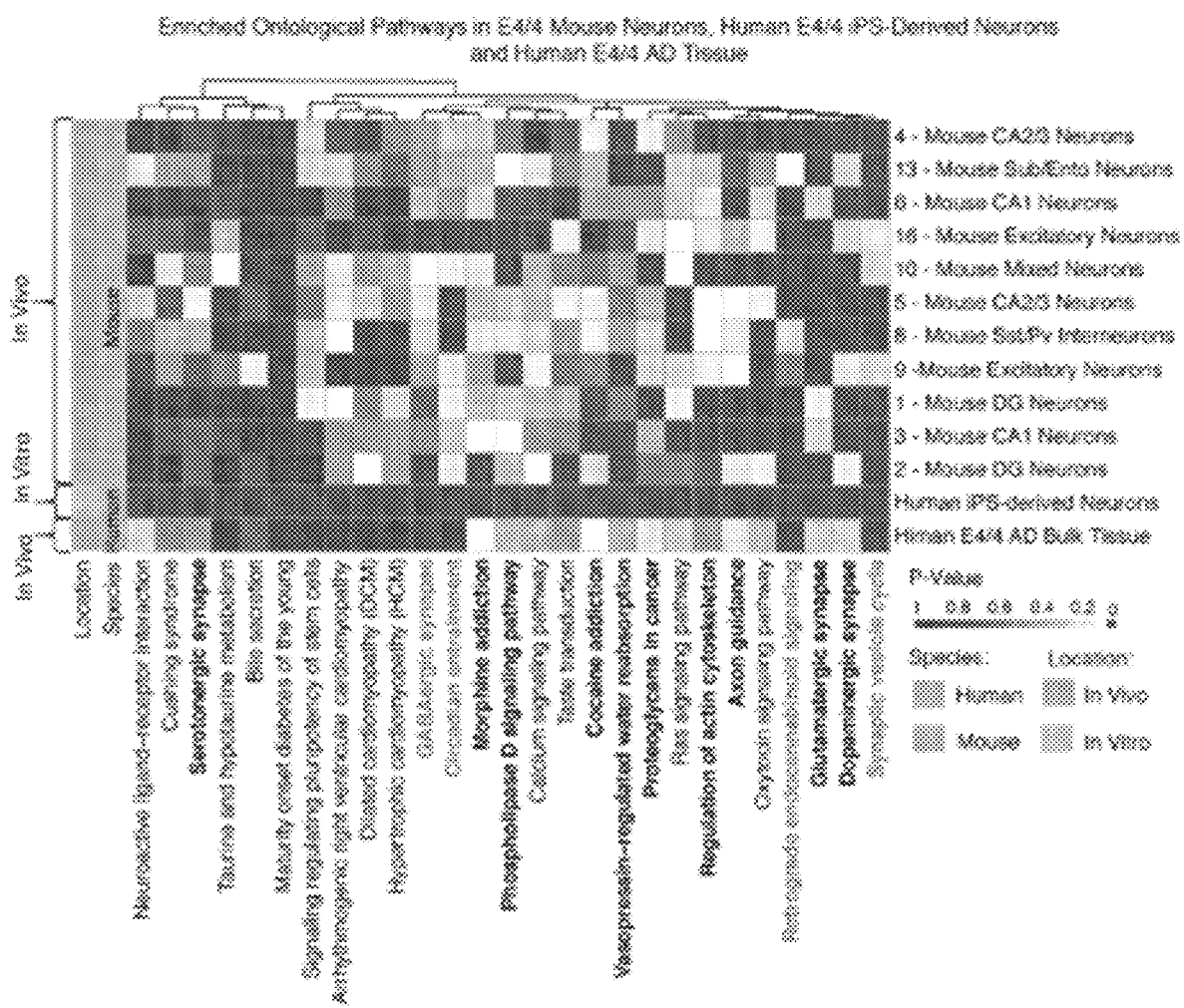
Figure 14F:
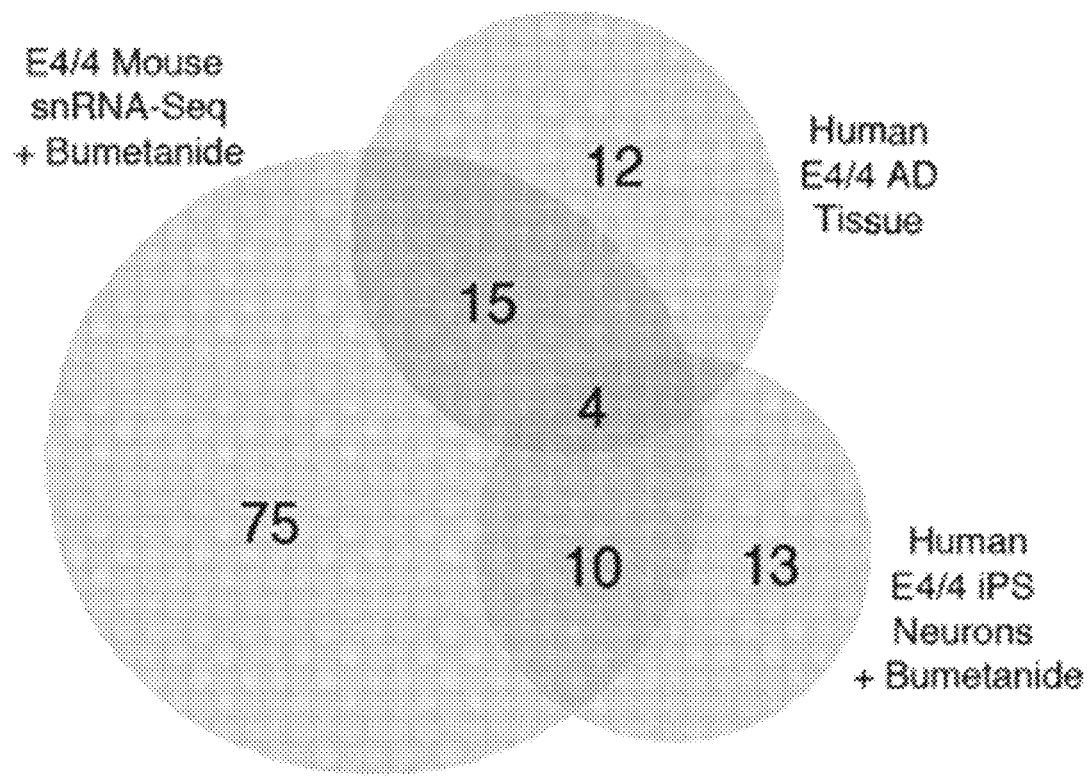

Pathway analysis of the genes whose expression was affected by bumetanide in apoE4/4-iPSC-derived human neurons identified 27 significantly perturbed pathways (FIG. 14E). Interestingly, 14 of these pathways overlapped with those enriched in mouse hippocampal neuronal cells exhibiting the predicted drug effect (including excitatory neurons and SST/PV interneurons), and 4 of these pathways were also shared with the apoE4/4 AD signature from humans: GABAergic synapse, circadian entrainment, retrograde endocannabinoid signaling, and synaptic vesicle cycle (FIGS. 14E and 14F).

As discussed above, FIGS. 14A-14F provide schematics and graphs showing the results of RNA-seq analysis of the transcriptomic perturbation signature of bumetanide in apoE4/4-iPSC-derived human neurons. (FIG. 14A) ApoE4/4-iPSC-derived human neurons were treated for 6 hours with 10 µM bumetanide and transcriptomic changes were analyzed by RNA-Seq. (FIG. 14B) Principal component analysis (PCA) of DE genes in bumetanide treated apoE4/4-iPSC-derived human neurons separates bumetanide treated samples from vehicle treated samples. Principal component 1 (PC1) accounts for 71.9% and PC2 for 12.4% of the variance. (FIG. 14C) Histogram of the human apoE4/4-specific transcriptomic signature of AD geneset that were also detected by RNA-Seq in apoE4/4-iPSC-derived human neurons after bumetanide treatment. The rank of the FC of these genes in iPSC-derived human neurons following bumetanide treatment as compared to vehicle treatment is plotted on the x-axis versus number of genes at that rank on the y-axis. The mean rank of all genes in this geneset is denoted by the black line, the average mean FC rank of up-regulated genes is denoted by a dotted line and labeled accordingly and the mean FC rank of the down-regulated genes is denoted by a dotted line and labeled accordingly. P-value of the significance of the "flip" of up and down-regulated FC rank means away from the rank mean of all genes as calculated by Monte-Carlo simulation is shown (P<0.001). (FIG. 14D) Heatmap of genes from human apoE4/4-specific transcriptomic signature of AD, rank ordered and color coded by estimated FC in apoE4/4 AD (top) and then re-color-coded by FC rank in iPS-derived neurons after bumetanide treatment (bottom). (FIG. 14E) Heatmap of the p-value of enriched ontological pathways (n=27) in apoE4/4-iPSC-derived human neurons after bumetanide treatment and their corresponding enrichment p-values in human apoE4/4-specific AD and all neuronal cell types that exhibited a "flip" phenotype as denoted in FIGS. 13A-13G (all excitatory neurons, mixed neurons, and SST/PV interneurons). Pathways highlighted in bold text denote those that are shared between apoE4/4-iPSC-derived human neurons and neuronal cell types that exhibit a "flip" in the apoE4-KI mouse hippocampus after bumetanide treatment (n=14 pathways, see FIGS. 13A-13G for cell-type specific information). Pathways highlighted in red denote those that are shared between apoE4/4-iPSC-derived human neurons and neuronal cell types that exhibit a "flip" in the apoE4-KI mouse hippocampus after bumetanide treatment (see FIGS. 13A-13G for cell-type specific information), as well as in human apoE4/4-specific AD (see FIG. 1 for human pathway information, n=4 pathways). (FIG. 14F) Venn diagram and unique and shared enriched ontological pathways between apoE4/4-iPSC-derived human neurons after bumetanide, neuronal cell types exhibiting a "flip" in the apoE4/4-KI mouse hippocampus after bumetanide (see FIGS. 13A-13G for cell-type specific information), as well as pathways significantly enriched in apoE4/4 AD in humans.

What is claimed is:

1. A method of preventing or treating Alzheimer's Disease (AD) in a subject having an apoE4/4 genotype, the method comprising administering a therapeutically effective amount of bumetanide to the subject.

2. The method of claim 1, wherein the administering comprises administering bumetanide to the subject at a dose of 0.05 mg/kg/day or less.

3. The method of claim 2, wherein the administering comprises administering bumetanide to the subject at a dose of 0.02 mg/kg/day or less.

4. The method of claim 1, wherein the bumetanide is formulated as an oral dosage form comprising a pharmaceutically acceptable carrier, and wherein the oral dosage form is administered orally.

5. The method of claim 4, wherein the oral dosage form is administered once daily as a capsule, a tablet, a disintegrating tablet or lozenge, or a sachet.

6. The method of claim 1, wherein the bumetanide is administered intravenously or parenterally.

7. The method of claim 1, wherein the bumetanide is provided in a transdermal patch.

8. The method of claim 1, wherein the subject is a mammal.

9. The method of claim 8, wherein the mammal is a human.

10. A method of preventing or treating Alzheimer's Disease in a subject having an apoE4/4 genotype, the method comprising:
    a) identifying a subject as having an apoE4/4 genotype; and
    b) administering a therapeutically effective amount of bumetanide to the subject.

11. The method of claim 10, wherein the identifying comprises performing a PCR-based DNA analytic method on a biological sample from the subject.

12. The method of claim 11, further comprising isolating the biological sample from the subject.

13. The method of claim 10, wherein the administering comprises administering bumetanide to the subject as a dose of 0.05 mg/kg/day or less.

14. The method of claim 13, wherein the administering comprises administering bumetanide to the subject as a dose of 0.02 mg/kg/day or less.

15. The method of claim 10, wherein the bumetanide is formulated as an oral dosage form comprising a pharmaceutically acceptable carrier, and wherein the oral dosage form is administered orally.

16. The method of claim 15, wherein the oral dosage form is administered once daily as a capsule, a tablet, a disintegrating tablet or lozenge, or a sachet.

17. The method of claim 10, wherein the bumetanide is administered intravenously or parenterally.

18. The method of claim 10, wherein the bumetanide is provided in a transdermal patch.

19. The method of claim 10, wherein the subject is a mammal.

20. The method of claim 19, wherein the mammal is a human.

* * * * *

SEQUENCE LISTING

```
<160> NUMBER OF SEQ ID NOS: 4

<210> SEQ ID NO 1
<211> LENGTH: 3647
<212> TYPE: DNA
<213> ORGANISM: Homo sapiens

<400> SEQUENCE: 1
gggacagggg gagccctata attggacaag tctgggatcc ttgagtccta ctcagcccca      60
gcggaggtga aggacgtcct tccccaggag ccggtgagaa gcgcagtcgg gggcacgggg     120
atgagctcag gggcctctag aaagagctgg gaccctggga acccctggcc tccaggtagt     180
ctcaggagag ctactcgggg tcgggcttgg ggagaggagg agcgggggtg aggcaagcag     240
caggggactg gacctgggaa gggctgggca gcagagacga cccgacccgc tagaaggtgg     300
ggtggggaga gcagctggac tgggatgtaa gccatagcag gactccacga gttgtcacta     360
tcatttatcg agcacctact gggtgtcccc agtgtcctca gatctccata actgggggagc    420 cagggcagc gacacggtag ctagccgtcg attggagaac tttaaaatga ggactgaatt      480
agctcataaa tggaacacgg cgcttaactg tgaggttgga gcttagaatg tgaagggaga     540
atgaggaatg cgagactggg actgagatgg aaccggcggt ggggagggg tggggggatg      600 gaatttgaac cccgggagag gaagatggaa ttttctatgg aggccgacct ggggatgggg     660
agataagaga agaccaggag ggagttaaat agggaatggg ttggggggcgg cttgtaaat     720 gtgctgggat taggctgttg cagataatgc aacaaggctt ggaaggctaa cctgggggtga    780
```

```
ggccgggttg gggccgggct gggggtggga ggagtcctca ctggcggttg attgacagtt    840
tctccttccc cagactggcc aatcacaggc aggaagatga aggttctgtg ggctgcgttg    900
ctggtcacat tcctggcagg tatggggcg gggcttgctc ggttccccc gctcctcccc    960 ctctcatcct cacctcaacc tcctggcccc attcaggcag accctgggcc cctcttctg   1020 aggcttctgt gctgcttcct ggctctgaac agcgatttga cgctctctgg gcctcggttt   1080
cccccatcct tgagatagga gttagaagtt gttttgttgt tgttgtttgt tgttgttgtt   1140
ttgttttttt gagatgaagt ctcgctctgt cgcccaggct ggagtgcagt ggcgggatct   1200
cggctcactg caagctccgc ctcccaggtc cacgccattc tcctgcctca gcctcccaag   1260
tagctgggac tacaggcaca tgccaccaca cccgactaac ttttttgtat tttcagtaga   1320 gacgggggttt caccatgttg gccaggctgg tctggaactc ctgacctcag gtgatctgcc   1380
cgtttcgatc tcccaaagtg ctgggattac aggcgtgagc caccgcacct ggctgggagt   1440
tagaggtttc taatgcattg caggcagata gtgaatacca gacacggggc agctgtgatc   1500
tttattctcc atcaccccca cacagccctg cctggggcac acaaggacac tcaatacatg   1560
cttttccgct gggcgcggtg gctcacccct gtaatcccag cactttggga ggccaaggtg   1620
ggaggatcac ttgagcccag gagttcaaca ccagcctggg caacatagtg agaccctgtc   1680
tctactaaaa atacaaaaat tagccaggca tggtgccaca cacctgtgct ctcagctact   1740
caggaggctg aggcaggagg atcgcttgag cccagaaggt caaggttgca gtgaaccatg   1800
ttcaggccgc tgcactccag cctgggtgac agagcaagac cctgtttata aatacataat   1860
gctttccaag tgattaaacc gactccccc tcaccctgcc caccatggct ccaaagaagc   1920
atttgtggag caccttctgt gtgccctag gtactagatg cctggacggg gtcagaagga   1980
ccctgaccca ccttgaactt gttccacaca ggatgccagg ccaaggtgga gcaagcggtg   2040
gagacagagc cggagcccga gctgcgccag cagaccgagt ggcagagcgg ccagcgctgg   2100
gaactggcac tgggtcgctt tgggattac ctgcgctggg tgcagacact gtctgagcag   2160
gtgcaggagg agctgctcag ctcccaggtc acccaggaac tgaggtgagt gtccccatcc   2220
tggcccttga ccctcctggt gggcggctat acctccccag gtccaggttt cattctgccc   2280
ctgtcgctaa gtcttggggg gcctgggtct ctgctggttc tagcttcctc ttcccatttc   2340
tgactcctgg ctttagctct ctggaattct ctctctcagc tttgtctctc tctcttccct   2400
tctgactcag tctctcacac tcgtcctggc tctgtctctg tccttcccta gctctttat   2460 atagagacag agagatgggg tctcactgtg ttgcccaggc tggtcttgaa cttctgggct   2520
caagcgatcc tcccgcctcg gcctcccaaa gtgctgggat tagaggcatg agccaccttg   2580
cccggcctcc tagctccttc ttcgtctctg cctctgccct ctgcatctgc tctctgcatc   2640
tgtctctgtc tccttctctc ggcctctgcc ccgttccttc tctccctctt gggtctctct   2700
ggctcatccc catctcgccc gccccatccc agcccttctc cccgcctccc actgtgcgac   2760
accctcccgc cctctcggcc gcagggcgct gatggacgag accatgaagg agttgaaggc   2820
ctacaaatcg gaactggagg aacaactgac cccggtggcg gaggagacgc gggcacggct   2880
gtccaaggag ctgcaggcgg cgcaggcccg gctgggcgcg gacatggagg acgtgtgcgc   2940
ccgcctggtg cagtaccgcg gcgaggtgca ggccatgctc ggccagagca ccgaggagct   3000
gcgggtgcgc ctcgcctccc acctgcgcaa gctgcgtaag cggctcctcc gcgatgccga   3060
tgacctgcag aagcgcctgg cagtgtacca ggccggggcc cgcgagggcg ccgagcgcgg   3120
```

```
cctcagcgcc atccgcgagc gcctggggcc cctggtggaa cagggccgcg tgcgggccgc    3180
cactgtgggc tccctggccg gccagccgct acaggagcgg gcccaggcct ggggcgagcg    3240
gctgcgcgcg cggatggagg agatgggcag ccggacccgc gaccgcctgg acgaggtgaa    3300
ggagcaggtg gcggaggtgc gcgccaagct ggaggagcag gccagcagga tacgcctgca    3360
ggccgaggcc ttccaggccc gcctcaagag ctggttcgag cccctggtgg aagacatgca    3420
gcgccagtgg gccgggctgg tggagaaggt gcaggctgcc gtgggcacca cgccgccccc    3480
tgtgcccagc gacaatcact gaacgccgaa gcctgcagcc atgcgacccc acgccacccc    3540
gtgcctcctg cctccgcgca gcctgcagcg ggagaccctg tccccgcccc agccgtcctc    3600
ctggggtgga ccctagttta ataaagattc accaagtttc acgcatc                  3647

<210> SEQ ID NO 2
<211> LENGTH: 5515
<212> TYPE: DNA
<213> ORGANISM: Homo sapiens

<400> SEQUENCE: 2
ggaacttgat gctcagagag gacaagtcat ttgcccaagg tcacacagct ggcaactggc      60
agacgagatt cacgccctgg caatttgact ccagaatcct aaccttaacc cagaagcacg     120
gcttcaagcc ctggaaacca caatacctgt ggcagccagg ggaggtgct ggaatctcat     180 ttcacatgtg ggggaggggc tcctgtgctc aaggtcacaa ccaaagagga agctgtgatt     240
aaaacccagg tcccatttgc aaagcctcga cttttagcag gtgcatcata ctgttcccac     300
ccctcccatc ccacttctgt ccagccgcct agccccactt tctttttttt cttttttga     360 gacagtctcc ctcttgctga ggctggagtg cagtggcgag atctcggctc actgtaacct     420
ccgcctcccg ggttcaagcg attctcctgc ctcagcctcc caagtagcta ggattacagg     480
cgcccgccac cacgcctggc taactttgt attttagta gagatggggt ttcaccatgt     540
tggccaggct ggtctcaaac tcctgacctt aagtgattcg cccactgtgg cctcccaaag     600
tgctgggatt acaggcgtga gctaccgccc cagcccctc ccatcccact tctgtccagc     660
cccctagccc tactttcttt ctgggatcca ggagtccaga tccccagccc cctctccaga     720
ttacattcat ccaggcacag gaaaggacag ggtcaggaaa ggaggactct gggcggcagc     780
ctccacattc cccttccacg cttggccccc agaatggagg agggtgtctg tattactggg     840
cgaggtgtcc tcccttcctg gggactgtgg ggggtggtca aaagaccctct atgccccacc     900 tccttcctcc ctctgcctg ctgtgcctgg ggcaggggga aacagcccca cctcgtgact     960
gggctgccca gcccgcccta tccctggggg aggggcggg acaggggagg ccctataatt    1020
ggacaagtct gggatccttg agtcctactc agcccagcg gaggtgaagg acgtccttcc    1080
ccaggagccg gtgagaagcg cagtcggggg cacggggatg agctcagggg cctctagaaa    1140
gagctgggac cctggaaagc cctggcctcc aggtagtctc aggagagcta ctcggggtcg    1200
ggcttgggga gaggaggagc gggggtgagg caagcagcag gggactggac ctgggaaggg    1260
ctgggcagca gagacgaccc gacccgctag aaggtggggt ggggagagca gctggactgg    1320
gatgtaagcc atagcaggac tccacgagtt gtcactatca ttatcgagca cctactgggt    1380
gtccccagtg tcctcagatc tccataactg gggagccagg ggcagcgaca cggtagctag    1440
ccgtcgattg gagaacttta aaatgaggac tgaattagct cataaatgga acacggcgct    1500
taactgtgag gttggagctt agaatgtgaa gggagaatga ggaatgcgag actgggactg    1560
agatggaacc ggcggtgggg aggggtggg gggatggaat ttgaaccccg ggagaggaag    1620
```

```
atggaatttt ctatggaggc cgacctgggg atggggagat aagagaagac caggagggag    1680
ttaaataggg aatgggttgg gggcggcttg gtaaatgtgc tgggattagg ctgttgcaga    1740
taatgcaaca aggcttggaa ggctaacctg gggtgaggcc gggttgggggg cgctgggggt   1800 gggaggagtc ctcactggcg gttgattgac agtttctcct tccccagact ggccaatcac    1860
aggcaggaag atgaaggttc tgtgggctgc gttgctggtc acattcctgg caggtatggg    1920 ggcgggggctt gctcggttcc ccccgctcct cccctctca tcctcacctc aacctcctgg    1980
ccccattcag acagaccctg ggccccctct tctgaggctt ctgtgctgct cctggctct     2040 gaacagcgat ttgacgctct ctgggcctcg gtttccccca tccttgagat aggagttaga    2100
agttgttttg ttgttgttgt ttgttgttgt tgttttgttt tttttgagatg aagtctcgct   2160 ctgtcgccca ggctggagtg cagtggcggg atctcggctc actgcaagct ccgcctccca    2220
ggtccacgcc attctcctgc ctcagcctcc caagtagctg ggactacagg cacatgccac    2280
cacacccgac taacttttttt gtattttcag tagagacggg gtttcaccat gttggccagg   2340
ctggtctgga actcctgacc tcaggtgatc tgcccgtttc gatctcccaa agtgctggga   2400
ttacaggcgt gagccaccgc acctggctgg gagttagagg tttctaatgc attgcaggca    2460
gatagtgaat accagacacg gggcagctgt gatctttatt ctccatcacc cccacacagc    2520
cctgcctggg gcacacaagg acactcaata catgcttttc cgctgggccg gtggctcacc    2580
cctgtaatcc cagcactttg ggaggccaag gtgggaggat cacttgagcc caggagttca    2640
acaccagcct gggcaacata gtgagaccct gtctctacta aaaatacaaa aattagccag   2700
gcatggtgcc acacacctgt gctctcagct actcaggagg ctgaggcagg aggatcgctt    2760
gagcccagaa ggtcaaggtt gcagtgaacc atgttcaggc cgctgcactc cagcctgggt    2820
gacagagcaa gaccctgttt ataaatacat aatgctttcc aagtgattaa accgactccc    2880
ccctcaccct gcccaccatg gctccaaaga agcatttgtg gagcaccttc tgtgtgcccc   2940
taggtagcta gatgcctgga cggggtcaga aggaccctga cccgaccttg aacttgttcc    3000
acacaggatg ccaggccaag gtggagcaag cggtggagac agagccggag cccgagctgc    3060
gccagcagac cgagtggcag agcggccagc gctgggaact ggcactgggt cgcttttggg   3120
attacctgcg ctgggtgcag acactgtctg agcaggtgca ggaggagctg ctcagctccc    3180
aggtcaccca ggaactgagg tgagtgtccc catcctggcc cttgaccctc ctggtgggcg    3240
gctatacctc cccaggtcca ggtttcattc tgccctgtc gctaagtctt gggggggcctg    3300 ggtctctgct ggttctagct tcctcttccc atttctgact cctggcttta gctctctgga    3360
attctctctc tcagctttgt ctctctctct tcccttctga ctcagtctct cacactcgtc    3420
ctggctctgt ctctgtcctt ccctagctct tttatataga gacagagaga tggggtctca    3480
ctgtgttgcc caggctggtc ttgaacttct gggctcaagc gatcctcccg cctcggcctc    3540
ccaaagtgct gggattagag gcatgagcac cttgcccggc ctcctagctc cttcttcgtc    3600
tctgcctctg ccctctgcat ctgctctctg catctgtctc tgtctccttc tctcggcctc    3660
tgccccgttc cttctctccc tcttgggtct ctctggctca tccccatctc gcccgcccca    3720
tcccagccct tctcccccgc ctccccactg tgcgacaccc tcccgccctc tcggccgcag    3780
ggcgctgatg gacgagacca tgaaggagtt gaaggcctac aaatcggaac tggaggaaca    3840
actgaccccg gtgcgggagg agacgcgggc acgctgtccc aaggagctgc aggcggcgca    3900 ggccccggctg ggcgcggaca tggaggacgt gcgcggccgc ctggtgcagt accgcggcga   3960
```

-continued

| | |
|---|---|
| ggtgcaggcc atgctcggcc agagcaccga ggagctgcgg gtgcgcctcg cctcccacct | 4020 |
| gcgcaagctg cgtaagcggc tcctccgcga tgccgatgac ctgcagaagc gcctggcagt | 4080 |
| gtaccaggcc ggggcccgcg agggcgccga gcgcggcctc agcgccatcc gcgagcgcct | 4140 |
| ggggcccctg gtggaacagg gccgcgtgcg ggccgccact gtgggctccc tggccggcca | 4200 |
| gccgctacag gagcgggccc aggcctgggg cgagcggctg cgcgcgcgga tggaggagat | 4260 |
| gggcagccgg acccgcgacc gcctggacga ggtgaaggag caggtggcgg aggtgcgcgc | 4320 |
| caagctggag gagcaggccc agcagatacg cctgcaggcc gaggccttcc aggcccgcct | 4380 |
| caagagctgg ttcgagcccc tggtggaaga catgcagcgc cagtgggccg ggctggtgga | 4440 |
| gaaggtgcag gctgccgtgg gcaccagcgc cgcccctgtg cccagcgaca atcactgaac | 4500 |
| gccgaagcct gcagccatgc gaccccacgc caccccgtgc ctcctgcctc cgcgcagcct | 4560 |
| gcagcgggag accctgtccc cgccccagcc gtcctcctgg ggtggaccct agtttaataa | 4620 |
| agattcacca gtttcacgc atctgctggc ctcccctgt gatttcctct aagccccagc | 4680 |
| ctcagtttct ctttctgccc acatactgcc acacaattct cagcccctc ctctccatct | 4740 |
| gtgtctgtgt gtatcttcct ctctgccctt tttttttttt tagacggagt ctggctctgt | 4800 |
| cacccaggct agagtgcagt ggcacgatct tggctcactg caacctctgc ctcttgggtt | 4860 |
| caagcgattc tgctgcctca gtagctggga ttacaggctc acaccaccac acccggctaa | 4920 |
| tttttgtatt tttagtagag acgagctttc accatgttgg ccaggcaggt ctcaaactcc | 4980 |
| tgaccaagtg atccacccgc cggcctccca aagtgctgag attacaggcc tgagccacca | 5040 |
| tgcccggcct ctgcccctct ttcttttta gggggcaggg aaaggtctca ccctgtcacc | 5100 |
| cgccatcaca gctcactgca gcctccacct cctggactca agtgataagt gatcctcccg | 5160 |
| cctcagcctt tccagtagct gagactacag gcgcatacca ctaggattaa tttgggggg | 5220 |
| ggtggtgtgt gtggagatgg ggtctggctt tgttggccag gctgatgtgg aattcctggg | 5280 |
| ctcaagcgat actcccacct tggcctcctg agtagctgag actactggct agcaccacca | 5340 |
| cacccagctt tttattatta tttgtagaga caaggtctca atatgttgcc caggctagtc | 5400 |
| tcaaacccct ggctcaagag atcctccgcc atcggcctcc caaagtgctg ggattccagg | 5460 |
| catgggctcc gagcggcctg cccaacttaa taatattgtt cctagagttg cactc | 5515 |

<210> SEQ ID NO 3
<211> LENGTH: 18
<212> TYPE: DNA
<213> ORGANISM: Artificial sequence
<220> FEATURE:
<223> OTHER INFORMATION: synthetic sequence

<400> SEQUENCE: 3
ggcacggctg tccaagga                    18

<210> SEQ ID NO 4
<211> LENGTH: 21
<212> TYPE: DNA
<213> ORGANISM: Artificial sequence
<220> FEATURE:
<223> OTHER INFORMATION: synthetic sequence

<400> SEQUENCE: 4
gccccggcct ggtacactgc c                21